United States Patent [19]
Imanaka

[11] Patent Number: 6,025,932
[45] Date of Patent: Feb. 15, 2000

[54] DIGITAL INFORMATION ENCODING APPARATUS, DIGITAL INFORMATION ENCODING/DECODING APPARATUS, DIGITAL INFORMATION ENCODING METHOD, AND DIGITAL INFORMATION DECODING METHOD

[75] Inventor: Yoshifumi Imanaka, Tokyo, Japan

[73] Assignee: Mitsubishi Denki Kabushiki Kaisha, Tokyo, Japan

[21] Appl. No.: 08/677,738

[22] Filed: Jul. 10, 1996

[30] Foreign Application Priority Data

Dec. 27, 1995 [JP] Japan .................... 7-340681

[51] Int. Cl.[7] .................. H04N 1/417; H04N 1/415; H04N 1/40
[52] U.S. Cl. .................. 358/426; 358/261.2; 358/261.3; 358/427; 358/430; 358/448; 382/232; 382/233; 382/238; 382/245; 382/246
[58] Field of Search ................. 358/426, 261.2, 358/261.3, 427, 261.4, 430, 432, 444, 448; 382/232, 233, 238, 239, 244, 245, 246

[56] References Cited

U.S. PATENT DOCUMENTS

| | | | |
|---|---|---|---|
| 4,749,983 | 6/1988 | Langdon, Jr. .................... | 358/430 |
| 4,833,883 | 5/1989 | Pennebaker et al. .............. | 364/554 |
| 4,973,961 | 11/1990 | Chamzas et al. . | |
| 5,025,258 | 6/1991 | Duttweiler . | |
| 5,059,976 | 10/1991 | Ono et al. ....................... | 341/51 |
| 5,404,140 | 4/1995 | Ono et al. . | |

FOREIGN PATENT DOCUMENTS

| | | |
|---|---|---|
| 0510627 | 10/1992 | European Pat. Off. . |
| 0597733 | 5/1994 | European Pat. Off. . |
| 6121172 | 4/1994 | Japan . |

OTHER PUBLICATIONS

Imanaka et al.; "International Standardized Highly Effective Encoding System (OM–Coder)LSI"; Mitsubishi Denki Giho, vol. 67, No. 7, 1993, pp. 33–38.

*Primary Examiner*—Edward L. Coles
*Assistant Examiner*—Mark E. Wallerson
*Attorney, Agent, or Firm*—Ledig, Voit & Mayer

[57] ABSTRACT

The digital information encoding apparatus comprises a context generation means for extracting a reference picture element from an inputted picture data, a context storage means for temporarily storing said context, a context table storage means comprising a read address input node, a read/write context table storing portion, a data output node, a write address input node and a data input node, a probability estimating table storage means comprising an address input node for receiving a probability estimation index in a probability estimating data, and a data output node which outputs a probability estimating data, and an arithmetic calculation means for receiving a picture data to be encoded and for outputting a renewal data including both the prediction symbol and the probability estimation index to said context table storage means.

19 Claims, 19 Drawing Sheets

THREE LINE TEMPLATE

TWO LINE TEMPLATE

| PROBABILITY ESTIMATING INDEX | LSZ(16BITS) | NLPS | NMPS | SWITCH |
|---|---|---|---|---|
| 0000000 | 0×5a1d | 0000001 | 0000001 | 1 |
| 0000001 | 0×2586 | 0001110 | 0000010 | 0 |
| 0000010 | 0×1114 | 0010000 | 0000011 | 0 |
| 0000011 | 0×080b | 0010010 | 0000100 | 0 |
| ∽ | ∽ | ∽ | ∽ | ∽ |
| 0001110 | 0×5a7f | 0001111 | 0001111 | 1 |
| ∽ | ∽ | ∽ | ∽ | ∽ |
| 1101110 | 0×5a10 | 1101110 | 1101111 | 1 |
| 1101111 | 0×5522 | 1110000 | 1101101 | 0 |
| 1110000 | 0×59eb | 1110000 | 1101111 | 1 |

FIG. 6

| CONDITIONS \ MODE | I | II | III | IV | V |
|---|---|---|---|---|---|
| RENORMALIZING | NO | YES | | | |
| IDENTICAL CONTEXT | = | ≠ | | = | |
| NUMBER OF RENORMALIZING (BIT) | 0 | r = 1 | r > 1 | r = 1 | r > 1 |
| NUMBER OF PROCESSING CLOCK | 1 | 1 | r | 2 | r |

FIG. 10

DIGITAL INFORMATION ENCODING APPARATUS, DIGITAL INFORMATION ENCODING/DECODING APPARATUS, DIGITAL INFORMATION ENCODING METHOD, AND DIGITAL INFORMATION DECODING METHOD

BACKGROUND OF THE INVENTION

1. Field of the Invention

The present invention relates to a digital information encoding apparatus (an encoding apparatus based on so-called QM-Coder), a digital information decoding apparatus, a digital information encoding/decoding apparatus, a method of encoding digital information, and a method of decoding digital information, which are integrated into a semiconductor integrated circuit applied, for example, to a facsimile apparatus.

2. Description of the Prior Art

A facsimile equipment transmits binary pictures such as drawings and document texts to a remote place. The demand for a facsimile equipment to transmit the data more speedily is increasing in recent years. The transmission time has been reduced by reducing the amount of data by means of encoding.

In other words, in case of a facsimile apparatus, there are some systems for transmitting digital picture information by compressing, namely, transmitting information as an encoded data after encoding, which are now taken into the international standard. One of the system is an MH (Modified Huffman) encoding system which uses correlation between one dimensional picture elements. The second system is an MR (Modified READ) encoding system which uses correlation between two dimensional picture elements. The third system is an MMR (Modified Modified READ) encoding system which enhances the compression efficiency by eliminating redundancy of MR code.

Since it is difficult to procure a recording device which realizes a precise reproduction of the half tone picture at present, the encoding processing is carried out after pre-processing a pseudo half tone by the method called dither.

Recently, attentions are focused on the international standard group JBIG for encoding two value picture, and QM-Corder which is a highly efficient encoding system of information keeping type. The former is characterized by a high compression ratio achieved not only for picture information, but also for various kinds of information including pallet or character information. Moreover, the JBIG achieves a highly efficient compression ratio even for a pseudo half tone picture. The latter has been standardized in the standard group JPEG for color static picture encoding.

Although a digital information encoding apparatus based on the abovementioned QM-Coder is characterized by its high-speed processing, further high-speed processing is requested.

The inventors who are concerned with the present invention have carried out several investigation on the digital information encoding apparatus based on the QM-Coder, which is resulted in the following facts. The highest speed of the apparatus has been a satisfactory one. In the worst case however, namely, when the compression ration is 1, the processing speed falls to less than half of the highest speed. Accordingly, it is resulted that the total processing speed can be improved by improving the processing speed in the worst case.

It is an object of the present invention to provide a digital information encoding apparatus, a digital information decoding apparatus, a digital information encoding/decoding apparatus, a method of encoding digital information, and a method of decoding digital information, in which the total processing speed is improved, namely, the high speed processing is achieved.

SUMMARY OF THE INVENTION

According to one aspect of the present invention, the digital information encoding apparatus based on a QM-Corder comprises a context table storage means having a read/write context table storing portion for storing a plurality of prediction-index data having a plurality of bits, which comprises a read address input node for receiving the context from the context generation means, a data output node which outputs the prediction-index data stored in the context table storing portion in an address based on the context received on the read address input node, a write address input node for receiving the context temporarily stored in the context storage means, and a data input node which receives a renewal data written in the context table storing portion in an address based on the context received on the write address input node.

According to another aspect of the present invention, the digital information encoding apparatus based on a QM-Corder comprises an A register where the A data from the arithmetic calculation means, which carries out a predetermined calculation, is latched, contents of the latched A data is outputted as an A data, and a renormalizing signal for conducting a normalization processing, and a last renormalizing signal, which indicates that the normalization will be completed by the last one processing, are outputted; an A selector where the A data form the A register and a shift-up selection signal based on the last renormalizing signal are received, and if the selection signal indicates "shift-up", the A data from the A register is shifted-up by one bit and outputted to the arithmetic calculation means as an A data for a picture element immediately preceding the picture element to be encoded, or otherwise, the A data from the A register is outputted to the arithmetic calculation means as an A data for a picture element immediately preceding the picture element to be encoded without shifting-up; a C register where a C data from the arithmetic calculation means is latched, and contents of the latched C data is outputted as a C data; a C selector where the C data from the C register and the shift-up selection signal are received, and if the selection signal indicates "shift-up", the C data from the C register is shifted-up by one bit and outputted to the arithmetic calculation means as a C data for a picture element immediately preceding the picture element to be encoded, or otherwise, the C data from the C register is outputted to the arithmetic calculation means as a C data for a picture element immediately preceding the picture element to be encoded as well as an encoded data for transmission without shifting-up.

According to further aspect of the present invention, the digital information decoding apparatus based on a QM-Corder comprises a context table storage device a read address input node for receiving the context from the context generation means, a read/write context table storing portion for storing a plurality of prediction-index data having a plurality of bits, a data output node which outputs the prediction-index data stored in the context table storing portion in an address based on the context received on the read address input node, a write address input node for receiving the context temporarily stored in the context storage means, and a data input node which receives a renewal data written in the context table storing portion in an address based on the context received on the write address input node.

According to further aspect of the present invention, the digital information decoding apparatus based on a QM-Corder comprises an A register where the A data from the arithmetic calculation means, which carries out a predetermined calculation, is latched, contents of the latched A data is outputted as an A data, and a renormalizing signal for conducting a normalization processing, and a last renormalizing signal, which indicates that the normalization will be completed by the last one processing, are outputted; an A selector where the A data form the A register and a shift-up selection signal based on the last renormalizing signal are received, and if the selection signal indicates "shift-up", the A data from the A register is shifted-up by one bit and outputted to the arithmetic calculation means as an A data for a picture element immediately preceding the picture element to be encoded, or otherwise, the A data from the A register is outputted to the arithmetic calculation means as an A data for a picture element immediately preceding the picture element to be encoded without shifting-up; a C register wherein a C data from the arithmetic calculation means is received, an encoded data received therein is inputted via an input means, and contents latched therein is outputted as a C data according to the C data and the encoded data received therein; and a C selector where the C data from the C register and the shift-up selection signal are received, and if the selection signal indicates "shift-up", the C data from the C register is shifted-up by one bit and outputted to the arithmetic calculation means as a C data for a picture element immediately preceding the picture element to be decoded, or otherwise, the C data from the C register is outputted to the arithmetic calculation means as a C data for a picture element immediately preceding the picture element to be decoded without shifting-up.

According to further aspect of the present invention, the digital information encoding/decoding apparatus based on a QM-Corder comprises a context table storage means having a read/write context table storing portion for storing a plurality of prediction-index data having a plurality of bits, which is used for both encoding and decoding processes, and comprises a read address input node for receiving the context from the context generation means, a data output node which outputs the prediction-index data stored in the context table storing portion in an address based on the context received on the read address input node, a write address input node for receiving the context temporarily stored in the context storage means, and a data input node which receives a renewal data written in the context table storing portion in an address based on the context received on the write address input node.

According to further aspect of the present invention, the digital information encoding/decoding apparatus based on a QM-Corder comprises an encoding A register where the A data from the encoding arithmetic calculation means, which carries out a predetermined calculation, is latched, contents of the latched A data is outputted as an A data, and a renormalizing signal for conducting a normalization processing, and a last renormalizing signal, which indicates that the normalization will be completed by the last one processing, are outputted; an A selector where the A data form the encoding A register and a shift-up selection signal based on the last renormalizing signal are received, and if the selection signal indicates "shift-up", the A data from the encoding A register is shifted-up by one bit and outputted to the encoding arithmetic calculation means as an A data for a picture element immediately preceding the picture element to be encoded, or otherwise, the A data from the encoding A register is outputted to the encoding arithmetic calculation means as an encoding A data for a picture element immediately preceding the picture element to be encoded without shifting-up; an encoding C register where a C data from the encoding arithmetic calculation means is latched, and contents of the latched C data is outputted as a C data; a C selector where the C data from the encoding C register and the shift-up selection signal are received, and if the selection signal indicates "shift-up", the C data from the encoding C register is shifted-up by one bit and outputted to the encoding arithmetic calculation means as a C data for a picture element immediately preceding the picture element to be encoded, or otherwise, the C data from the encoding C register is outputted to the encoding arithmetic calculation means as a C data for a picture element immediately preceding the picture element to be encoded as well as an encoded data for transmission without shifting-up; and further comprises a decoding A register where the A data from the decoding arithmetic calculation means, which carries out a predetermined calculation, is latched, contents of the latched A data is outputted as an A data, and a renormalizing signal for conducting a normalization processing, and a last renormalizing signal, which indicates that the normalization will be completed by the last one processing, are outputted; a decoding A selector where the A data form the decoding A register and a shift-up selection signal based on the last renormalizing signal are received, and if the selection signal indicates "shift-up", the A data from the decoding A register is shifted-up by one bit and outputted to the decoding arithmetic calculation means as an A data for a picture element immediately preceding the picture element to be encoded, or otherwise, the A data from the decoding A register is outputted to the decoding arithmetic calculation means as an A data for a picture element immediately preceding the picture element to be encoded without shifting-up; a decoding C register wherein a C data from the decoding arithmetic calculation means is received, an encoded data received therein is inputted via an input means, and contents latched therein is outputted as a C data according to the C data and the encoded data received therein; a decoding C selector where the C data from the decoding C register and the shift-up selection signal are received, and if the selection signal indicates "shift-up", the C data from the decoding C register is shifted-up by one bit and outputted to the decoding arithmetic calculation means as a C data for a picture element immediately preceding the picture element to be decoded, or otherwise, the C data from the decoding C register is outputted to the decoding arithmetic calculation means as a C data for a picture element immediately preceding the picture element to be decoded without shifting-up.

According to further aspect of the present invention, the digital information encoding method realizes a renormalization processing for a picture element to be encoded within one clock of a system clock, from a context generation operation for a subsequent picture element to be encoded of the picture element to be encoded to an arithmetic operation for obtaining an A data indicating a width A of effective area for a subsequent picture element to be encoded of the picture element to be encoded and a C data indicating a code word C.

According to further aspect of the present invention, the digital information decoding method realizes a renormalization processing for a picture element to be decoded within one clock of a system clock, from a context generation operation for a subsequent picture element to be decoded of the picture element to be decoded to an arithmetic operation for obtaining an A data indicating a width A of effective area for a subsequent picture element to be decoded of the picture element to be decoded and a C data indicating a code word C.

BRIEF DESCRIPTION OF THE DRAWINGS

FIG. 6 is a diagram showing an example of a probability estimating table in the probability estimating table storage device 5, 105.

FIG. 10 is a diagram showing the operation modes according to the first embodiment of the present invention.

DETAILED DESCRIPTION OF THE PREFERRED EMBODIMENTS

Embodiment 1

Figure 1:
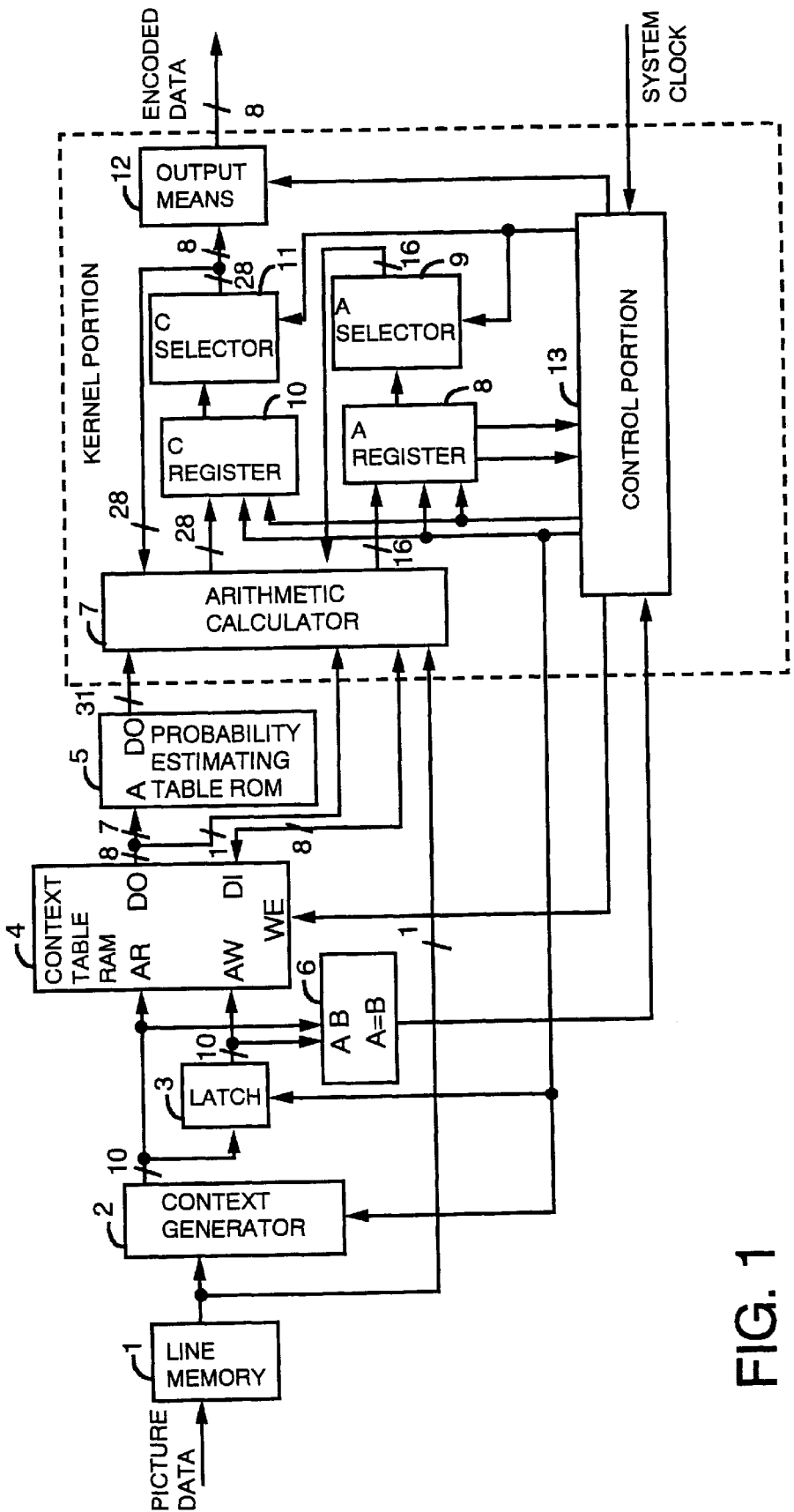
FIG. 1 is a block diagram showing a first embodiment of the present invention.

FIG. 1 shows a digital signal encoding apparatus (QM-Coder) in a first embodiment of the present invention, which is integrated in a semiconductor integrated circuit, which is, for example, applied to a facsimile apparatus. In FIG. 1, a storage device 1 comprises a plurality of line memories which store picture data for every one line. The picture data comprises a digital signal which is converted from the picture information to a two value picture by an analog/digital conversion circuities. The picture information comprises character information, pictorial information, pallet picture information, read out for every one line by a picture sensor such as scanner (not shown in FIG. 1).

A context generator 2 in FIG. 1 extracts a reference picture element according to a template model from the picture data inputted from the above-mentioned storage device. For example, in case of the two line template in FIG. 2A, the context generator 2 generates and outputs a context having bit patterns of ten picture elements extracted from the template of the ten picture elements. This ten picture elements are four encoded reference picture elements on the same line (horizontal direction) as the picture element to be encoded shown by the code "?", and six encoded reference picture elements on the immediately preceding line of the picture element to be encoded shown by the code "?". The four encoded reference picture elements are placed in the immediately preceding line to picture element to be encoded shown by the code "?", while the six encoded reference picture elements are placed in the front and rear rows including the row of the picture element to be encoded shown by the code "?".

Figure 2B:
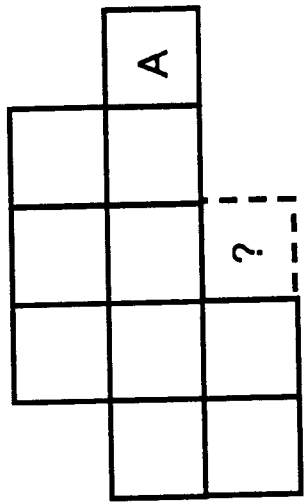
FIG. 2A, B are a diagram showing an example of templates.
Figure 2A:
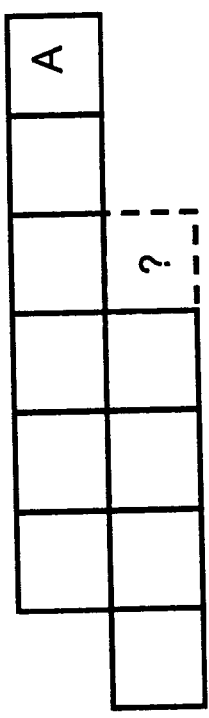

For example, in case of the three line template in FIG. 2B, the context generator 2 generates and outputs a context having bit patterns of the ten picture elements extracted from the template of the ten picture elements. The ten picture elements in this case are two encoded reference picture elements on the same line as the picture element to be encoded shown by the code "?", five encoded reference picture elements on the immediately preceding line of the picture element to be encoded shown by the code "?", and three encoded reference picture elements on the two preceding lines from the picture element to be encoded shown by the code "?". The two encoded reference picture elements are placed in the preceding line of the picture element to be encoded shown by the code "?", while the five encoded reference picture elements as well as the three encoded reference picture elements are placed in the front and rear rows including the row of the picture element to be encoded shown by the code "?". The context generator 2 operates in synchronization with inputted picture processing clock signal.

A context storage device 3 of FIG. 1 comprises a latch circuit temporarily stores a context for the picture element to be encoded from the above-mentioned context generator 2 in synchronization with the clock of the above-mentioned picture processing clock signal, and outputs the temporarily stored context as a context for the picture element to be encoded in synchronization with the next clock of the above-mentioned picture processing clock signal.

A context table storage device 4 of FIG. 1 comprises a read address input nodes AR for a plurality of addresses, a plurality of data output nodes DO, a plurality of a write address input nodes AW, a plurality of input nodes DI, a write-enable signal input node WE, and a context table storing portion where a plurality of prediction-index data are stored and written and read out. The context table storage device 4 reads out the prediction-index data stored in the context table storing portion based on the context which is received into the read address input nodes AR from the above-mentioned context generator 2, and then outputs from the data output nodes DO.

Receiving a renewal clock signal on the write-enable signal input node WE, the context table storage device 4 writes a renewal data inputted from the data input nodes DI (rewrite the renewal data over previously stored data) in the context table storing portion based on the context which is received on the write address input nodes AW which is transmitted from the above-mentioned context storage device 3.

The number of the above-mentioned read address input nodes AR and the write address input nodes AW is, for example, 10, if the context comprises 10 bits.

The above-mentioned prediction-index data has a prediction symbol indicating a prediction value, and a probability estimation index indicating a status number. The prediction symbol comprises 1 bit. The probability estimation index comprises seven bits, for example. As a whole, the prediction-index data comprises eight bits, for example. At initial state, "0" is written on all of these bits.

The above-mentioned renewal data is an eight bit data, for example, as same as the above-mentioned prediction-index data, consisted of a 1 bit prediction symbol and a seven bit probability estimation index.

The number of the above-mentioned data output nodes DO and the data input nodes DI is 8, for example, if the probability estimation index data is an eight bit data.

Figure 4:
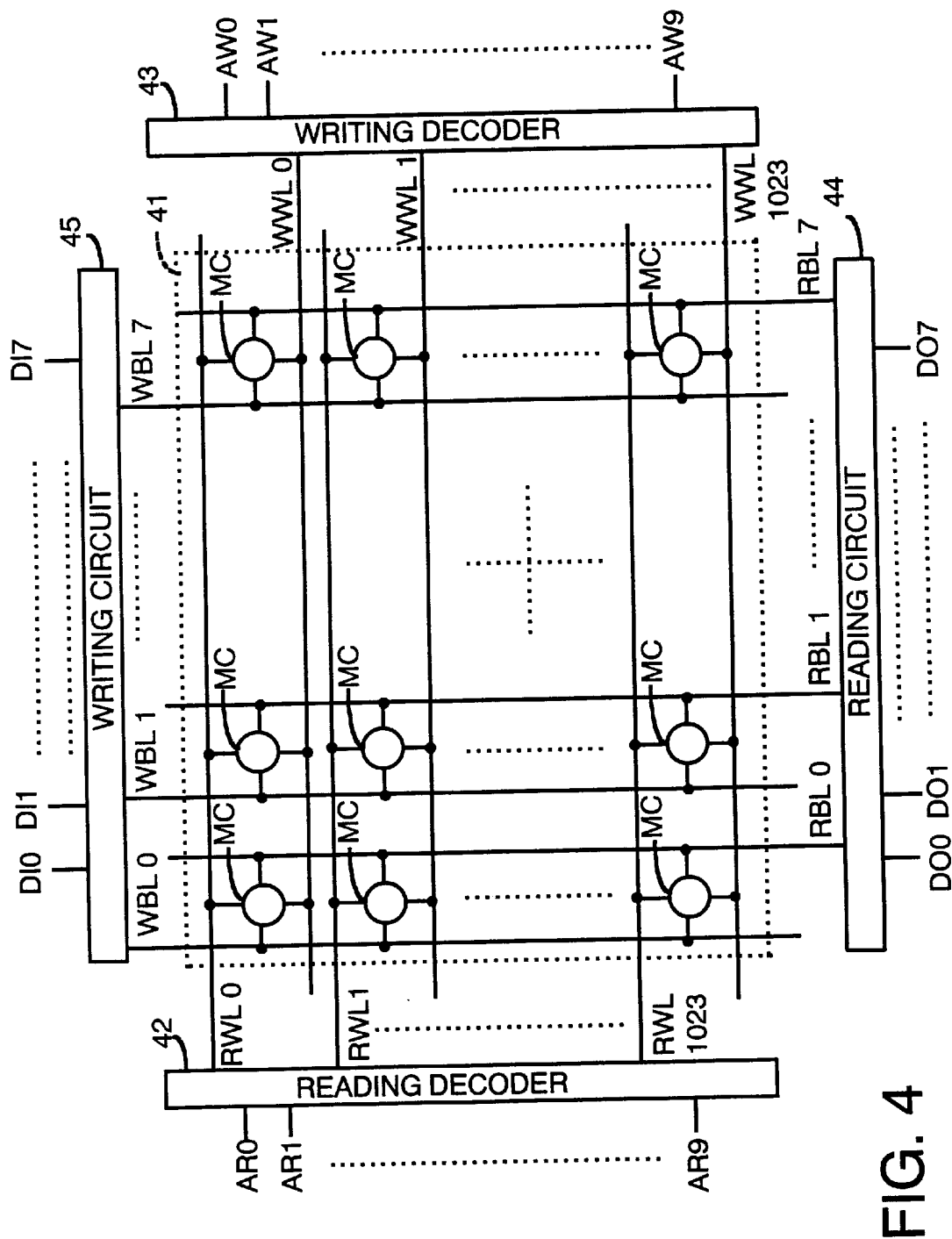
FIG. 4 is a diagram showing an example of the context table storage device 4, 104 according to the first and second embodiment of the present invention.

The above-mentioned context table storing portion 4 is able to store the prediction-index data as much as the number of the address designated by the context. For example, if the context comprises 10 bits, prediction-index data of $2^{10}$ is stored in the context table storing portion 4. The above-mentioned context table storage device 4 comprises a two port RAM having a context table storing portion as shown in FIG. 4. This context table storing portion comprises 1024 (1k) of lines, and each one line (1 address) comprises eight bits.

In FIG. 4, a memory cell array 41 comprises 1024×8 pieces of memory cell MC which are arranged in the 1024 rows and in the eight columns. The reading word lines RWL0~RWL1023 are arranged in the 1024 rows, each of which is connected to 8 memory cells allocated in each column. The writing word lines WWL0~WWL1023 are arranged in the 1024 rows, each of which is connected to 8 memory cells allocated in each column. The reading bit lines RBL0~RBL7 are arranged in eight columns, each of which is connected to 1024 memory cells allocated in each row. The writing bit lines WBL0~WBL7 are arranged in eight columns, each of which is connected to 1024 memory cells allocated in each row.

A reading decoder 42 is connected to the 10 read address nodes AR0~AR9. According to the context from the context generator 2 inputted to the read address nodes AR0~AR9, the reading decoder 42 activates one of the above-mentioned 1024 reading word lines RWL0~RWL1023. In other words, the reading decoder 42 makes one of the reading word lines "H" level, and make the remaining 1023 lines "L" level. A writing decoder 43 is connected to the 10 write address nodes AW0~AW9. According to the context from the context generator 2 inputted to the write address nodes AW0~AW9 via the above-mentioned context storage device 3, the writing decoder 43 activates one of the above-mentioned 1024 writing word lines WWL0~WWL1023. In other words the write decoder makes one of the writing word lines "H" level and make the remaining 1023 lines "L" level.

A reading circuit 44 is connected to eight reading bit lines RBL0~RBL7. The reading circuit 44 conducts a predetermined processing, for example, amplification and so on, on stored contents read out from the memory cells into these reading bit lines RBL0~RBL7 and outputs them to the above-mentioned data output nodes DO1 ~DO7. A writing circuit 45 is connected to eight writing bit lines WBL0~WBL7. The writing circuit 45 conducts a predetermined processing, for example, amplification and so on, to the renewal data inputted in the input nodes Dl1~D17, and output them to the writing bit lines WBL0~WBL7. A writing circuit 45 is connected to the eight writing bit lines WBL0~WBL7.

Figure 5:
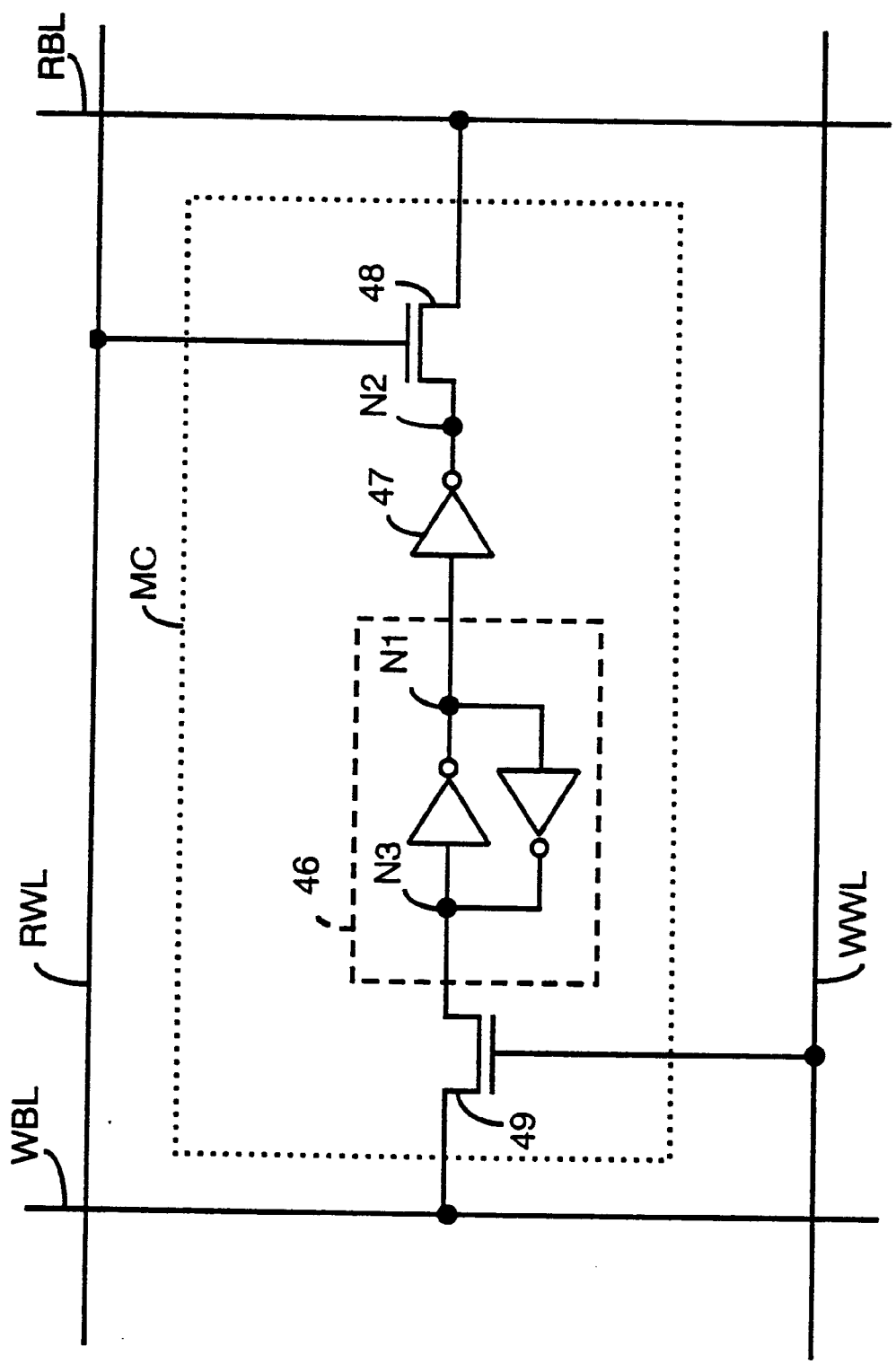
FIG. 5 is a diagram showing an example of a memory cell MC in the context table storage device 4, 104 according to the first and second embodiment of the present invention.

FIG. 5 shows a configuration of a memory cell MC. In FIG. 5, a storage node N1 stores contents, a reading node N2 reads out stored contents and a writing node N3 is supplied with a renewal data.

A latch circuit 46 in FIG. 5 is connected between the above-mentioned storage node N1 and the above-mentioned writing node N3. The latch circuit 46 inverts a renewal data inputted to the writing node N3, and provides it with the storage node N1 as well as latches the inverted data. The latch circuit 46 comprises two invertor elements connected in parallel in the opposite polarity. An invertor element 47 in FIG. 5 is connected between the storage node N1 and the reading node N2, and inverts contents stored in the storage node N1 and provides it with the reading node N2.

A reading transfer gate 48 in FIG. 5 is connected between the reading node N2 and a reading bit line RBL arranged in the corresponding column. Its control electrode is connected to a reading word line RWL arranged in the corresponding row. The reading transfer gate 48 comprises a MOS transistor. A reading transfer gate 49 in FIG. 5 is connected between the reading node N3 and a writing bit line WBL arranged in the corresponding column. Its control electrode is connected to a writing word line WWL arranged in the corresponding row. The reading transfer gate 49 also, comprises a MOS transistor.

For the shake of simplifying the explanation, the two port RAM memory cell array 41 shown in FIG. 4 are assumed to that each memory cell MC has 1024 rows and eight columns. The memory cells can be selected, for example, 1024/n lines and 8×n rows (n is an integer). In this a case, 1024/n reading/writing word lines and 8×n reading/writing bit lines are arranged. One of the 1024/n reading word lines is activated to select eight reading bit lines out of the 8×n reading bit lines. Eight bit data are read out and then outputted to the data output nodes DO0~DO7 via the reading circuit 44. One of the 1024/n writing word lines is activated to select eight writing bit lines out of the 8×n writing bit lines for selecting eight memory cells. A renewal data inputted from the data input nodes Dl0~Dl7 is provided with these selected eight memory cells via the writing circuit 45.

Referring back to FIG. 1, a probability estimating table storage device 5 comprises a plurality of address input nodes A, a plurality of data output nodes DO, and a probability estimating table storing portion. The probability estimating table storing portion for storing a probability estimating data comprising a plurality of bits is based on the probability table recommend by the ITU (International Telecommunication Union) recommendation T. 82. A probability estimation index in the prediction-index data from the above-mentioned context table storage device 4 is received in the address input nodes A. The probability estimating table storage device 5 reads out the probability estimating data stored in the probability estimating table storing portion corresponding to the address based on the received probability estimation index. The read-out data is outputted from the data output nodes DO. The probability estimating table storage device 5 comprises a ROM and so on.

The number of the address input nodes A is seven, for example, if the probability estimation index in the prediction-index data from the context table storage device 4 comprises seven bits. Each inputted probability estimation index corresponds to each address in the probability estimating table storing portion.

The probability estimating data comprises an LSZ (a less probable symbol size or coding interval) data, an NLPS data, an NMPS data and a SWITCH data. The LSZ data indicates a mismatching probability. This represents a value of the width (referred to as the LPS area width) given to the area of a least probable symbol (hereinafter it is referred to as the LPS, and this indicates that a prediction symbol of a prediction-index data from the context table storage device 4 does not match with a picture data for a picture element to be encoded from the storage device 1). For example, as shown in FIG. 6, one example of probability estimating table comprises 16 bit data for each probability estimation index.

When the LPS appears, the NLPS data changes the probability estimation index existing in the context. The NLPS data serves as a renewal data probability estimation index (indicating the next status number) at the address corresponding to the context when the LPS appears in the context table storage device 4. For example, as shown in FIG. 6, one example of probability estimating table comprises seven bit data for each probability estimation index.

NMPS data represents a most probable symbol (hereinafter it is referred to as the MPS). When the MPS symbol (this indicates that a prediction symbol in a prediction-index data from the context table storage device 4 matches with a picture data for a picture element to be encoded from the storage device 1) appears and a normalization (renormalize) occurs, the NMPS data changes the probability estimation index existing in the context. The NMPS data serves as a renewal data probability estimation index (indicating the next status number) at the address corresponding to the context when the MPS appears in the context table storage device 4. For example, as shown in FIG. 6, one example of probability estimating table comprises seven bit data for each probability estimation index.

The SWITCH data indicates whether or not to invert a prediction symbol of a prediction-index data stored in the context table storage device 4. The SWITCH data comprises 1-bit data, for example. If the SWITCH data is "1" when the LPS has appeared, the prediction symbol of a prediction-index data existing in the context when the LPS appears is inverted, and serves as a prediction symbol of a renewal data at the address corresponding to the context when the LPS appears.

The number of the data output nodes DO is 31, for example, if the LSZ data of the probability estimating data are 16 bits, NLPS data are seven bits, NMPS data are seven bits and SWITCH data is one bit. The probability estimating table storing portion is able to store the same number of the addresses as that of the probability estimation index. For example, the probability estimating table storing portions can store $2^7$ pieces of the probability estimating data, if the probability estimation index comprises seven bits. The probability estimating table storage device 5 comprises a ROM having a probability estimating table storing portion of 128 ($2^7$) rows, where each row comprises 31 bits, if LSZ data are 16 bits, NLPS data are seven bits, NMPS data are seven bits and SWITCH data is one bit.

A context comparator 6 in FIG. 1 compares a context from the context generator 2 and the context from the context storage device 3. If the resultant shows the same, the context comparator 6 outputs "1". Otherwise, it outputs "0".

Figure 7:
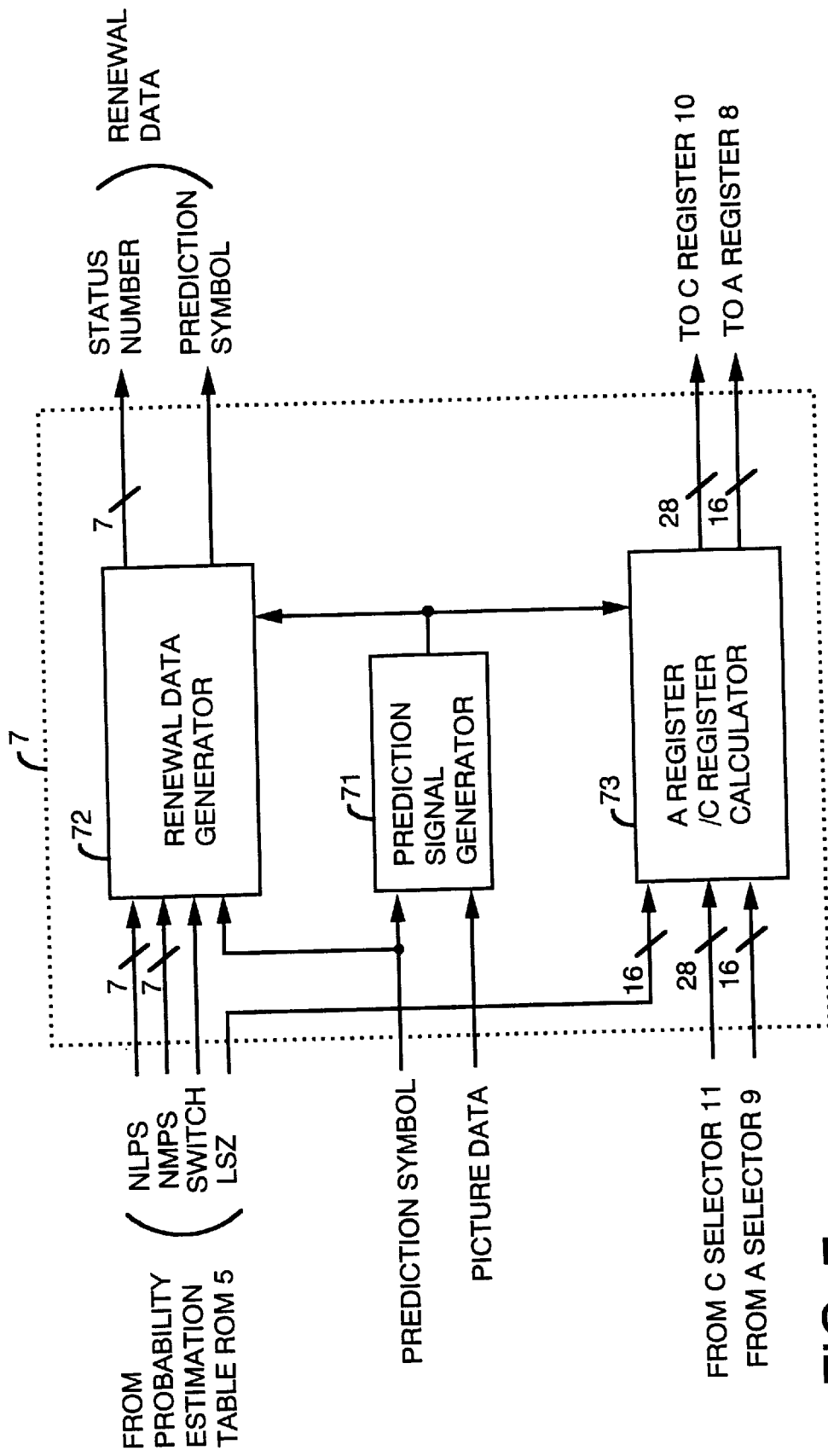
FIG. 7 is a block diagram showing an example of the arithmetic calculator 7 according to the first embodiment of the present invention.

An arithmetic calculator 7 receives a picture data for a picture element to be encoded from the storage device 1, a prediction symbol of a prediction-index data from the context table storage device 4, a probability estimating data from the probability estimating table storage device 5, an A data (hereinafter, referred to as immediately preceding A data) which shows a width A of the effective area for the picture elements immediately preceding picture element to be encoded, and a C data (hereinafter, referred to as immediately preceding C data) which shows a code word C for the picture element immediately preceding picture element to be encoded. The arithmetic calculator 7 conducts a predetermined arithmetic processing and outputs an A data (hereinafter, just referred to as A data) which shows a width A of the effective area for the picture element to be encoded and a C data (hereinafter, just referred to as C data) which shows a code word C for the picture element to be encoded. The arithmetic calculator 7 further outputs a renewal data including both the prediction symbol and the probability estimation index to the context table storage device 4. A detailed configuration of the arithmetic calculator 7 is shown in FIG. 7.

The predetermined arithmetic processing for obtaining A data and C data is done is described below.

When the MPS has appeared:

$$A(k)=A(k-1)-LSZ(k) \tag{1}$$

$$C(k)=C(k-1) \tag{2}$$

When the LPS has appeared:

$$A(k)=LSZ(k) \tag{3}$$

$$C(k)=C(k-1)+\{A(k-1)-LSZ(k)\} \tag{4}$$

[003 where, A (k) is an A data of the k-th picture element to be encoded, A (k−1) is an A data of the (k−1)-th picture element to be encoded, C (k) is a C data of the k-th picture element to be encoded, C (k−1) is a C data of the (k−1)-th picture element to be encoded, LSZ (k) is an LSZ data of a probability estimating data from the probability estimating table storage device 5 for the k-th picture element to be encoded, and k=1, 2, 3, . . . , the initial value A (0)=1.0 . . . 0, C (0)=0.0 . . . 0, for example.

In FIG. 7, a prediction conversion signal generator 71 receives a picture data for a picture element to be encoded from the storage device 1 and a prediction symbol of a prediction-index data for the picture element to be encoded from the context table storage device 4. The prediction conversion signal generator 71 outputs, for example, a signal "0" (above-mentioned MPS), which indicates that the picture data matches with the prediction symbol, when the two contexts match with each other. Otherwise, the prediction conversion signal generator 71 outputs, for example, a signal "1" (above-mentioned the LPS), which indicates that the picture data does not match with the prediction symbol . The prediction conversion signal generator 71 comprises a comparator such as an exclusive OR circuit.

A prediction symbol/probability estimation index generator 72 in FIG. 7 receives the SWITCH data, the NLPS data and the NMPS data of a probability estimating data for a picture element to be encoded from the probability estimating table storage device 5, a prediction symbol of a prediction-index data for the picture element to be encoded from the context table storage device 2 and a prediction conversion signal, i.e. the output signal from the prediction conversion signal generator 71. When the SWITCH data is "1", for example, and also the prediction conversion signal indicates LPS is "1", for example, the prediction symbol/ probability estimation index generator 72 inverts the value of the prediction symbol inputted, and outputs it as a prediction symbol of a renewal data from the context table storage device 4. If the combination of the values of the above-mentioned SWITCH data and the above-mentioned prediction conversion signal is otherwise, the prediction symbol/probability estimation index generator 72 outputs the value of the prediction symbol without inverting as a prediction symbol of the above-mentioned renewal. When the prediction conversion signal indicates LPS, the prediction symbol /probability estimation index generator 72 selects the NLPS data and outputted it as a probability estimation index (a status signal) of a renewal data for the context table storage device 4. If the prediction conversion signal shows MPS, or "0", for example , the prediction symbol/probability estimation index generator 72 selects the NMPS and outputs it as a probability estimation index (a status signal) of a renewal data for the context table storage device 4.

A calculator 73 in FIG. 7 receives the LSZ data of a probability estimating data for a picture element to be encoded from the probability estimating table storage device 5, the immediately preceding A data, the immediately preceding C data and the prediction conversion signal from the prediction conversion signal generator 71. The calculator 73 caries out the above-mentioned calculations shown by the equations (1)–(4) to output the A data and the C data. The calculator 73 comprises an A data generating portion where the LSZ data, the immediately preceding A data and the prediction conversion signal are received to output the A data, and a C data generating portion where the LSZ data, the immediately preceding A data, the immediately preceding C data and the prediction conversion signal are received to output the C data.

Referring back to FIG. 1, an A register 8 receives the A data from the arithmetic calculator 7, the picture element processing clock signal and a renormalizing clock signal. In synchronization with the inputted picture processing clock signal, the A register receives the A data from the arithmetic calculator 7 and latches them. In synchronization with the inputted renormalizing clock signal, the A register shifts-up the latched data by one bit and latches them again, and outputs them as the A data. The A register 8 outputs a renormalizing (normalization) signal for carrying out a normalization processing (extension of areas) and a last renormalizing signal indicating that normalization will be completed after one more normalization processing. A detailed configuration of the A register 8 is shown in FIG. 8.

Figure 8:
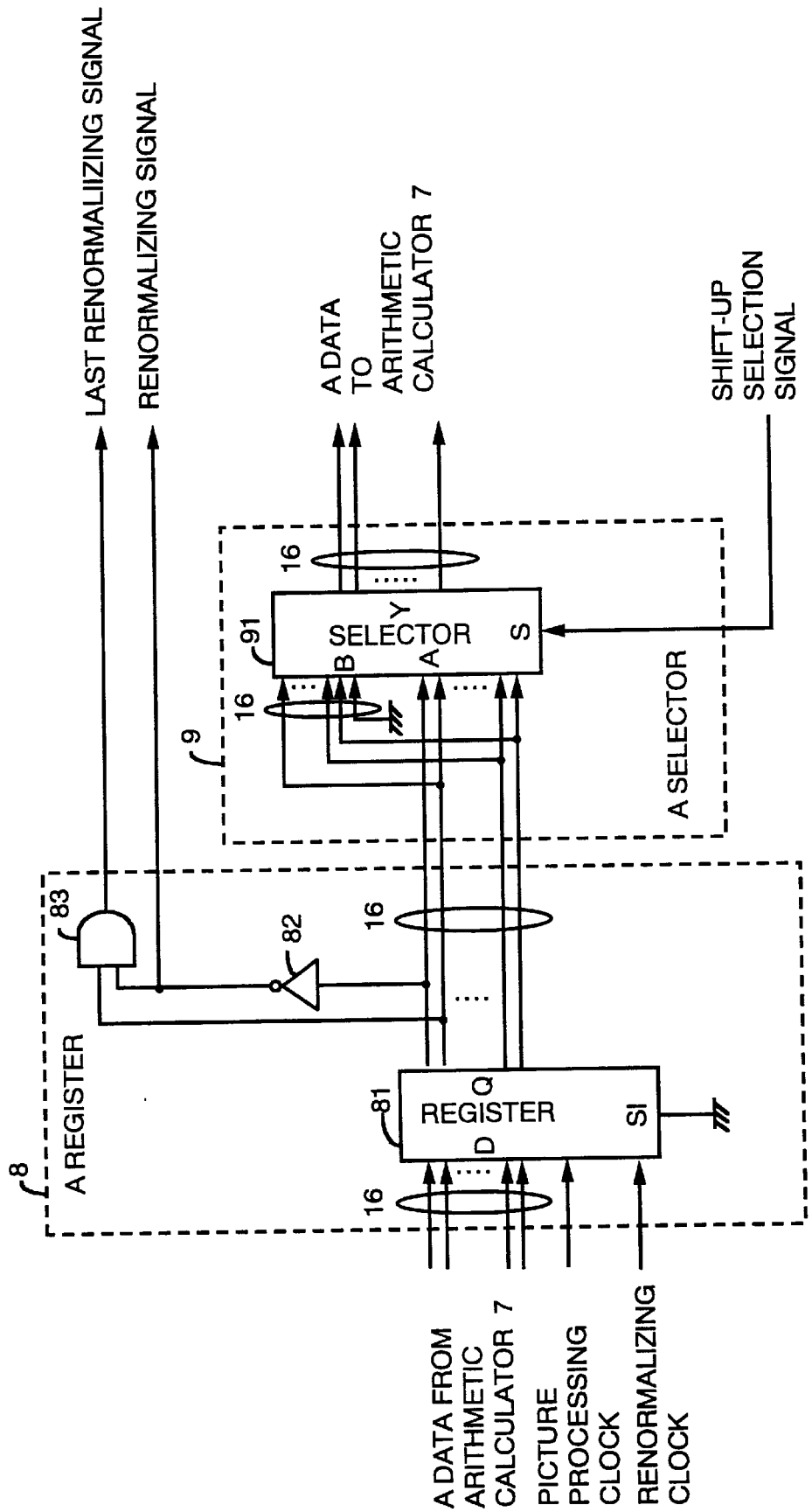
FIG. 8 is a block diagram showing an example of the A register 8 and the A selector 9 in the arithmetic calculator 7 according to the first embodiment of the present invention.

In FIG. 8, an A register portion 81 takes-in the A data from the arithmetic calculator 7 and latches it therein in synchronization with the inputted picture element processing clock signal. The register portion 81 comprises a shift register having 16 latch portions, which contents are all set to "0" in the 16 latch portions at its initial state. In synchronization with the inputted renormalizing clock signal, the register portion 81 shifts-up the data latched by one bit, and latches them again, and outputs them as the A data. If the A data comprises 16 bits, for example, the shift register can perform the data writing (data renewal) for every bit in synchronization with the picture element processing clock signal. Then, the shift register shifts-up the contents by one bit in synchronization with a renormalizing clock signal. In other words, the least significant bit is connected to the earth electric potential node and stores "0", while the contents in the remaining bits are renewed to the latch contents of the immediately preceding stage.

A renormalization generator 82 in FIG. 8 receives a most significant bit signal (hereinafter, referred to as MSB signal) of the A data which is outputted from the register portion 81. Based on the received MSB signal, the renormalization generator 82 outputs a renormalizing signal, indicating "prosecuting a normalization processing", when the width A of the effective area becomes less than 50%, namely, the A data becomes less than 0.5 in decimal number. The renormalization generator 82 comprises an invertor circuit which outputs "1", for example, indicating "prosecuting a normalization processing", if the MSB signal is "0".

A last renormalization generator 83 in FIG. 8 receives a signal (hereinafter, referred to as the MSB-1 signal) which is placed one bit lower from the most significant bit of the A data outputted from the register portion 81 and a renormalizing signal from the renormalization generator 82. When the renormalizing signal from the renormalization generator 82 indicates "prosecuting a normalization processing", and the MSB-1 signal is "1", for example, the last renormalization generator 83 outputs a last renormalizing signal. The last renormalization generator 83 comprises an AND circuit. When the MSB signal is "0" and the MSB-1 signal is "1", the AND circuit outputs "1" which indicates "the normalization processing will be completed by one more normalization processing".

Referring back to FIG. 1, an A selector 9 receives the A data from the A register 8 and a shift-up selection signal generated based on the last renormalizing signal. When the shift-up selection signal indicates "shift-up", the A selector 9 outputs a data which is shifted-up by one bit from the A register 8 to the arithmetic calculator 7 as an A data which shows the width A of the effective area of the picture elements immediately preceding the picture element to be encoded (an immediately preceding A data). Otherwise, the A selector 9 outputs the A data from the A register 8 as it is to the arithmetic calculator 7. The A selector 9, for example, as shown in FIG. 8, comprises a selector 91. The selector 91 has one input terminal A where the A data is received directly from the A register 8, and the other input terminal B where the A data from the A register 8 is received after the contents of the A data are shifted-up by one bit to the MSB side and its least significant bit is connected to an earth electric potential node. The selector 91 selects either one of the input terminal A and the input terminal B according to the shift-up selection signal, and outputs it to the output terminal Y.

A C register 10 in FIG. 1 receives a C data from the arithmetic calculator 7, the picture element processing clock signal and a renormalizing clock signal. In synchronization with the inputted picture processing clock signal, the C register receives the C data from the arithmetic calculator 7 and latches them. In synchronization with the inputted renormalizing clock signal, the C register shifts-up the latched data by one bit and latches them again, and outputs them as the C data.

Figure 9:
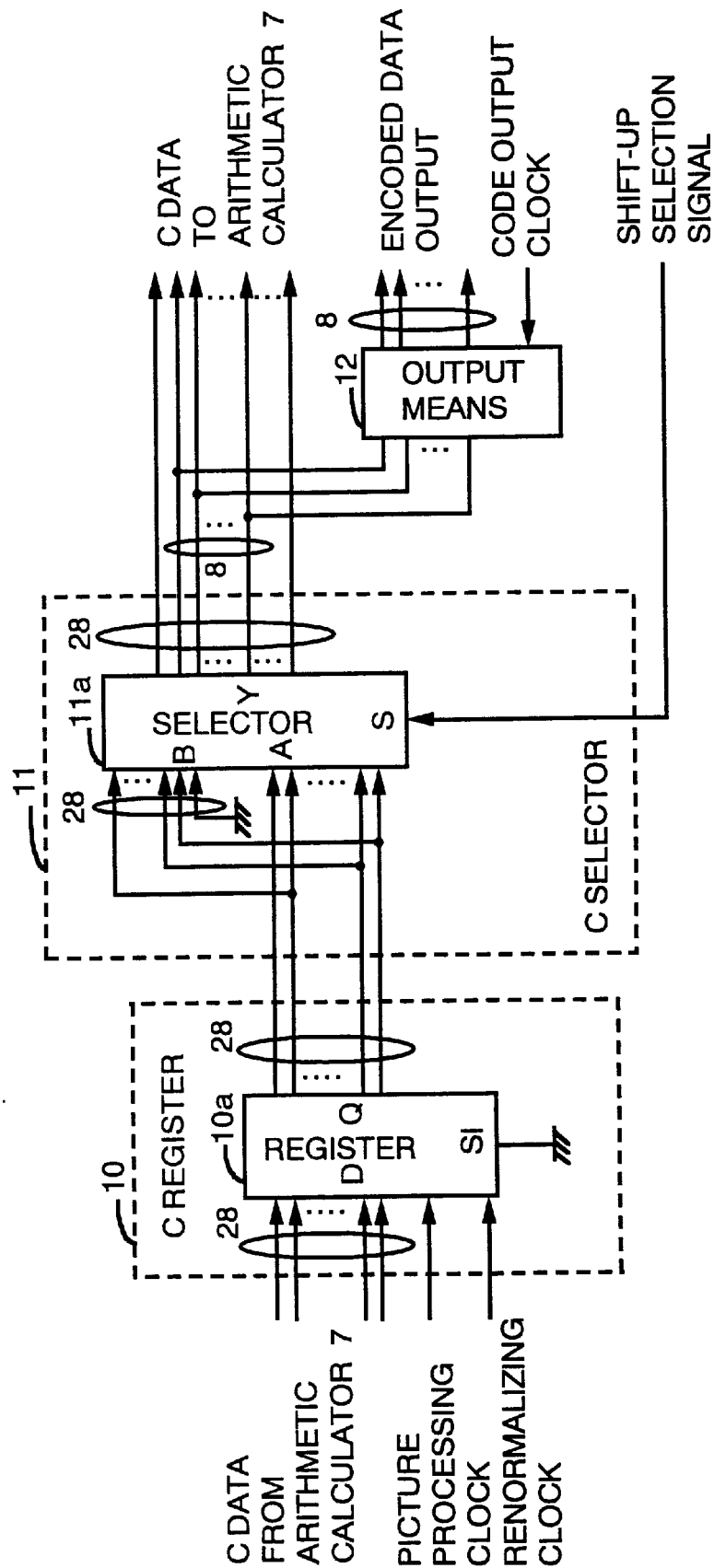
FIG. 9 is a block diagram showing an example of the C register 10 and the C selector 11 in the arithmetic calculator 7 according to the first embodiment of the present invention.

For example, as shown in FIG. 9, the C register 10 takes-in the C data from the arithmetic calculator 7 and latches in synchronization with the inputted picture element processing clock signal, then shifts-up the latched data by one bit and latches it again in synchronization with the inputted renormalizing clock signal, and then outputs it as a C data. The C register 10 comprises shift registers 10a which comprise twenty eight latch portions, if the C data comprises twenty eight bits, for example. The shift register 10a performs data writing (data renewal) in synchronization with the picture element processing clock signal and shifts-up the contents by one bit in synchronization with a renormalizing clock signal. In other words, the least significant bit is connected to the earth electric potential node and stores "0", while the contents of the remaining bits are rewritten to the contents of the latch of the preceding bit. At initial state, the stored contents in all the twenty eight latch portions are set "0", for example.

A C selector 11 receives the C data from the C register 10 and the shift-up selection signal. The C selector 11 outputs a data which is shifted-up by one bit from the C data, when the shift-up selection signal indicates "shift-up", and outputs a data as it is when the shift-up selection signal does not indicate "shift-up", to the arithmetic calculator 7 as a C data showing a code word for the picture element immediately preceding picture element to be encoded (an immediately preceding C data), and also as an encoded data for transmitting a predetermined number of significant bits.

The C selector 11, for example, as shown in FIG. 9, comprises a selector IIa. The selector 11a has one input terminal A where the C data is received directly from the C register 10, and the other input terminal B where the C data from the C register 10 is received after the contents of the C data are shifted-up by one bit to the MSB side and its least significant bit is connected to an earth electric potential node. The selector 11a selects either one of the input terminal A and the input terminal B according to the shift-up selection signal, and outputs it to the output terminal Y.

An output means 12 in FIG. 1 receives a predetermined number of most significant bits in the encoded data form the C selector 11 and a code output clock signal. In synchronization with the inputted code output clock signal, the output means 12 takes-in the predetermined number of significant bits in the encoded data form the C selector 11 and outputs the contents taken therein in synchronization with the inputted code output clock signal as an encoded data for transmission. For example, as shown in FIG. 9, the output means 12 has eight latch portions for taking-in eight significant bits of the C data as an encoded data if the C data comprises twenty eight bits.

A control portion 13 in FIG. 1 receives a system clock signal, an identical context signal from the context comparator 6, a renormalizing signal and a last renormalizing signal from the A register 8. The control portion 13 then outputs a picture element processing clock signal to the context generating circuit 2, the context storage device 3, the A register 8 and the C register 10. The control portion 13 further outputs a renewal clock to the context table storage device 4 and a renormalizing clock signal to the A register 8 and the C register 10. The control portion 13 further outputs a shift-up selection signal to the A selector 9 and the C selector 11 and a code output clock signal to the output means 12. A kernel portion comprises the arithmetic calculator 7, the A register 8, the A selector 9, the C register 10 and the C selector 11 and the control portion 13.

The picture element processing clock signal from the control portion 13 is a signal showing a timing for processing the data for the picture element to be encoded. The picture element processing clock signal is generated by the control portion 13 according to a system clock signal, a renormalizing signal, a last renormalizing signal and an identical context signal and synchronizes with a system clock signal. The picture element processing clock signal from the control portion 13 maintains either one of the levels, when the renormalizing signal indicates "prosecute a normalization processing", and the last renormalizing signal does not indicate "normalization will be completed by the last one processing". The picture element processing clock signal from the control portion 13 also maintains either one of the levels, when the renormalizing signal indicates "prosecute a normalization processing", the last renormalizing signal indicates "normalization will be completed by the last one processing", and the identical context signal indicates "identical context". Otherwise, the picture element processing clock signal from the control portion 13 becomes the same signal as the system clock signal.

For example, as shown in FIG. 11(b), when the renormalizing signal (FIG. 11(e)) is "1" indicating "prosecute a normalization processing", and the last renormalizing signal (FIG. 11(f)) is "0", not indicating "normalization will be completed by the last one processing", (where "1" indicates "H" level and "0" indicates "L" level in this first embodiment in the below, except some specific cases), the picture element processing clock signal from the control portion 13 becomes "H" level regardless of the system clock.

When the renormalizing signal is "1" indicating "prosecute a normalization processing", the last renormalizing signal is "1" indicating "normalization will be completed by the last one processing", and the identical context signal (FIG. 11(d)) is "1" indicating "identical context", the picture element processing clock signal from the control portion 13 becomes "H" level regardless of the system clock. Otherwise, the picture element processing clock signal from the control portion 13 becomes the same signal as the system clock signal.

The renormalizing signal shown in FIG. 11(e) is generated from the renormalizing signal from the A register 8 in synchronization with the system clock signal. It may be generated in the control portion 13.

For example, based on the renormalizing signal from the A register 8, the renormalizing signal of FIG. 11(e) is generated so that it synchronizes with the rising edge of the system clock. In other words, the renormalizing signal of FIG. 11(e) is generated in order to decide whether the picture element to be encoded is normalized or not at the subsequent timing of the system clock used when the context generator 2 takes-in a context for the picture element to be encoded.

Similarly, the last renormalizing signal shown in FIG. 11(f) is generated from the last renormalizing signal from the A register 8 in synchronization with the system clock signal. It may be generated in the control portion 13. For example, based on the last renormalizing signal from the A register 8, the last renormalizing signal of FIG. 11(f) is generated so that it synchronizes with the rising edge of the system clock. In other words, the last renormalizing signal of FIG. 11(f) is generated in order to specify the last normalizing signal at the subsequent timing of the system clock used when the context generator 2 takes-in a context for the picture element to be encoded.

The shift-up selection signal from the control portion 13 is generated in the control portion 13 according to the last renormalizing signal from the A register 8, the system clock signal and the identical context signal and synchronizes with the system clock signal. When the last renormalizing signal shown in FIG. 11(f) synchronized with the system clock signal indicates "normalization will be completed by the last one processing", and the identical context signal does not indicates "identical context", the shift-up selection signal indicates a "shift-up" state. Otherwise, the shift-up selection signal does not indicates the "shift-up" state.

For example, as shown in FIG. 11(i), when the last renormalizing signal shown in FIG. 11(f) is "1", indicating "normalization will be completed by the last one processing", and the identical context signal shown in FIG. 11(d) is "0" which does not indicates "identical context", the shift-up selection signal becomes "1" indicating a "shift-up" state. Otherwise, the shift-up selection signal becomes "0" which does not indicates the "shift-up" state.

The renewal clock signal from the control portion 13 is a signal showing a timing signal for renewing a prediction-index data stored in the context table storage device 4. The renewal clock signal from the control portion 13 is generated in the control portion 13 according to a system clock signal, a picture element processing clock signal and a renormalizing signal. The renewal clock signal synchronizes with a system clock signal, and becomes the system clock signal when the renormalizing signal indicates "prosecute a normalization processing" in the next cycle of the system clock signal after the appearance of the picture element processing clock signal. Otherwise, the renewal clock signal maintains either one of the levels.

For example, as shown in FIG. 11(g), when the rising of the picture element processing clock signal is detected and the renormalizing signal shown in FIG. 11(e) is "1" indicating "prosecute a normalization processing" at the rising of the system clock signal after the rising of the picture element processing clock signal is detected, the renewal clock signal becomes the same clock as that of the system clock. Otherwise, the renewal clock maintains "H" level, for example, regardless of the system clock.

The renormalizing clock signal, shown in FIG. 11(h), from the control portion 13 is a signal for shifting up the contents stored in the register portion 81 of the A register 8 and the C register 10. The renormalizing clock signal from the control portion 13 is generated in the control portion 13 according to a renormalizing signal and a last renormalizing signal from the A register 8, a system clock signal and an identical context signal and synchronizes with the system clock signal. When the renormalizing signal indicates "prosecute a normalization processing", and the last renormalizing signal does not indicate "normalization will be completed by the last one processing", the renormalizing clock signal becomes the same clock as the system clock signal ("set"). When the renormalizing signal indicates "prosecute a normalization processing", the last renormalizing signal indicates "normalization will be completed by the last one processing", and the identical context signal indicates "identical context", the renormalizing clock signal becomes the same clock as the system clock signal ("set"). Otherwise, the renormalizing clock signal becomes in a clock halt state (maintaining either one of the levels or "reset").

When the picture element processing clock signal of FIG. 11(b) outputs a clock synchronized with the system clock signal, the renormalizing clock signal maintains either one of the levels, and when the picture element processing clock signal maintains either one of the levels, the renormalizing clock signal outputs a clock synchronized with the system clock signal.

The code output clock signal in (FIG. 11(k)) from the control portion 13 shows a timing signal for taking-in the contents stored in the C register 10 to the output means 12 via the C selector 11, and for outputting it as an encoded data for transmission. The code output clock signal is generated in the control portion 13 according to a renormalizing signal from the A register 8 and a system clock signal. When the renormalizing signal indicates "prosecute a normalization processing", the code output clock signal becomes the same clock signal as the system clock signal. Otherwise, the code output clock signal becomes a pulse, when a predetermined number of clocks of the CT count clock signal is counted, according to a CT count clock signal maintaining either one of the levels (FIG. 11(j)). For example, as shown in FIG. 11(k), when the renormalizing signal is "1" indicating "prosecute a normalization processing", the code output clock signal firstly generates a count clock signal (for example, FIG. 11(j)) which becomes a system clock signal. When the number of the clocks of this count clock signal reaches eight, the code output clock signal becomes "L" level, for example, at the next cycle of the system clock signal.

An operation of a digital signal encoding apparatus constructed in the manner explained above is explained below.

The operating mode of the above digital signal encoding apparatus is divided into 5 modes I~V, as shown in FIG. 10. The operation in each mode is explained below using the waveforms shown in FIG. 11.

In mode I, there is no renormalization, i.e. normalization processing is not required in which the A data for picture element to be encoded indicates larger than 0.5 of decimal number.

In mode II, a renormalization is performed, i.e. a normalization processing is required in which the A data for the picture element to be encoded indicates value less than 0.5 in decimal number, the context for the picture element to be encoded does not match with the context for the picture element which is immediately subsequent to the picture element to be encoded, and renormalization is carried out once.

In mode III, a renormalization is performed, the context for the picture element to be encoded does not match with the context for a picture element which is immediately subsequent to the picture element to be encoded, and renormalization is carried out more than once.

In the mode IV, a renormalization is performed, the context for the picture element to be encoded matches with the context for a picture element which immediately subsequent to the picture element to be encoded, and renormalization is carried out once.

In the mode V, a renormalization is performed, the context for the picture element to be encoded matches with the context for a picture element which immediately subsequent to the picture element to be encoded, and renormalization is carried out more than once.

[Mode I]

Figure 11:
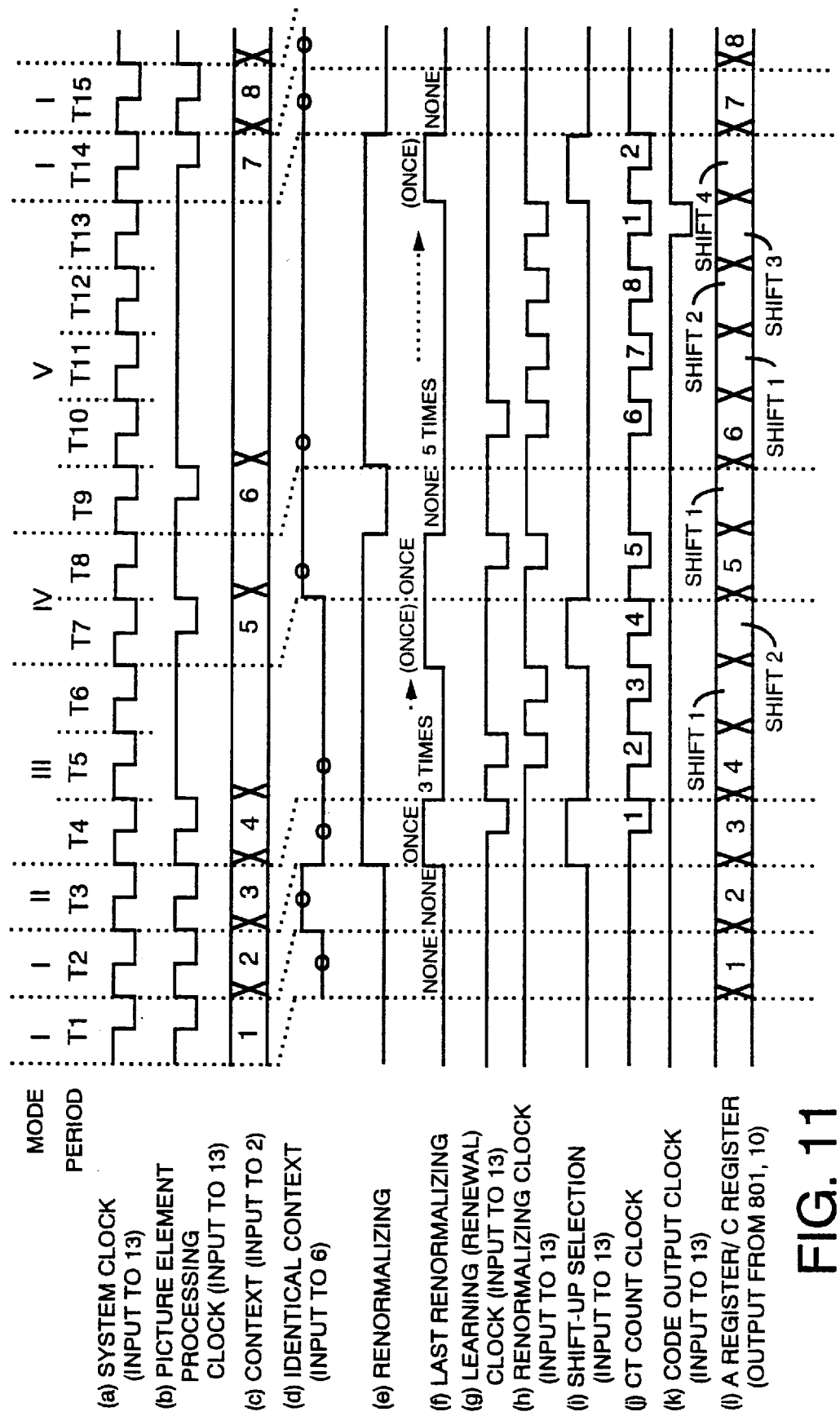
FIG. 11 is a waveform diagram showing signal waveforms in the main portions according to the first embodiment of the present invention.

FIG. 11 shows periods $T_1$ and $T_2$ of the system clock signal (a) which are examples of major signal waveforms in the mode I. In the period $T_1$, a context for the picture element to be encoded is not identical with the context for a picture element which is immediately subsequent to the picture element to be encoded. In the period $T_2$, a context for the picture element to be encoded is identical with the context for a picture element which is immediately subsequent to the picture element to be encoded.

First, it is assumed that an encoding processing has been done for the first picture element to be encoded during the period $T_1$ in the mode I. In the period $T_1$, a picture element processing clock signal is raised by the rise of the system clock. Receiving the rise of the picture element processing clock signal, the context generator 2 reads a context for the first picture element to be encoded from the storage device 1 and outputs the read context to the read address input nodes AR of the context storage device 4.

The code 1 in FIG. 11(c) indicates that a context has been generated by the context generator 2 for the first picture element to be encoded.

In the context storage device 4, an eight bit prediction-index data is read out according to the context inputted into the read address input nodes AR. A probability estimation index is outputted from the data output nodes DO to the address input nodes A of the probability estimating table storage device 5. A prediction symbol is outputted from the data output nodes DO to the arithmetic calculator 7.

Receiving the probability estimation index of the prediction-index data, the probability estimating table storage device 5 reads out 31-bit probability estimating data as shown in a probability estimating table in FIG. 6, and then outputs it from the data output nodes DO to the arithmetic calculator 7, according to the probability estimation index inputted to the address input nodes A.

In the prediction conversion signal generator 71 in the arithmetic calculator 7 (ref. FIG. 7), a prediction symbol of the prediction-index data and a picture data of the first picture element to be encoded are compared to generate a prediction conversion signal.

When this prediction conversion signal indicates that the prediction symbol matches with the picture data (indicates the MPS), the calculator 73 calculates an A data from an LSZ data from the probability estimating table storage device 5 and the A data of the picture elements to be encoded which precedes the first picture elements to be encoded, according to the above-mentioned equation (1). The calculated A data is outputted to the A register 8. The C data of the picture elements to be encoded which precedes the first picture elements to be encoded is outputted to the C register 10, according to the above-mentioned equation (2). When this prediction conversion signal indicates that the prediction symbol does not match with the picture data (indicates the LPS), the calculator 73 outputs the LSZ data from the probability estimating table storage device 5 to the A register 8 as an A data, according to the above-mentioned equation (3). The calculator 73 further calculates a C data from the LSZ data from the probability estimating table storage device 5 and both A and C data of the picture elements to be encoded which precedes the first picture elements to be encoded, according to the above-mentioned equation (4). The calculated C data is outputted to the C register 10.

Figure 12:
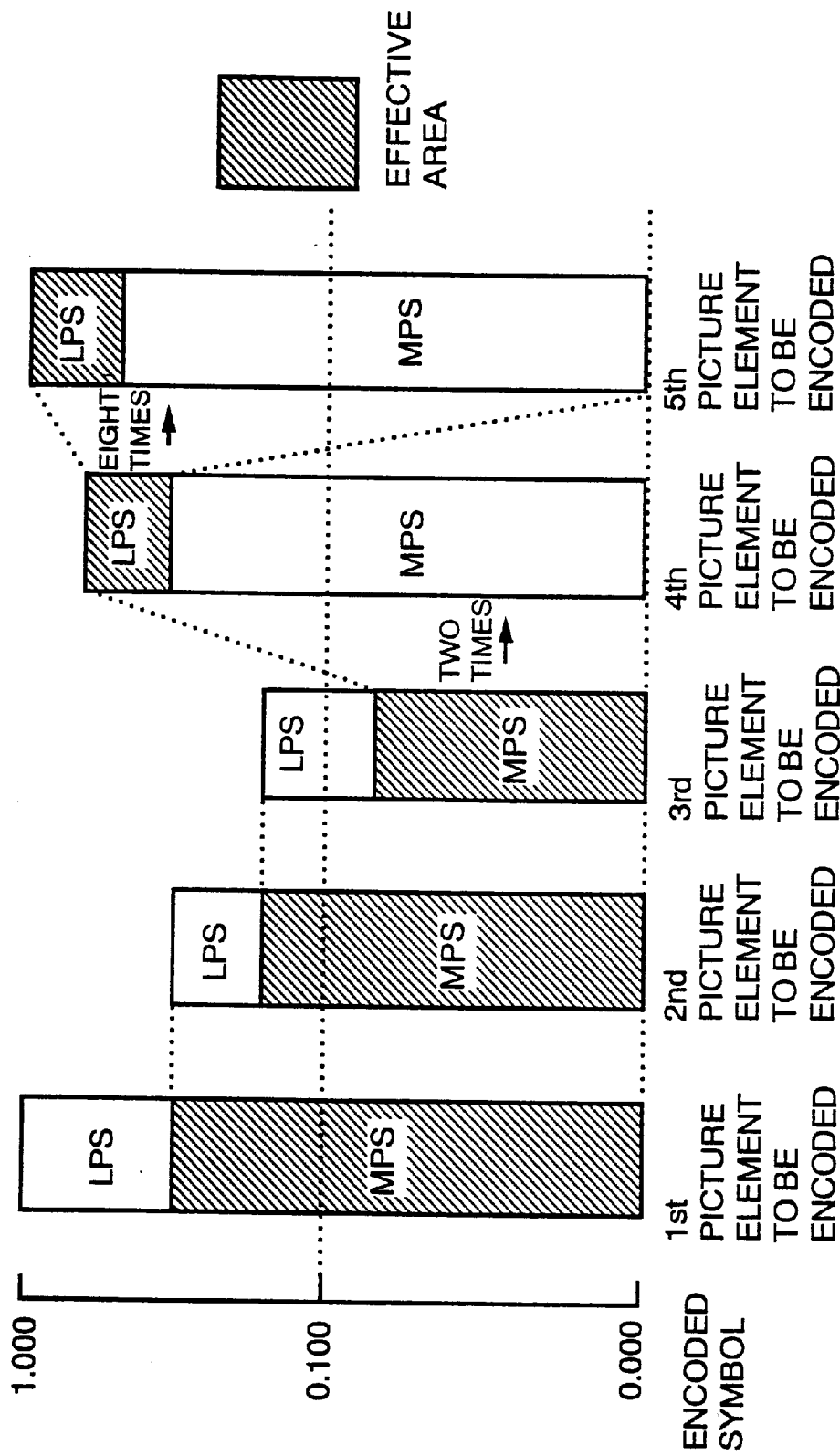
FIG. 12 is a diagram showing the concept of the A data and the C data according to the first embodiment of the present invention.

A concept of the A data and the C data at this stage is explained using the bar graph for the first picture elements to be encoded shown in FIG. 12. The bar graph for this first picture element to be encoded shows a case that a picture data matches with a prediction symbol. The contents stored in the A register 8 is assumed to be 1.000 . . . , and that of the C register 10 is assumed to be 0.000 . . . at an initial state. The width of the LPS corresponds to the value of the LSZ data for the first picture element to be encoded from the probability estimating table storage device 5. The width of the MPS corresponds to the value calculated by subtracting the width of the LPS from the contents stored in the A register 8. That is, the width of the MPS corresponds to the width of the effective area for the first picture element to be encoded.

In other words, the A data calculated and outputted by the calculator 73 has a value corresponding to the width of the MPS. The C data calculated and outputted by the calculator 73 has a value corresponding to the bottom of the effective area, namely, a value corresponding to the bottom of the MPS.

The A data and the C data calculated by the calculator 73 in this way are inputted to the register portion 81 of the A register 8 (ref. FIG. 8) and to the C register 10 (ref. FIG. 9), respectively, and stored therein (renewal of the stored contents) at the rising edge of a picture element processing clock signal from the control portion 13 (period $T_2$).

The A data which is stored in the register portion 81 of the A register 8 at this stage has a value larger than 0.5 in decimal number. Accordingly, the value of the most significant bit is "1", and a renormalizing signal "0" indicating "not prosecute a normalization processing" is outputted from renormalization generator 82 in the A register 8.

The last renormalization generator 83 in the A register 8 then outputs a last renormalizing signal "0".

On the other hand, receiving a context of the second picture element from the context generator 2 and a context of the first picture element to be encoded from the context storage device 3, the context comparator 6 outputs an "L" level identical context signal indicating that "the contexts do not match with each other" during the period $T_2$ as shown in FIG. 11(d).

Accordingly, during this period $T_2$, the mode is recognized. Here, it is recognized that no renormalization is performed, and the contexts do not match with each other and the mode I in the period $T_1$ has been completed for the period $T_1$.

Since recognizing the renormalization is not required in the mode I in the period $T_1$ during the period $T_2$, operations from a context generation to the arithmetic calculation are carried out during the mode I in the next period of $T_2$.

Accordingly, receiving a renormalizing signal from the renormalization generator 82 of the A register 8, the control portion 13 outputs a renewal clock signal and a renormalizing clock signal both having "H" level, in the period $T_2$ as shown in FIG. 11(g) and (h), respectively, because the received renormalizing signal is at "L" level. Receiving an "H" level renewal clock signal, the context table storage device 4 keeps its stored contents without renewal. Receiving an "H" level renormalizing clock signal, the register portion 81 of the A register 8 and the C register 10 does not shift-up the contents stored therein, and keep latching the received contents.

The code 1 in FIG. 11(l) indicates that the first picture elements to be encoded are latched to the A register 8 and the C register 10.

Since the control portion 13 maintains the renormalizing clock signal to "H" level, the CT count clock signal is maintained to "H" level too. The code output clock signal from the control portion 13 therefore, remains at "H" level. Accordingly, the output means 12 neither takes-in nor outputs the contents stored in the C register 10.

Accordingly, in the mode I in this period $T_1$, it takes only one clock (a cycle) of the system clock to carry out the procedures from a context generation to the arithmetic calculation for the picture element to be encoded. The A data and the C data calculated by the arithmetic calculator 7 are stored in the A register 8 and the C register 10, respectively and the prediction-index data in the context table storage device 4 are not renewed. As a result, substantial operating time in the period $T_1$ in the mode I takes no more than one system clock.

An operation in the mode I in the period $T_2$ is explained below. It is assumed that the encoding processing has been completed for the second picture element to be encoded in the mode I in the period $T_2$. The mode I in the period $T_2$ is different from the mode I in the period $T_1$ mentioned above only in that the context for the picture element to be encoded does not match or match with the context for the subsequent picture element to be encoded. The operation of the mode I in the period $T_2$ is the same as that of the mode I in the period $T_1$. It takes only one clock (cycle) of the system clock to carry out the context generation by the context generator 2 to the arithmetic calculation by the arithmetic calculator 7 for the second picture element to be encoded. The A data and the C data calculated by the arithmetic calculator 7 are stored in the A register 8 and the C register 10, respectively. The prediction-index data in the context table storage device 4 are not renewed. The output means 12 neither takes-in nor outputs the contents stored in the C register 10. As a result, the substantial operation is carried out only within one system clock in the mode I in the period $T_2$.

A concept of the A data and the C data at this stage is explained using the bar graph for the second picture element to be encoded shown in FIG. 12. The bar graph for this second picture element to be encoded indicates a case where a picture data matches with a prediction symbol. The contents stored in the A register 8 for the first picture element to be encoded corresponds to the width of the effective area of the MPS which is the same MPS as explained in the mode I in the period $T_1$. The contents stored in the C register 10 for the first picture element to be encoded has the value corresponding to the bottom of the MPS which is the same MPS as that explained in the mode I in the period $T_1$. The width of the LPS corresponds to the value of the LSZ data for the second picture element to be encoded from the probability estimating table storage device 5, which also corresponds to the value calculated by subtracting the width of the LPS from the contents stored in the A register 8. The width of the MPS corresponds to the width of the effective area for the second picture element to be encoded.

In other words, the A data for the second picture element to be encoded which is calculated and outputted by the arithmetic calculator 7 has a value corresponding to the width of the MPS. The C data for the second picture element to be encoded which is calculated and outputted by the arithmetic calculator 7 has a value corresponding to the bottom of the effective area, namely, the bottom of the MPS.

In the same manner as the recognition of the mode I in the period $T_1$, the mode I in the period $T_2$ is also recognized during the period $T_3$, namely, the subsequent clock in which the context generation is performed. By recognizing that no renormalization is performed and the contexts match with each other, the operation is performed from the context generation to the arithmetic calculation in the next mode, namely, the mode II in the period $T_3$.

[mode II]

FIG. 11 shows period $T_3$ of the system clock signal (a) which are examples of major signal waveforms in the mode II.

First, it is assumed that an encoding processing has been done for the third picture element to be encoded during the mode II in the period $T_3$. In the period $T_3$, a picture element processing clock signal is raised by the rise of the system clock. Receiving the rise of the picture element processing clock signal, the context generator 2 reads a context for the third picture element to be encoded from the storage device 1 and outputs the read context to the read address input nodes AR of the context storage device 4. The code 3 in FIG. 11(c) indicates that a context has been generated by the context generator 2 for the third picture element to be encoded.

In the context storage device 4, an eight bit prediction-index data is read out according to the context inputted into the read address input nodes AR. A probability estimation index is outputted from the data output nodes DO to the address input nodes A of the probability estimating table storage device 5. A prediction symbol is outputted from the data output nodes DO to the arithmetic calculator 7.

Receiving the probability estimation index of the prediction-index data, the probability estimating table storage device 5 reads out 31-bit probability estimating data as shown in a probability estimating table in FIG. 6, and then outputs it from the data output nodes DO to the arithmetic calculator 7, according to the probability estimation index inputted to the address input nodes A.

In the prediction conversion signal generator 71 in the arithmetic calculator 7 (ref. FIG. 7), a prediction symbol of the prediction-index data and a picture data of the picture element to be encoded are compared to generate a prediction conversion signal.

When this prediction conversion signal indicates that the prediction symbol matches with the picture data (indicates the MPS), the calculator 73 calculates an A data from an LSZ data from the probability estimating table storage device 5 and the A data of the second picture elements to be encoded, according to the above-mentioned equation (1). The calculated A data is outputted to the A register 8. The C data of the second picture elements to be encoded is outputted to the C register 10, according to the above-mentioned equation (2). When this prediction conversion signal indicates that the prediction symbol does not match with the picture data (indicates the LPS), the calculator 73 outputs the LSZ data from the probability estimating table storage device 5 to the A register 8 as an A data, according to the above-mentioned equation (3). The calculator 73 further calculates a C data from the LSZ data from the probabilty estimating table storage device 5 and both A and C data of the second picture elements to be encoded, according to the above-mentioned equation (4). The calculated C data is outputted to the C register 10.

A concept of the A data and the C data at this stage is explained using the bar graph for the third picture element to be encoded shown in FIG. 12. The bar graph for the third picture element to be encoded indicates that a picture data matches with a prediction symbol. The contents stored in the A register 8 for the second picture element to be encoded corresponds to the width of the effective area of the MPS which is the same MPS as that explained in the mode I in the period $T_2$. The contents stored in the C register 10 for the second picture element to be encoded has a value corresponding to the bottom of the MPS which is the same MPS as that explained in the mode I in the period $T_2$. The width of the LPS corresponds to the value of LSZ data for the third picture element to be encoded from the probability estimating table storage device 5. The width of the MPS corresponds to the value calculated by subtracting the width of the LPS from the contents stored in the A register 8 and is the width of the effective area for the third picture element to be encoded.

In other words, the A data calculated and outputted by the calculator 73 has a value corresponding to the width of the MPS. The C data calculated and outputted by the calculator 73 has a value corresponding to the bottom of the effective area, namely, a value corresponding to the bottom of the MPS.

The A data and the C data calculated by the calculator 73 in this way are inputted to the register portion 81 of the A register 8 (ref. FIG. 8) and to the C register 10 (ref. FIG. 9), respectively, and stored therein (renewal of the stored contents) at the rising edge of a picture element processing clock signal from the control portion 13 (period $T_4$).

In the period $T_3$, since a renormalization processing is not required in the mode In the period $T_2$, a renormalizing signal is "L" level as shown in FIG. 11(e), and the renewal clock signal and the renormalizing clock signal outputted from the control portion 13 are "H" level as shown in, FIG. 11(g) and (h), respectively.

Receiving an "H" level renewal clock signal, the context table storage device 4 keeps its stored contents without rewriting. Receiving an "H" level renormalizing clock signal, the register portion 81 of the A register 8 and the C register 10 does not shift-up the contents stored therein, and keep latching the received contents.

During the period $T_3$, since the control portion 13 maintains the renormalizing clock signal to "H" level, the CT count clock signal is maintained to "H" level too. The code output clock signal from the control portion 13 therefore, remains at "H" level. Accordingly,the output means 12 neither takes-in nor outputs the contents stored in the C register 10.

On the other hand, the A data calculated by the arithmetic calculator 7 and inputted in the register portion 81 of the A register 8 in the period $T_4$ has a value more than 0.25 and less than 0.5 in decimal number. Accordingly, the value of the most significant bit is "0", and the value which is one bit lower from the most significant bit is "1".

Accordingly, the renormalization generator 82 in the A register 8 outputs a renormalizing signal "1" indicating "prosecute a normalization processing", therefore, an "H" level renormalizing signal is obtained at the control portion 13 in the period $T_4$, as shown in FIG. 11(*e*).

The last renormalization generator 83 in the A register 8 outputs a last renormalizing signal "1" indicating "normalization will be completed by the last one processing". An "H" level last renormalizing signal is obtained at the control portion 13 in the period $T_4$, as shown in FIG. 11(*f*).

Receiving a context of the fourth picture element from the context generator 2 and a context of the third picture element to be encoded from the context storage device 3, the context comparator 6 outputs an "L" level identical context signal indicating that "the contexts do not match with each other" during the period $T_4$ as shown in FIG. 11 (*d*).

Accordingly, the mode II is recognized in this period $T_4$ in which the contexts are not identical and one renormalization processing has to be performed.

By this recognition, a renormalization processing is performed in the period $T_4$ shown in FIG. 11. In other words, the prediction-index data in the context table storage device 4 is renewed, and the A data in the A register 8 and the C data in the C register 10 are respectively shifted-up by one bit.

In this first embodiment, the context table storage device 4 comprises a two port RAM, in which the stored contents can be read out and written (renewed) within one clock of the system clock. Also in this first embodiment, when the A selector 9 and the C selector 11 receive the "H" level in the shift-up selection signal, the A selector 9 and the C selector 11 respectively select and output the data obtained by shifting up the A data latched in the A register 8 and the C data latched in the C register 10 by one bit, respectively. Accordingly in the first embodiment, the renormalization processing can be carried out in the first clock of the system clock in which the encoding processing for the next picture element to be encoded is performed, in concretely, in the period $T_4$ in the mode III shown in FIG. 11. This renormalization processing will be explained more in detail in the next explanation on the operation of the mode III.

Accordingly, in the mode II, it takes only one clock (a cycle) of the system clock to carry out the procedures from a context generation to the arithmetic calculation for the picture element to be encoded. The A data and the C data calculated by the arithmetic calculator 7 are stored in the A register 8 and the C register 10, respectively. The renormalization processing is performed in the first clock of the system clock in which an encoding processing for the next picture element to be encoded is performed. As a result, substantial operation in the mode II is carried out only within one system clock.

[mode III]

FIG. 11 shows periods $T_4$~$T_6$ of the system clock signal (a) which are examples of major signal waveforms in the mode III (it is assumed that the number of the renormalization processing is three).

First, it is assumed that an encoding processing has been done for the fourth picture element to be encoded during the period $T_4$ in the mode III. In the period $T_4$, a picture element processing clock signal is raised by the rise of the system clock. Receiving the rise of the picture element processing clock signal, the context generator 2 reads a context for the fourth picture element to be encoded from the storage device 1 and outputs the read context to the read address input nodes AR of the context storage device 4.

The code 4 in FIG. 11(*c*) indicates that a context has been generated by the context generator 2 for the fourth picture element to be encoded.

In the context storage device 4, an eight bit prediction-index data is read out according to the context inputted into the read address input nodes AR. A probability estimation index is outputted from the data output nodes DO to the address input nodes A of the probability estimating table storage device 5. A prediction symbol is outputted from the data output nodes DO to the arithmetic calculator 7.

Receiving the probability estimation index of the prediction-index data, the probability estimating table storage device 5 reads out 31-bit probability estimating data as shown in a probability estimating table in FIG. 6, and then outputs it from the data output nodes DO to the arithmetic calculator 7, according to the probability estimation index inputted to the address input nodes A.

On the other hand, since one renormalization processing is performed in the above-mentioned mode II, when the control portion 13 has therefore, receives "1" indicating "prosecute a normalization processing" from the renormalize generator 82 in the A register 8 and "1" indicating "normalization will be completed by the last one processing" from the last renormalization generator 83 in the A register 8, in the period $T_4$ of the first clock of the system clock in the mode III, the control portion 13 obtains a renormalizing signal and a last renormalizing signal, both "H" level, in the period $T_4$, respectively, as shown in FIG. 11(*e*) and (*f*). Also the control portion 13 generates a shift-up selection signal which rises in response to the rise of the system clock as shown in FIG. 11(*i*).

When the shift-up selection signal rises, receiving a shift-up selection signal indicating "normalization will be completed by the last one normalization processing", the A selector 9 selects the data obtained by shifting up the A data from the A register 8 by one bit, and also outputs it to the arithmetic calculator 7.

Similarly, receiving the shift-up selection signal, the C selector 11 selects the data obtained by shifting up the C data from the C register 10 by one bit, and outputs it to the arithmetic calculator 7.

In other words, the A data and the C data latched in the A register 8 and the C register 10 respectively are shifted-up by one bit in the mode II in this period $T_4$.

The A data latched in the A register 8 and the C data latched in the C register 10 in this period $T_4$ are resultants calculated in the mode II (period $T_3$) by the arithmetic calculator 7. In other words, since the renormalizing signal and also the last renormalizing signal become "H" level in the period $T_4$, a renormalizing clock signal becomes "H" level. Therefore, the contents stored in the A register 8 and the C register 10 are not shifted-up and kept unchanged. This state is shown in FIG. 11(*l*). The code 3 in FIG. 11(*l*) indicates that the A register 8 and the C register 10 are latched for the third picture element to be encoded.

In the prediction conversion signal generator 71 in the arithmetic calculator 7 (ref. FIG. 7), a prediction symbol of the prediction-index data and a picture data of the picture element to be encoded are compared to generate a prediction conversion signal.

In the prediction conversion signal generator 71 in the arithmetic calculator 7 (ref. FIG. 7), a prediction symbol of the prediction-index data and a picture data of the picture element to be encoded are compared to generate a prediction conversion signal.

When this prediction conversion signal indicates that the prediction symbol matches with the picture data (indicates the MPS), the calculator 73 calculates an A data from an LSZ data from the probability estimating table storage device 5 and the A data of the third picture elements to be encoded, namely, the data A shifted-up by one bit, according to the above-mentioned equation (1). The calculated A data is outputted to the A register 8. The C data of the third picture elements to be encoded, namely, the C data shifted-up by one bit, is outputted to the C register 10, according to the above-mentioned equation (2). When this prediction conversion signal indicates that the prediction symbol does not match with the picture data (indicates the LPS), the calculator 73 outputs the LSZ data from the probability estimating table storage device 5 to the A register 8 as an A data, according to the above-mentioned equation (3). The calculator 73 further calculates a C data from the LSZ data from the probability estimating table storage device 5 and both A and C data of the third picture elements to be encoded, namely, the A data and the C data shifted-up by one bit, respectively, according to the above-mentioned equation (4). The calculated C data is outputted to the C register 10.

A concept of the A data and the C data at this stage is explained using the bar graph for the fourth picture element to be encoded shown in FIG. 12. The bar graph for this fourth picture element to be encoded indicates that a picture data does not match with a prediction symbol. The contents stored in the A register 8 for the third picture element to be encoded corresponds to the width of the effective area of the MPS which is the same MPS as that explained in the mode II in the period $T_3$. The contents shifted-up by one bit (two times) corresponds to the substantial width of the effective area.

The contents stored in the C register 10 for the third picture element to be encoded has a value corresponding to the bottom of the MPS which is the same MPS as that explained in the mode II in the period $T_3$. The contents shifted-up by one bit corresponds to the substantial width of the effective area.

The width of the LPS corresponds to the value of the LSZ data for the fourth picture element to be encoded from the probability estimating table storage device 5. The width of the MPS corresponds to the value calculated by subtracting the width of the LPS from the value which is obtained by shifting up the contents stored in the A register 8 by one bit, and the width of the LPS corresponds to the width of the effective area for the fourth picture element to be encoded.

In other words, the A data calculated and outputted by the calculator 73 has a value corresponding to the width of the LPS, and the C data calculated and outputted by the calculator 73 has a value corresponding to the bottom of the effective area, namely, a value corresponding to the bottom of the LPS.

The A data and the C data calculated by the calculator 73 in this way are inputted to the register portion 81 of the A register 8 (ref. FIG. 8) and to the C register 10 (ref. FIG. 9), respectively, and stored therein (renewal of the stored contents) at the rising edge of a picture element processing clock signal from the control portion 13 (period $T_5$).

In this period $T_4$, since the mode II requires one renormalization processing, receiving the rise of a picture element processing clock and "1" indicating "prosecute a normalization processing" from the renormalization generator 82 in the A register 8, the control portion 13 outputs a renewal clock signal in synchronization with the system clock as shown in FIG. 11(g).

Receiving the fall of the renewal clock signal, the context table storage device 4 writes and stores a renewal data from the arithmetic calculator 7 on the context table storing portion in the address based on the context from the context storage device 3, received in the write address input nodes AW, namely, the context of the third picture element to be encoded in the mode II.

A renewal data from the arithmetic calculator 7 is explained with regard to a prediction symbol and a probability estimation index (a status number), respectively, using FIG. 7.

The prediction symbol generated by the prediction symbol/probability estimation index generator (renewal data generator) 72 has the same value as that of the prediction symbol of the prediction-index data for the third picture element to be encoded, regardless of the SWITCH data of the probability estimating data for the third picture element to be encoded, when a prediction conversion signal from the prediction conversion signal generator 71 indicates that a prediction symbol matches with a picture data (indicates the MPS). When the prediction conversion signal indicates that the prediction symbol does not match with the picture data (indicates the LPS), the prediction symbol becomes the same value obtained by inverting the value of the prediction symbol of the prediction-index data for the third picture element to be encoded, if the SWITCH data of the probability estimating data for the third picture element to be encoded is "1", and the prediction symbol becomes the same value as that of the prediction symbol of the prediction-index data for the third picture element to be encoded, if the SWITCH data is "0", .

A probability estimation index (a status number) generated by the prediction symbol/probability estimation index generator 72 becomes an NMPS data of the probability estimating data for the third picture element to be encoded, when a prediction conversion signal from the prediction conversion signal generator 71 indicates the MPS, and it becomes an NLPS data of the probability estimating data for the third picture element to be encoded, when a prediction conversion signal indicates the LPS.

A renewal data consisted of the prediction symbol and the probability estimation index generated in this manner by the arithmetic calculator 7 is written on the context table storing portion of the context table storage device 4 in the address based on the context of the third picture element to be encoded.

Figures 3A, 3B:
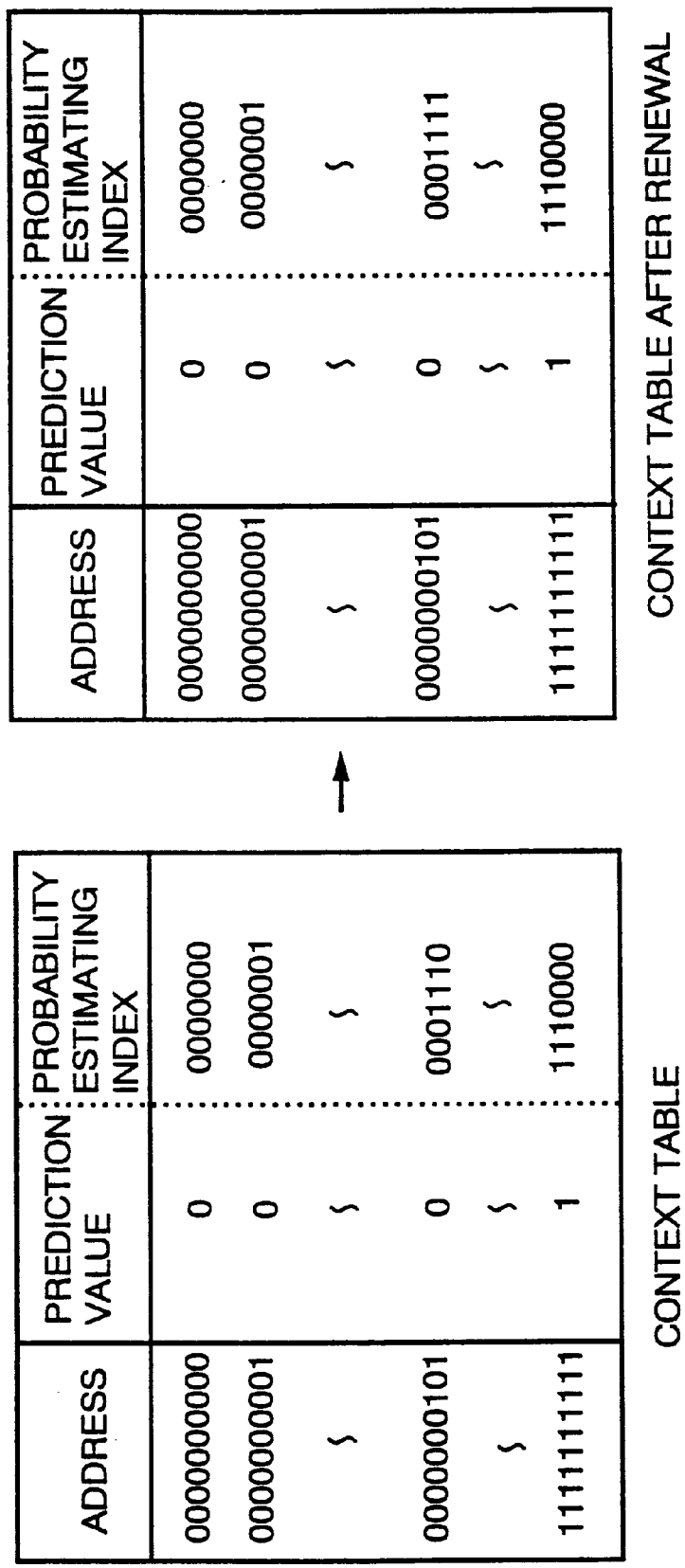
FIG. 3A, B are a diagram showing an example of a context table in the context table storage device 4, 104.

For example, in a context table shown in FIG. 3A, it is assumed that the context of the third picture element to be encoded is "0000000101", the prediction value of the prediction-index data stored in the context table storing portion in the address based on that context is "0", and the probability estimation index is "0001110". In this case, the SWITCH data of the probability estimating data stored in the probability estimating table storage device 5 in the address based on that probability estimation index is, for example, "1", LPS is, for example, "0001111" and NMPS is, for example, "0001111", as shown in FIG. 6.

At this stage, the prediction conversion signal from the prediction conversion signal generator 71 for the third picture element to be encoded indicates the MPS. Accordingly, even if the SWITCH data of the probability estimating data is "1", the prediction symbol from the prediction symbol/probability estimation index generator 72 becomes the same value as the prediction value of the prediction-index data for the third picture element to be encoded, namely, "0", and the probability estimation index from the prediction symbol/probability estimation index generator 72 becomes the same value as the NMPS, namely, "0001111". These values are given to the context table storage device 4 as a renewal data. As shown in the updated context table of FIG. 3B, in the context table storage device 4, both the prediction value "0" and the probability estimation index "0001111" are written in the address based on the context "0000000101" for the third picture element to be encoded.

Accordingly, in the period $T_4$ in this mode III, the procedures from a context generation to the arithmetic calculation for the fourth picture element to be encoded, and a renormalization processing for the third picture element to be encoded are carried out within one system clock (a cycle). That is, the prediction-index data in the context table storage device 4 is renewed and the A data latched in the A register 8 and the C data latched in the C register 10 are respectively shifted-up by one bit.

Since this mode III shows an example in which three renormalization processing are required, the A data which is the resultant calculated by the arithmetic calculator 7 taken into the register portion 81 of the A register 8 in the period $T_5$ becomes a value more than 0.0625 and less than 0.125 in decimal number. Accordingly, the value of most the significant bit becomes "0", and the next bit of the most the significant bit becomes "0".

Accordingly, a renormalizing signal "1" indicating "prosecute a normalization processing" is outputted from the renormalization generator 82 in the A register 8. As shown in FIG. 11(e), the control portion 13 therefore obtains an "H" level renormalizing signal in the period $T_5$.

The last renormalization generator 83 in the A register 8 outputs a last renormalizing signal "0" indicating "normalization will not be completed by the last one processing". An "L" level last renormalizing signal is obtained at the control portion 13 in the period $T_5$, as shown in FIG. 11(f).

Receiving a context of the fifth picture element from the context generator 2 and a context of the fourth picture element to be encoded from the context storage device 3, the context comparator 6 outputs an "L" level identical context signal indicating that "the contexts do not match with each other" during the period $T_5$ as shown in FIG. 11(d).

Accordingly, the mode III is recognized in this period $T_5$ in which the contexts are not identical and at least one renormalization processing has to be performed.

By this recognition, a renormalization processing is performed in the period $T_5$ shown in FIG. 11. In other words, the prediction-index data in the context table storage device 4 is renewed, and the A data in the A register 8 and the C data in the C register 10 are respectively shifted-up one bit.

As mentioned above, in this period $T_5$, at the rise of a picture element clock signal triggered by the rise of a system clock, the A data and the C data calculated for the fourth picture element to be encoded are taken into the A register 8 and to the C register 10 respectively and latched therein. Receiving the rise of the picture element processing clock signal, the context generator 2 reads the context for the fifth picture element to be encoded from the storage device 1 and outputs the read context to the read address input nodes AR in the context storage device 4 and to the context storage device 3.

The picture element processing clock signal however, maintains "H" level during this period $T_5$, since the renormalization generator 82 of the A register 8 outputs "1" indicating "prosecute a normalization processing" and the last renormalization generator 83 of the A register 8 outputs "0" indicating "normalization processing will not be completed by the last one processing". As a result, the A register 8 and the C register 10 shift none of the contents stored therein. The A data and the C data calculated for the fourth picture element to be encoded remains to be latched in the A register 8 and the C register 10, respectively.

On the other hand, when the control portion 13 receives "1" indicating "prosecute a normalization processing" from the renormalization generator 82 of the A register 8, the renormalizing clock signal generator is set, and the control portion 13 therefore, outputs a renormalizing clock signal in synchronization with the system clock signal.

Receiving the fall of this renormalizing clock signal, the A register 8 and the C register 10 shift up the A data and the C data by one bit, which are calculated by the arithmetic calculator 7 in the period $T_4$ for the fourth picture element to be encoded, respectively, and latch themselves again.

Since the control portion 13 receives "1" indicating "prosecute a normalization processing" from the renormalization generator 82 in the A register 8, the control portion 13 outputs a renewal clock signal in synchronization with the system clock as shown in FIG. 11(g).

Receiving the fall of the renewal clock signal, the context table storage device 4 writes and stores a renewal data from the arithmetic calculator 7 on the context table storing portion in the address based on the context from the context storage device 3, received in the write address input nodes AW, namely, the context of the fourth picture element to be encoded.

A renewal data from the arithmetic calculator 7 is explained with regard to a prediction symbol and a probability estimation index (a status number) respectively, using FIG. 7.

The prediction symbol generated by the prediction symbol/probability estimation index generator 72 has the same value as that of the prediction symbol of the prediction-index data for the fourth picture element to be encoded, regardless of the SWITCH data of the probability estimating data for the fourth picture element to be encoded, when a prediction conversion signal from the prediction conversion signal generator 71 indicates that a prediction symbol matches with a picture data (indicates the MPS). When the prediction conversion signal indicates that the prediction symbol does not match with the picture data (indicates the LPS), the prediction symbol becomes the same value obtained by inverting the value of the prediction symbol of the prediction-index data for the fourth picture element to be encoded, if the SWITCH data of the probability estimating data for the fourth picture element to be encoded is "1", and the prediction symbol becomes the same value as that of the prediction symbol of the prediction-index data for the fourth picture element to be encoded, if the SWITCH data is "0".

A probability estimation index (a status number) generated by the prediction symbol/probability estimation index generator 72 becomes an NMPS data of the probability estimating data for the fourth picture element to be encoded, when a prediction conversion signal from the prediction conversion signal generator 71 indicates the MPS, and it becomes an NLPS data of the probability estimating data for the fourth picture element to be encoded, when a prediction conversion signal indicates the LPS.

A renewal data consisting a prediction symbol and a probability estimation index generated in this manner by the arithmetic calculator 7 is written on the context table storing portion of the context table storage device 4 in the address based on the context of the fourth picture element to be encoded.

In this period $T_5$, the A data stored in the register portion 81 of the A register 8 has a value more than 0.125 and less than 0.25 in decimal number because it has been shifted-up by one bit. The value of the most significant bit is, however "0", and the value which is one bit lower from the most significant bit is "0".

Accordingly, the renormalization generator 82 in the A register 8 outputs a renormalizing signal "1" indicating "prosecute a normalization processing", therefore, an "H" level renormalizing signal is obtained at the control portion 13 in the period $T_6$, as shown in FIG. 11(e).

The last renormalization generator 83 in the A register 8 outputs a last renormalizing signal "0" indicating "normalization will not be completed by the last one processing". An "L" level last renormalizing signal is obtained at the control portion 13 in the period $T_6$, as shown in FIG. 11(f).

This means that in the next period $T_6$, the A data and the C data latched in the A register 8 and the C register 10 respectively are shifted-up by one bit in a renormalization processing.

Accordingly in the period $T_6$, when the control portion 13 receives "0" indicating "normalization processing will not be completed by the last one processing" from the last renormalization generator 83 of the A register 8, the renormalizing clock signal generator in the control portion 13 is not reset, the control portion 13 therefore outputs a renormalizing clock signal in synchronization with the system clock signal.

Receiving the fall of this renormalizing clock signal, the A register 8 and the C register 10 shift up the A data and the C data by one bit, which are shifted-up by one bit in the period $T_5$, respectively, and latch themselves again.

Since the last renormalization generator 83 outputs "0" indicating "normalization processing will not be completed by the last one processing", the picture element processing clock signal maintains "H" level even in this period $T_6$. Accordingly, the control portion 13 maintains the renewal clock signal at "H" level as shown in FIG. 11(g). As a result, the contents stored in the context table storage device 4 is not renewed.

In this period $T_6$, the A data stored in the register portion 81 of the A register 8 has a value more than 0.25 and less than 0.5 in decimal number, because it has been shifted-up by one bit. The value of the most significant bit is, however "0", and the value which is one bit lower from the most significant bit is "1". Accordingly, the renormalization generator 82 in the A register 8 outputs a renormalizing signal "1" indicating "prosecute a normalization processing", therefore, an "H" level renormalizing signal is obtained at the control portion 13 in the period $T_7$, as shown in FIG. 11(e).

The last renormalization generator 83 in the A register 8 outputs a last renormalizing signal "1" indicating "normalization will be completed by the last one processing". An "H" level last renormalizing signal is obtained at the control portion 13 in the period $T_7$, as shown in FIG. 11(f).

This means that in the next period $T_7$, the A data and the C data latched in the A register 8 and the C register 10 respectively, are shifted-up by one bit in a renormalization processing. This also means that the mode III is completed by the last one normalizing processing.

In other words, the last renormalization generator 83 in the A register 8 outputs "1" indicating "normalization will be completed by the last one processing". In the same manner as the operation in the mode II, the renormalization processing can be performed, at the first clock of the system clock in which an encoding processing for the next picture element to be encoded is performed, namely, the period $T_7$ in the mode IV shown in FIG. 11. This renormalization processing will be explained more in detail in the following explanation on the operation in the mode IV.

Accordingly, in the mode III, for the renormalization processings which are required for three times, the procedures from a context generation to the arithmetic calculation for the picture element to be encoded, take only one clock time (one cycle) of the system clock to carry out. The A data and the C data calculated by the arithmetic calculator 7, are stored in the A register 8 and the C register 10, respectively. The two renormalization processings need two clocks of the system clock to carry out. The last one renormalization processing is performed in the first clock of the system clock in which an encoding processing for the next picture element to be encoded is performed. As a result, substantial operating time in the mode III needs only three clocks of the system clock.

In the period $T_4$~$T_6$, since the control portion 113 maintains the renormalizing clock signal at "H" level, the CT count clock signal is maintained to the same clock signal as the system clock shown in FIG. 11(j). Since the CT count clock signal lasts, however, during three clocks, the code output clock signal from the control portion 13 remains "H" level. Accordingly, the output means 12 neither takes-in nor outputs the contents stored in the C register 10.

[mode IV]

FIG. 11 shows an example of major signal waveforms in the mode IV in the period of $T_7$~$T_8$ of the system clock signal (a). It is assumed that an encoding processing has been done for the fifth picture element to be encoded in the mode IV. In the period $T_7$, the context generator 2 has already (in period $T_5$) read the context for the fifth picture element to be encoded from the storage device 1 and has outputted the read context to the read address input nodes AR of the context storage device 4. The code 5 in FIG. 11(c) shows that a context has been generated by the context generator 2 for the fifth picture element to be encoded.

In the context storage device 4, an eight bit prediction-index data is read out according to the context inputted into the read address input nodes AR. A probability estimation index is outputted from the data output nodes DO to the address input nodes A of the probability estimating table storage device 5. A prediction symbol is outputted from the data output nodes DO to the arithmetic calculator 7.

Receiving the probability estimation index of the prediction-index data, the probability estimating table storage device 5 reads out a 31-bit probability estimating data as shown in probability estimating table in FIG. 6 and then outputs it from the data output nodes DO to the arithmetic calculator 7, according to the probability estimation index inputted into the address input nodes A.

On the other hand, since one renormalization processing is performed in the above-mentioned mode III in the period $T_7$, when the control portion 13 has therefore, receives "1" indicating "prosecute a normalization processing" from the renormalize generator 82 in the A register 8 and "1" indicating "normalization will be completed by the last one processing" from the last renormalization generator 83 in the A register 8, in the period $T_7$ of the first clock of the system clock in the mode IV, the control portion 13 obtains a renormalizing signal and a last renormalizing signal, both "H" level, in the period $T_7$, respectively, as shown in FIG.

11(e) and (f). Also the control portion 13 generates a shift-up selection signal which rises in response to the rise of the system clock as shown in FIG. 11(i).

When the shift-up selection signal rises, receiving a shift-up selection signal indicating "normalization will be completed by the last one normalization processing", the A selector 9 selects the data obtained by shifting up the A data from the A register 8 by one bit, and also outputs it to the arithmetic calculator 7. Similarly, receiving the shift-up selection signal, the C selector 11 selects the data obtained by shifting up the C data from the C register 10 by one bit, and outputs it to the arithmetic calculator 7.

In other words, the processing performed in this period $T_7$ is the same as the "shift-up" processing in the mode III in which the A data and the C data latched in the A register 8 and in the C register 10 respectively are shifted-up by one bit. As a result, three renormalization processings are performed in the mode III during the period $T_5 \sim T_7$. The A data and the C data therefore outputted from the A selector 9 and from the C selector 11 respectively are, shifts-up the A data and the C data calculated for the fourth picture element to be encoded in the period $T_4$ in the mode III by three bits. In other words, both the A data and the C data outputted from respective selectors become eight times as large as the A data and the C data calculated for the fourth picture element to be encoded.

In the prediction conversion signal generator 71 in the arithmetic calculator 7 (ref. FIG. 7), a prediction symbol of the prediction-index data and a picture data for a picture element to be encoded are compared to generate a prediction conversion signal.

When this prediction conversion signal indicates that the prediction symbol matches with the picture data (indicates MPS), the calculator 73 calculates an A data, from the LSZ data from the probability estimating table storage device 5 and the A data of the fourth picture element to be encoded, namely, the A data which is calculated for the fourth picture element to be encoded by shifting up by three bits, according to the above-mentioned equation (1), and outputs the calculated A data to the A register 8. According to the above-mentioned equation (2), the calculator 73 outputs the C data of the fourth picture element to be encoded, namely, the C data which is calculated for the fourth picture element to be encoded by shifting up by three bits, to the C register 10.

When this prediction conversion signal indicates the prediction symbol does not match with the picture data (indicates the LPS), the calculator 73 outputs the LSZ data from the probability estimating table storage device 5 to the A register 8 as an A data according to the above-mentioned equation (3). According to the above-mentioned equation (4), the calculator 73 calculates the C data from the LSZ data from the probability estimating table storage device 5, and both the A data and the C data of the fourth picture element to be encoded, namely, those obtained from the A data and the C data, which are calculated for the fourth picture element to be encoded, by shifting up by three bits. The calculated C data is outputted to the C register 10.

A concept of the A data and the C data at this stage is explained using the bar graph for the fifth picture element to be encoded shown in FIG. 12. The bar graph for this fifth picture element to be encoded indicates that a picture data does not match with a prediction symbol. The contents stored in the A register 8 for the fourth picture element to be encoded corresponds to the width of the effective area of the LPS which is the same LPS as that explained in the mode III in the period $T_6$ (the value obtained from the A data calculated for the fourth picture element to be encoded by shifting up it two bits). The state that the contents stored in the A register 8 has been shifted-up by one bit corresponds to the substantial width of the effective area of the LPS. The width of the LPS corresponds to the value of LSZ data for the fifth picture element to be encoded from the probability estimating table storage device 5. The width of the MPS corresponds to the value calculated by subtracting the width of the LPS from the value obtained by shifting up the contents stored in the A register 8 by one bit. The width of the LPS corresponds to the width of the effective area for the fifth picture element to be encoded.

In other words, the A data calculated and outputted by the calculator 73 has a value corresponding to the width of the LPS. The C data calculated and outputted by the calculator 73 has a value corresponding to the bottom of the effective area, namely, a value corresponding to the bottom of the LPS.

The A data and the C data calculated by the calculator 73 in this way are inputted to the register portion 81 of the A register 8 (ref. FIG. 8) and to the C register 10 (ref. FIG. 9) respectively, and stored therein (the stored contents in each register has been renewed) at the rising edge of a picture element processing clock signal from the control portion 13 (period $T_8$).

Although the control portion 13 receives "1" indicating "prosecute a normalization processing" from the renormalization generator 82 of the A register 8, the contents stored in the context table storage device 4 is not renewed because the renewal clock signal maintains "H" level in the period $T_7$.

Accordingly, in the period $T_7$ in the mode IV, the procedures from a context generation to the arithmetic calculation for the fifth picture element to be encoded, and a last renormalization processing for the fourth picture element to be encoded are carried out within one system clock (a cycle). That is, the processing which shifts-up the A data and the C data latched in the A register 8 and the C register 10, respectively, by one bit, are carried out within one system clock (one cycle).

Since this mode IV shows an example in which one renormalization processing is required, the A data stored in the register portion 81 of the A register 8, has a value more than 0.25 and less than 0.5 in decimal number. Accordingly, the value of its most significant bit becomes "0", and the next bit of the most the significant bit becomes "1".

Accordingly, a renormalizing signal "1" indicating "prosecute a normalization processing" is outputted from the renormalization generator 82. As shown in FIG. 11 (e), the control portion 13 obtains an "H" level renormalizing signal in the period $T_8$.

The last renormalization generator 83 in the A register 8 outputs a last renormalizing signal "1" indicating "normalization will be completed by the last one processing". An "H" level last renormalizing signal is obtained at the control portion 13 in the period $T_8$, as shown in FIG. 11(f).

Receiving a context of the sixth picture element from the context generator 2 and a context of the fifth picture element to be encoded from the context storage device 3, the context comparator 6 outputs an "H" level identical context signal indicating "the contexts match with each other" during the period $T_8$ as shown in FIG. 11(d).

Accordingly, the mode IV is recognized in this period $T_8$ in which the contexts are identical and one renormalization processing has to be performed.

By this recognition, a renormalization processing is performed in the period $T_8$ shown in FIG. 11. In other words, the prediction-index data in the context table storage device 4 is renewed, and the A data in the A register 8 and the C data in the C register 10 are respectively shifted-up one bit.

As mentioned above, in this period $T_8$, at the rise of a picture element clock signal triggered by the rise of a system clock, the A data and the C data calculated for the fifth picture element to be encoded are taken into the A register 8 and to the C register 10 respectively and latched therein. Receiving the rise of the picture element processing clock signal, the context generator 2 reads the context for the sixth picture element to be encoded from the storage device 1 and outputs the read context to the read address input nodes AR in the context storage device 4 and to the context storage device 3.

The picture element processing clock signal however, maintains "H " level in this period $T_8$, since the renormalization generator 82 of the A register 8 outputs "1" indicating "prosecute a normalization processing", the last renormalization generator 83 of the A register 8 outputs "1" indicating "normalization processing will be completed by the last one processing", and the identical context signal from the context comparator 6 shows that contexts are identical. The picture element processing clock signal maintains the "H" level during the period $T_8$. As a result, the contents stored in the A register 8 and in the C register 10 are not renewed. The A data and the C data calculated for the fifth picture element to be encoded remains to be latched in the A register 8 and in the C register 10.

On the other hand, when the control portion 13 receives "1" indicating "prosecute a normalization processing" from the renormalization generator 82 of the A register 8, the renormalizing clock signal generator is set, and the control portion 13 therefore, outputs a renormalizing clock signal in synchronization with the system clock signal.

Receiving the fall of this renormalizing clock signal, the A register 8 and the C register 10 shift up the A data and the C data by one bit, which are calculated by the arithmetic calculator 7 in the period $T_8$ for the fifth picture element to be encoded, respectively, and latch themselves again. Since the control portion 13 receives "1" indicating "prosecute a normalization processing" from the renormalization generator 82 in the A register 8, the control portion 13 outputs a renewal clock signal in synchronization with the system clock as shown in FIG. 11(g).

Receiving the fall of the renewal clock signal, the context table storage device 4 writes and stores a renewal data from the arithmetic calculator 7 on the context table storing portion in the address based on the context from the context storage device 3, received in the write address input nodes AW, namely, the context of the fifth picture element to be encoded.

A renewal data from the arithmetic calculator 7 is explained with regard to a prediction symbol and a probability estimation index respectively, using FIG. 7. The prediction symbol generated by the prediction symbol/ probability estimation index generator 72 has the same value as that of the prediction symbol of the prediction-index data for the fifth picture element to be encoded, regardless of the SWITCH data of the probability estimating data for the fifth picture element to be encoded, when a prediction conversion signal from the prediction conversion signal generator 71 indicates that a prediction symbol matches with a picture data (indicates the MPS). When the prediction conversion signal indicates that the prediction symbol does not match with the picture data (indicates the LPS), the prediction symbol becomes the same value obtained by inverting the value of the prediction symbol of the prediction-index data for the fifth picture element to be encoded, if the SWITCH data of the probability estimating data for the fifth picture element to be encoded is "1", and the prediction symbol becomes the same value as that of the prediction symbol of the prediction-index data for the fifth picture element to be encoded, if the SWITCH data is "0".

A probability estimation index (a status number) generated by the prediction symbol/probability estimation index generator 72 becomes an NMPS data of the probability estimating data for the fifth picture element to be encoded, when a prediction conversion signal from the prediction conversion signal generator 71 indicates the MPS and it becomes an NLPS data of the probability estimating data for the fifth picture element to be encoded, when a prediction conversion signal indicates the LPS.

A renewal data consisting a prediction symbol and a probability estimation index generated in this manner by the arithmetic calculator 7 is written on the context table storing portion of the context table storage device 4 in the address based on the context of the fifth picture element to be encoded.

In this period $T_8$, the A data stored in the register portion 81 of the A register 8 has a value more than 0.5 in decimal number, since it has been shifted-up by one bit. Accordingly, the value of the most significant bit becomes "1" .

Accordingly, the renormalization generator 82 in the A register 8 outputs a renormalizing signal "0" indicating "not prosecute a normalization processing", therefore, an "L" level renormalizing signal is obtained at the control portion 13 in the period $T_9$, as shown in FIG. 11(e).

The last renormalization generator 83 in the A register 8 outputs a last renormalization signal "0" indicating "normalization will not be completed by the last one processing". An "L" level last renormalizing signal is obtained at the control portion 13 in the period $T_9$, as shown in FIG. 11(f).

Accordingly, in the mode IV, it is meant that the renormalization processing has been already completed. For the renormalization processing which is required for once, the procedures from a context generation to the arithmetic calculation for the picture element to be encoded, take only one clock time (one cycle) of the system clock to carry out. The A data and the C data calculated by the arithmetic calculator 7, are stored in the A register 8 and the C register 10, respectively. One renormalization processing takes one clock of the system clock to carry out. As a result, substantial operating time in the mode IV need only two clocks of the system clock.

In the period $T_7 \sim T_8$, the renormalizing signal shown in FIG. 11(e) is "H" level. The control portion 13 therefore, makes the CT count clock signal the same clock signal as the system clock signal as shown in FIG. 11(j). However, since the CT count clock holds two clocks and the number of the clocks and the total number of the clock accumulated from the mode IV is 5, the code output clock signal from the control portion 13 remains "H" level. Accordingly, the output means 12 neither takes-in nor outputs the contents stored in the C register 11.

[Mode V]

FIG. 11 shows an example of major signal waveforms in the mode V in the period of $T_9 \sim T_{13}$ of the system clock signal (a).

It is assumed that an encoding processing has been done for the sixth picture element to be encoded in the mode V. In the period $T_9$, the context generator 2 has already read the context for the sixth picture element to be encoded from the storage device 1 and has outputted the read context to the read address input nodes AR of the context storage device 4.

The code 6 in FIG. 11(c) shows that a context has been generated by the context generator 2 for the sixth picture element to be encoded.

In the context storage device 4, an eight bit prediction-index data is read out according to the context inputted into the read address input nodes AR. A probability estimation index is outputted from the data output nodes DO to the address input nodes A of the probability estimating table storage device 5. A prediction symbol is outputted from the data output nodes DO to the arithmetic calculator 7.

Receiving the probability estimation index of the prediction-index data, the probability estimating table storage device 5 reads out a 31-bit probability estimating data as shown in probability estimating table in FIG. 6, and then outputs it from the data output nodes DO to the arithmetic calculator 7, according to the probability estimation index inputted into the address input nodes A.

On the other hand, since the processing has been already completed in the above-mentioned mode IV in the period $T_8$, the control portion 13 obtains a renormalizing signal of "L" level, and a last renormalizing signal, as shown in FIG. 11(*e*) and (*f*) respectively, and no renormalization processing is performed.

In the period $T_8$, since the picture element processing clock signal maintains "H" level, the picture element processing clock signal remains "H" level, even if the system clock rises in the period $T_9$. The A data and the C data latched in the register 8 and in the C register 10 are obtained from the A data and the C data calculated for the fifth picture element to be encoded by shifting up them one bit in the period $T_7$ which have been latched in the period $T_8$.

In the prediction conversion signal generator 71 in the arithmetic calculator 7 (ref. FIG. 7), a prediction symbol of the prediction-index data and a picture data for a picture element to be encoded are compared to generate a prediction conversion signal.

In the prediction conversion signal generator 71 in the arithmetic calculator 7 (ref. FIG. 7), a prediction symbol of the prediction-index data and a picture data of the picture element to be encoded are compared to generate a prediction conversion signal.

When this prediction conversion signal indicates that the prediction symbol matches with the picture data (indicates the MPS), the calculator 73 calculates an A data from an LSZ data from the probability estimating table storage device 5 and the A data of the fifth picture elements to be encoded, namely, the data A shifted-up by one bit, according to the above-mentioned equation (1). The calculated A data is outputted to the A register 8. The C data of the fifth picture elements to be encoded, namely, the C data shifted-up by one bit, is outputted to the C register 10, according to the above-mentioned equation (2). When this prediction conversion signal indicates that the prediction symbol does not match with the picture data (indicates the LPS), the calculator 73 outputs the LSZ data from the probability estimating table storage device 5 to the A register 8 as an A data, according to the above-mentioned equation (3). The calculator 73 further calculates a C data from the LSZ data from the probability estimating table storage device 5 and both A and C data of the fifth picture elements to be encoded, namely, the A data and the C data shifted-up by one bit, respectively, according to the above-mentioned equation (4). The calculated C data is outputted to the C register 10.

The A data and the C data calculated by the calculator 73 in this way are inputted to the register portion 81 of the A register 8 (ref. FIG. 8) and to the C register 10 (ref. FIG. 9) respectively, and stored therein (the stored contents in each register has been renewed) at the rising edge of a picture element processing clock signal from the control portion 13 (period $T_{10}$).

On the other hand, since the renewal clock signal from the control portion 13 maintains "H" level as shown in FIG. 11(*g*), the contents stored in the context table storage device 4 is not renewed.

Since this mode V shows an example in which five renormalization processing are required, the A data stored in the register portion 81 of the A register 8, has a value more than 0.15625 and less than 0.03125 in decimal number. Accordingly, the value of its most significant bit becomes "0", and the next bit of the most the significant bit becomes "0".

Accordingly, a renormalizing signal "1" indicating "prosecute a normalization processing" is outputted from the renormalization generator 82 in the A register 8. As shown in FIG. 11(*e*), the control portion 13 obtains an "H" level renormalizing signal in the period $T_{10}$.

The last renormalization generator 83 in the A register 8 outputs a last renormalizing signal "0" indicating "normalization will not be completed by the last one processing". An "L" level last renormalizing signal is obtained at the control portion 13 in the period $T_{10}$, as shown in FIG. 11(*f*).

Receiving a context of the seventh picture element from the context generator 2 and a context of the sixth picture element to be encoded from the context storage device 3, the context comparator 6 outputs an "H" level identical context signal indicating that "the contexts match with each other" during the period $T_{10}$ as shown in FIG. 11(*d*).

Accordingly, the mode V is recognized in this period $T_{10}$ in which the contexts are not identical and at least one renormalization processing has to be performed. By this recognition, a renormalization processing is performed in the period $T_{10}$ shown in FIG. 11. In other words, the prediction-index data in the context table storage device 4 is renewed, and the A data in the A register 8 and the C data in the C register 10 are respectively shifted-up one bit.

As mentioned above, in this period $T_{10}$, at the rise of a picture element clock signal triggered by the rise of a system clock, the A data and the C data calculated for the sixth picture element to be encoded are inputted to the A register 8 and to the C register 10 respectively and latched therein. Receiving the rise of the picture element processing clock signal, the context generator 2 reads the context for the seventh picture element to be encoded from the storage device 1 and outputs the read context to the read address input nodes AR in the context storage device 4 and to the context storage device 3.

The picture element processing clock signal however, maintains "H " level during this period $T_{10}$, since the renormalization generator 82 of the A register 8 outputs "1" indicating "prosecute a normalization processing" and the last renormalization generator 83 of the A register 8 outputs "0" indicating "normalization processing will not be completed by the last one processing". As a result, the A register 8 and the C register 10 shift none of the contents stored therein. The A data and the C data calculated for the sixth picture element to be encoded remains to be latched in the A register 8 and the C register 10, respectively.

On the other hand, when the control portion 13 receives "1" indicating "prosecute a normalization processing" from the renormalization generator 82 of the A register 8, the renormalizing clock signal generator is set, and the control portion 13 therefore, outputs a renormalizing clock signal in synchronization with the system clock signal.

Receiving the fall of this renormalizing clock signal, the A register 8 and the C register 10 shift up the A data and the C data by one bit, which are calculated by the arithmetic calculator 7 in the period $T_9$ for the sixth picture element to be encoded, respectively, and latch themselves again.

Since the control portion 13 receives "1" indicating "prosecute a normalization processing" from the renormalization generator 82 in the A register 8, the control portion 13 outputs a renewal clock signal in synchronization with the system clock as shown in FIG. 11(g).

Receiving the fall of the renewal clock signal, the context table storage device 4 writes and stores a renewal data from the arithmetic calculator 7 on the context table storing portion in the address based on the context from the context storage device 3, received in the write address input nodes AW, namely, the context of the sixth picture element to be encoded in this mode V.

A renewal data from the arithmetic calculator 7 is explained with regard to a prediction symbol and a probability estimation index (a status number) respectively, using FIG. 7.

The prediction symbol generated by the prediction symbol/probability estimation index generator 72 has the same value as that of the prediction symbol of the prediction-index data for the sixth picture element to be encoded, regardless of the SWITCH data of the probability estimating data for the sixth picture element to be encoded, when a prediction conversion signal from the prediction conversion signal generator 71 indicates that a prediction symbol matches with a picture data (indicates the MPS). When the prediction conversion signal indicates that the prediction symbol does not match with the picture data (indicates the LPS), the prediction symbol becomes the same value obtained by inverting the value of the prediction symbol of the prediction-index data for the sixth picture element to be encoded, if the SWITCH data of the probability estimating data for the sixth picture element to be encoded is "1", and the prediction symbol becomes the same value as that of the prediction symbol of the prediction-index data for the sixth picture element to be encoded, if the SWITCH data is "0".

A probability estimation index (a status number) generated by the prediction symbol/probability estimation index generator 72 becomes an NMPS data of the probability estimating data for the sixth picture element to be encoded, when a prediction conversion signal from the prediction conversion signal generator 71 indicates the MPS, and it becomes an NLPS data of the probability estimating data for the sixth picture element to be encoded, when a prediction conversion signal indicates the LPS.

A renewal data consisting a prediction symbol and a probability estimation index generated in this manner by the arithmetic calculator 7 is written on the context table storing portion of the context table storage device 4 in the address based on the context of the sixth picture element to be encoded.

In this period $T_{10}$, the A data stored in the register portion 81 of the A register 8 has a value more than 0.03125 and less than 0.0625 in decimal number because it has been shifted-up by one bit. The value of the most significant bit is however "0", and the value which is one bit lower from the most significant bit is "0".

Accordingly, the renormalization generator 82 in the A register 8 outputs a renormalizing signal "1" indicating "prosecute a normalization processing", therefore, an "H" level renormalizing signal is obtained at the control portion 13 in the period $T_{11}$, as shown in FIG. 11(e).

The last renormalization generator 83 in the A register 8 outputs a last renormalizing signal "0" indicating "normalization will not be completed by the last one processing". An "L" level last renormalizing signal is obtained at the control portion 13 in the period $T_{11}$, as shown in FIG. 11(f).

This means that in the period $T_{11}$, the A data and the C data latched in the A register 8 and the C register 10 respectively are shifted-up by one bit in a renormalization processing.

Accordingly in the period $T_{11}$, when the control portion 13 receives "0" indicating "normalization processing will not be completed by the last one processing" from the last renormalization generator 83 of the A register 8, the renormalizing clock signal generator in the control portion 13 is not reset, the control portion 13 therefore outputs a renormalizing clock signal in synchronization with the system clock signal.

Receiving the fall of this renormalizing clock signal, the A register 8 and the C register 10 shift up the A data and the C data by one bit, which are shifted-up by one bit in the period $T_{10}$, respectively, and latch themselves again.

Since the control portion 13 maintains the renewal clock signal at "H" level in this period $T_{11}$, the contents stored in the context table storage device 4 is not renewed.

In this period $T_{11}$, the A data stored in the register portion 81 of the A register 8 has a value more than 0.0625 and less than 0.125 in decimal number, because it has been shifted-up by one bit. The value of the most significant bit is however "0", and the value which is one bit lower from the most significant bit is also "0".

Accordingly, a renormalizing signal "1" indicating "prosecute a normalization processing" is outputted from the renormalization generator 82 in the A register 8. An "H" level renormalizing signal is obtained in the control portion 13 in the period $T_{12}$, as shown in FIG. 11(e).

A last renormalizing signal "0" indicating "normalization will not be completed by the last one processing" is outputted from the last renormalization generator 83 in the A register 8. An "L" level last renormalizing signal is obtained in the control portion 13 in the period $T_{12}$, as shown in FIG. 11(f).

This means that in the period $T_{12}$, the A data and the C data latched in the A register 8 and the C register 10 respectively are shifted-up by one bit in a renormalization processing.

Accordingly in the period $T_{12}$, the renormalizing clock signal generator in the control portion 13 is not reset because the control portion 13 has received "0" indicating "normalization processing will not be completed by the last one processing" from the last renormalization generator 83 in the A register 8. The control portion 13 therefore, outputs a renormalizing clock signal in synchronization with the system clock signal.

When the fall of this renormalizing clock signal is received by the A register 8 and the C register 10, the A data and C data latched therein, namely, the A data and C data already shifted-up by one bit in the period $T_{11}$, are again shifted-up by one bit, and latched again in the A register 8 and the C register 10 respectively.

Since the control portion 13 maintains the renewal clock signal at "H" level in this period $T_{12}$ as shown in FIG. 11(g), the contents stored in the context table storage device 4 is not renewed.

In this period $T_{12}$, the A data stored in the register portion 81 of the A register 8 has a value more than 0.0625 and less than 0.125 in decimal number, because it has been shifted-up by one bit. The value of the most significant bit is however "0", and the value which is one bit lower from the most significant bit is also "0".

Accordingly, a renormalizing signal "1" indicating "prosecute a normalization processing" is outputted from the renormalization generator 82 in the A register 8. An "H"

level renormalizing signal is obtained in the control portion 13 in the period $T_{13}$, as shown in FIG. 11(e).

A last renormalizing signal "0" indicating "normalization will not be completed by the last one processing" is outputted from the last renormalization generator 83 in the A register 8. An "L" level 1 last renormalizing signal is obtained in the control portion 13 in the period $T_{13}$ as shown in FIG. 11(f).

This means that in the period $T_{13}$, the A data and the C data latched in the A register 8 and the C register 10 respectively, are shifted-up by one bit in a renormalization processing.

Accordingly in the period $T_{13}$, the renormalizing clock signal generator in the control portion 13 is not reset because the control portion 13 has received "0" indicating "normalization processing will not be completed by the last one processing" from the last renormalization generator 83 of the A register 8. The control portion 13 therefore, outputs a renormalizing clock signal in synchronization with the system clock signal.

When the fall of this renormalizing clock signal is received by the A register 8 and the C register 10, the A data and C data latched therein, namely, the A data and C data already shifted-up by one bit in the period $T_{12}$, are again shifted-up by one bit, and latched again in the A register 8 and the C register 10 respectively.

Since the control portion 13 maintains the renewal clock signal at "H" level in this period $T_{13}$ as shown in FIG. 11(g), the contents stored in the context table storage device 4 is not renewed.

In this period $T_{13}$, the A data stored in the register portion 81 of the A register 8 has a value more than 0.25 and less than 0.5 in decimal number, because it has been shifted-up by one bit. Accordingly, the value of the most significant bit is "0", and the value which is one bit lower from the most significant bit is "1". Accordingly, a renormalizing signal "1" indicating "prosecute a normalization processing" is outputted from the renormalization generator 82 in the A register 8. An "H" level renormalizing signal is obtained in the control portion 13 in the period $T_{14}$, as shown in FIG. 11(e).

The last renormalization generator 83 in the A register 8 outputs a last renormalizing signal "1" indicating "normalization will be completed by the last one processing". An "H" level last renormalizing signal is obtained at the control portion 13 in the period $T_{14}$, as shown in FIG. 11(f).

This means that in the period $T_{14}$, the A data and the C data latched in the A register 8 and the C register 10 respectively are shifted-up by one bit in a renormalization processing. This also means that the mode V is completed by the last one normalizing processing.

In other words, since the last renormalization generator 83 outputs "1" indicating "normalization will be completed by the last one processing", the renormalization processing is completed in the first clock of the system clock in which an encoding processing for the next picture element to be encoded is performed, namely, in the period $T_{14}$ shown in FIG. 11.

In other words, receiving the rise of the system clock in the period $T_{14}$, the control portion 13 obtains a renormalizing signal and a last renormalizing signal, both "H" level, as shown in FIG. 11(e) and (f), respectively, and generates a shift-up selection signal, which rises by receiving the rise of the system clock as shown in FIG. 11(i).

When the shift-up selection signal rises, receiving a shift-up selection signal indicating "normalization will be completed by the last one normalization processing", the A selector 9 selects the data obtained by shifting up the A data from the A register 8 by one bit, and also outputs it to the arithmetic calculator 7. Similarly, receiving the shift-up selection signal, the C selector 11 selects the data obtained by shifting up the C data from the C register 10 by one bit, and outputs it to the arithmetic calculator 7.

In other words, the processing performed in this period $T_{14}$ is the same as the "shift-up" processing in the mode V in which the A data and the C data latched in the A register 8 and in the C register 10 respectively are shifted-up by one bit. As a result, five renormalization processing are performed in the mode V during the periods $T_{10} \sim T_{14}$. The A data and the C data which are outputted from the A selector 9 and from the C selector 11 are the same as those obtained from the A data and the C data, respectively, calculated for the sixth picture element to be encoded in the period $T_9$ in the mode V by shifting up them five bits.

Accordingly, in the mode V, for the renormalization processings which are required for five times, the procedures from a context generation to the arithmetic calculation for the picture element to be encoded, take only one clock time (one cycle) of the system clock to carry out. The A data and the C data calculated by the arithmetic calculator 7, are stored in the A register 8 and the C register 10, respectively. The four renormalization processings need four clocks of the system clock to carry out. The last one renormalization processing is performed in the first clock of the system clock in which an encoding processing for the next picture element to be encoded is performed. As a result, substantial operating time in the mode V needs only five clocks of the system clock.

In the periods $T_{10} \sim T_{13}$, since the control portion 13 maintains the renormalizing clock signal to "H" level, the CT count clock signal is maintained to the same clock signal as the system clock shown in FIG. 11(j). The control portion 13 outputs the four CT count clock signals. Accordingly, since there are five total clocks until the mode V, when the control portion 13 counts the same number of the bits of the encoded data for transmission, namely, eight bits in this first embodiment, the control portion 13 outputs a code output clock signal, which becomes "L" level in synchronization with the next system clock as shown in FIG. 11(k).

Receiving the code output clock signal from the control portion 13 when it falls to the "L" level, the output means 12 takes-in the C data outputted from the C selector 11. This C data, in other words, is the C data latched in the C register 10, or a part of the C data selectively outputted from those obtained by shifting up this C data latched in the C register 10 by one bit. In case of this first embodiment, the output means 12 takes-in the eight most significant bits and latches them. This C data consisting the eight most significant bits are then outputted as an encoded data.

In conclusion, with regard to the digital signal encoding apparatus having the above mentioned configuration, the number of the processing clocks of the system clock signal is as follows as shown in FIG. 10. In the mode I where there is no renormalization, that is, no normalization processing is required because the A data for a picture element to be encoded is equal or more than 0.5 in decimal number, the number of the processing clocks is one. In the mode II where a renormalization is performed, that is, a normalization processing is required because the A data for a picture element to be encoded is less than 0.5 in decimal number, the context for the picture element to be encoded does not match with the context for the picture element which is immediately subsequent to the picture element to be encoded, and renormalization occurs once, the number of the processing clocks is one. In the mode III where a renormalization is performed, the context for a picture element to be encoded does not match with the context for a picture element which is immediately subsequent to the picture element to be encoded, and renormalization occurs more than once, the number of the processing clocks is the same as that of the renormalization processing.

In the mode IV where a renormalization is performed, the context for a picture element to be encoded matches with the context for a picture element which is immediately subsequent to the picture element to be encoded, and renormalization occurs once, the number of the processing clocks is two.

In the mode V where a renormalization is performed, the context for a picture element to be encoded matches with the context for a picture element which is immediately subsequent to the picture element to be encoded, and renormalization occurs more than once, the number of the processing clocks is the same as that of the renormalization processing.

In other words, in the mode II, III and V, the last renormalization processing is performed together with the processing for the next picture element to be encoded at the first clock of the system clock for processing the next picture element to be encoded. Therefore, it is possible to substantially reduce the processing time as much as one clock, and speed up the encoding processing.

With regard to the digital signal encoding apparatus constructed in the above-mentioned manner, it is expected that the processing mode for the most of the picture element to be encoded will be mode II in case of the worst compression ratio for encoding (compression ratio is about 1). Even in this case, the operation time takes substantially no more than one clock of the system clock to complete the processing for the most of the picture element to be encoded. Accordingly, this can speed up the encoding processing.

The following is a more precise explanation on this point. An investigation has been done to know the relationship between the distribution and the compression ratio for the above-mentioned modes. In the investigation, a conventional CCITT facsimile chart is used as a character picture; a real picture and an artificially made picture data are used as a pseudo intermediate picture. The real picture is made from color standard picture (SCID) by means of a dither processing or an error scattering processing. The artificially made picture data is made by controlling the frequency of the LPS (Least Probable Symbol) to obtain a picture having an extreme high compression ratio. The experiment is performed with respect to each of the above-mentioned five modes.

In conclusion, it has been made clear that the ratio of the mode II becomes larger as the compression ratio becomes worse. The ratio of the mode II is 60% when the compression ratio is 1. In addition, the combined ratio of the mode I and II becomes more than 80% in most of the cases where the compression ratio is equal or less than 1. Since it takes no more than one clock to complete a processing for one picture element to be encoded in the mode I and II, this remarkably can speed up the encoding processing.

The total number of the processing clocks T necessary for encoding is calculated according to the following equation 1. The processing speed, namely, the processing clock per picture element, is obtained as about 1.3 clock/picture element when the compression ratio is 1.

$$T = P + \sum_{r=2}^{15}(r-1)^*N[\text{III } r] + N[\text{IV}] + \sum_{r=2}^{15}(r-1)^*N[\text{V } r]$$

where
    P: the number of picture elements/page
    N[IIIr]: the number of picture elements/page which satisfies the number of renormalization=r in the mode III
    N[IV]: the number of picture elements/page in the mode IV
    N[Vr]: the number of picture elements/page which satisfies the number of renormalization=r in the mode V Embodiment 2

Figure 13:
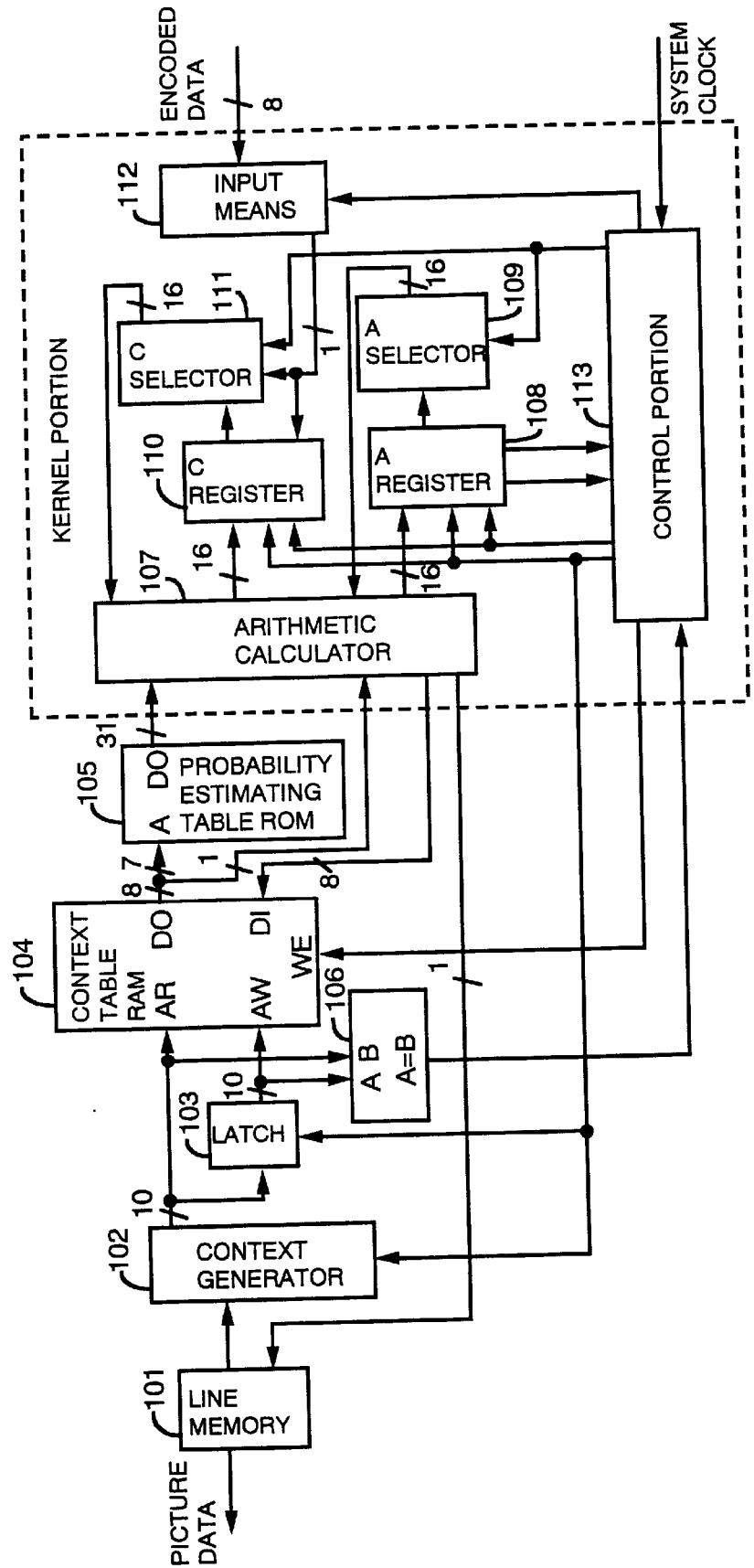
FIG. 13 is a block diagram showing a second embodiment of the present invention.

FIG. 13 shows a digital signal decoding apparatus integrated into a semiconductor integrated circuit which is applied, for example, to a facsimile apparatus of a second embodiment of the present invention. In FIG. 13, a storage device 101 stores a plurality of lines of decoded picture data for every one line, and outputs the stored picture data consisted of digital signals to a picture processing circuit which supplies the stored picture data as picture information (character information, pictorial information, pallet picture information) to a display device such as a printer apparatus. The storage device 101 comprises a plurality of line memories which are the same as the storage device 1 of the first embodiment.

A context generator 102 in FIG. 13 extracts a reference picture element according to a template model from the picture data inputted from the above-mentioned storage device. It is the same as the context generator 2 in the above mentioned digital signal encoding apparatus. A context storage device 103 in FIG. 13 comprises a latch circuit where a context for the picture element to be decoded which is received from the above-context generator 102 is temporarily stored in synchronization with the clock of the picture processing clock signal, and the temporarily stored context is outputted as a context for the picture element to be decoded in synchronization with the next clock of the above-mentioned picture processing clock signal. The context storage device 103 is the similar as the context storage device 3 in the above-mentioned digital signal encoding apparatus.

A context table storage device 104 of FIG. 1 comprises a read address input nodes AR for a plurality of addresses, a plurality of data output nodes DO, a plurality of a write address input nodes AW, a plurality of input nodes DI, a write-enable signal input node WE, and a context table storing portion where a plurality of prediction-index data are stored and written and read out. The context table storage device 4 reads out the prediction-index data stored in the context table storing portion based on the context which is received into the read address input nodes AR from the above-mentioned context generator 102, and then outputs from the data output nodes DO. Receiving a renewal clock signal on the write-enable signal input node WE, the context table storage device writes a renewal data inputted from the data input nodes DI (rewrite the renewal data over previously stored data) in the context table storing portion based on the context which is received on the write address input nodes AW which is transmitted from the above-mentioned context storage device 103. The context table storage means 104 comprises a two port RAM and so on and similar to the context table storage means 4 in the above-mentioned digital signal encoding apparatus.

A probability estimating table storage device 105 comprises a plurality of address input nodes A, a plurality of data output nodes DO, and a probability estimating table storing portion. The probability estimating table storing portion for storing a probability estimating data comprising a plurality of bits is based on the probability table recommend by the ITU (International Telecommunication Union) recommendation T. 82. A probability estimation index in the prediction-index data from the above-mentioned context table storage device 104 is received in the address input nodes A. The probability estimating table storage device 105 reads out the probability estimating data stored in the probability estimating table storing portion corresponding to the address based on the received probability estimation index. The read-out data is outputted from the data output nodes DO. The probability estimating table storage device 105 comprises a ROM and so on, similar to the probability estimating table storage device 105 in the above-mentioned digital encoding apparatus.

A context comparator 106 in FIG. 13 compares a context from the context generator 102 and the context from the context storage device 103. If the resultant shows the same, the context comparator 6 outputs "1". Otherwise, it outputs "0". The context comparator 106 is similar to the context comparator 6 in the above-mentioned digital encoding apparatus.

Figure 14:
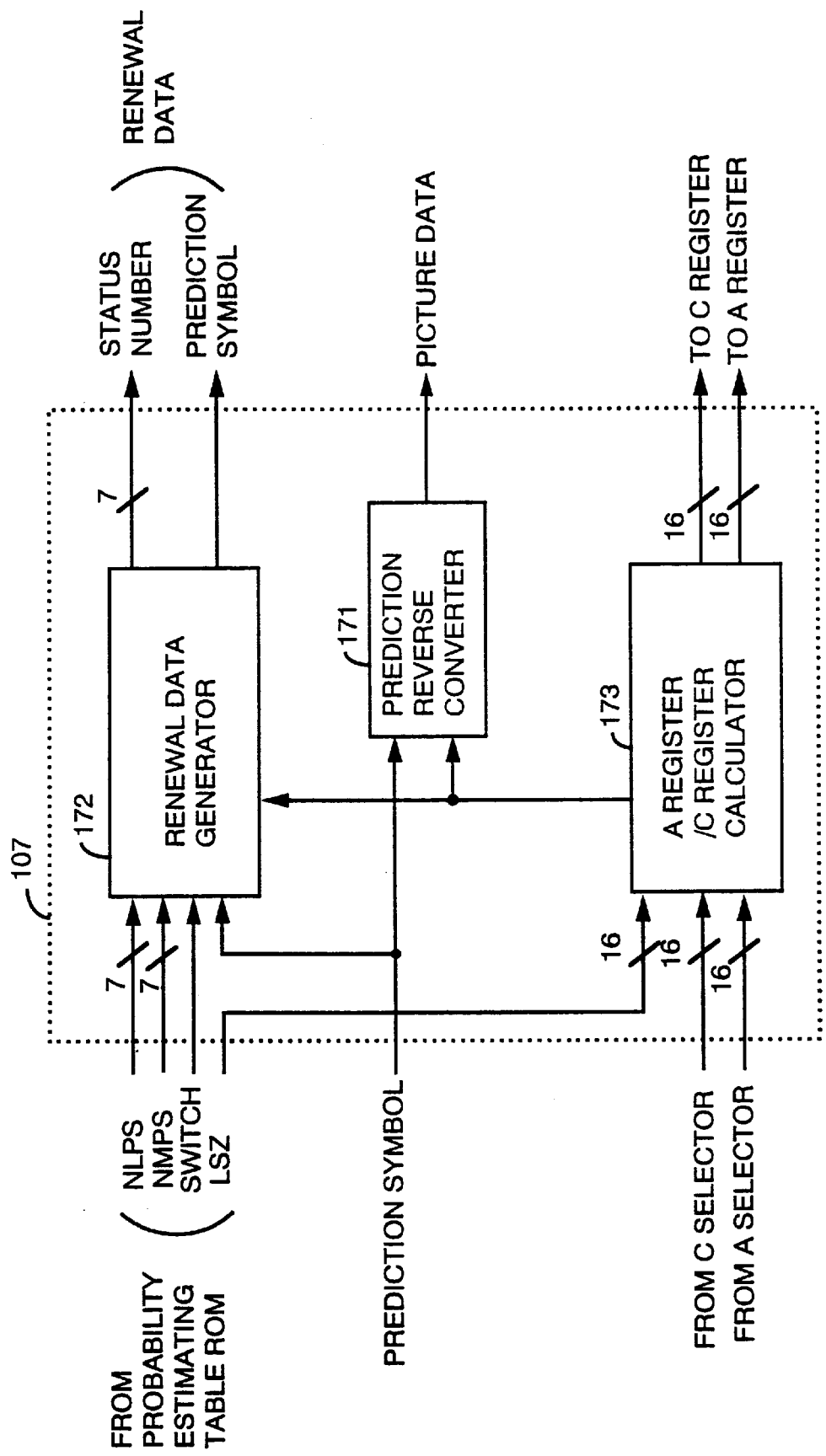
FIG. 14 is a block diagram showing an example of the arithmetic calculator 107 according to the second embodiment of the present invention.

An arithmetic calculator 107 in FIG. 13 receives a prediction symbol of a prediction-index data from the context table storage device 104, a probability estimating data from the probability estimating table storage device 105, an A data which shows a width A of the effective area for the picture element which immediately preceding picture element to be decoded (hereinafter, immediately preceding A data), and a C data which shows a decode word C for the picture element which immediately preceding picture element to be decoded (hereinafter, immediately preceding C data). The arithmetic calculator 107 performs a predetermined arithmetic processing and outputs an A data which shows the width A of the effective area for the picture element to be decoded (hereinafter just referred as A data) and a C data which shows the decode word C for the picture element to be decoded (hereinafter just referred as C data). The arithmetic calculator 107 further outputs a picture data for the picture element to be decoded to the above-mentioned storage device 101. The arithmetic calculator 107 further outputs a renewal data including both the prediction symbol and the probability estimation index to the context table storage device 104. A detailed configuration of the arithmetic calculator 107 is shown in FIG. 14.

The predetermined arithmetic processing for obtaining A data and C data is done is described below.

$$C(k-1) < A(k-1) - LSZ(k) \quad (5)$$

When the equation (5) is satisfied (decoding as an MPS):

$$A(k) = A(k-1) - LSZ(k) \quad (6)$$

$$C(k) = C(k-1) \quad (7)$$

When the equation (5) is not satisfied (decoding as an LPS):

$$A(k) = LSZ(k \quad (8)$$

$$C(k) = C(k-1) + \{A(k-1) - LSZ(k)\} \quad (9)$$

where, A (k) is an A data of the k-th picture element to be decoded, A (k−1) is an A data of the (k−1)-th picture element to be decoded, C (k) is a C data of the k-th picture element to be decoded, C (k−1) is a C data of the (k−1)-th picture element to be decoded, LSZ (k) is an LSZ data in a probability estimating data from the probability estimating table storage device 105 for the k-th picture element to be decoded, k=1, 2, 3, . . . The initial value A (0)=1.0 . . . 0, and the initial value C (0), for example, is a decoded data consisted of 16 bits.

In FIG. 14, a picture data generator (prediction inverse conversion means) 171 receives a prediction symbol of a prediction-index data for the picture element to be decoded from the context table storage device 104 and a prediction conversion signal. When the prediction conversion signal, which shows whether the above-mentioned equation (5) is satisfied ("1", for example) or not ("0", for example), matches the prediction symbol, the picture data generator 171 outputs a picture data "0", for example, to the storage device 101. The picture data generator 171 outputs a picture data "1", for example, to the storage device 101, when the prediction conversion signal does not match with the prediction symbol. The picture data generator 171 comprises a comparator such as an exclusive OR circuit, for example.

A prediction symbol/probability estimation index generator (a renewal data generator) 172 in FIG. 14, receives a SWITCH data, an NLPS data and an NMPS data of a probability estimating data for a picture element to be decoded from the probability estimating table storage device 105, a prediction symbol of a prediction-index data for the picture element to be decoded from the context table storage device 102 and the prediction conversion signal. When the SWITCH data is "1", for example, and the prediction conversion signal shows that the above-mentioned equation (5) is not satisfied (in other words, the value of the prediction symbol shows a combination of "1", for example), the inputted value of the prediction symbol is inverted. The prediction symbol, after its value was inverted, is outputted as a prediction symbol of a renewal data from the context table storage device 104. If the combination of the values of the above-mentioned SWITCH data and the above-mentioned prediction conversion signal is otherwise, the value of the prediction symbol, not being inverted, is outputted as a prediction symbol of the above-mentioned renewal data. Moreover, when the prediction conversion signal indicates the above-mentioned equation (5) is not satisfied, the LPS data is selected and outputted as a probability estimation index (a status signal) of a renewal data from the context table storage device 104. If the prediction conversion signal is "0" for example indicating that the above-mentioned equation (5) is satisfied, the NMPS data is selected and outputted as a probability estimation index (a status signal) of a renewal data from the context table storage device 104.

A calculator 173 receives the LSZ data of a probability estimating data for a picture element to be decoded from the probability estimating table storage device 105, the immediately preceding A data, and the immediately preceding C data. The calculator 173 carries out the above-mentioned arithmetic processing shown by the equations (5)–(9) and outputs a prediction conversion signal, as well as an A data and a C data, to the picture data generator 171 and to the prediction symbol /probability estimation index generator 172. The calculator 173 comprises a prediction conversion signal generating portion where the LSZ data, the immediately preceding A data and the immediately preceding C data are received and a prediction conversion signal is outputted according to the equation (5), an A data generating portion where the LSZ data, the immediately preceding A data and the above-mentioned prediction conversion signal are received and A data is outputted, and a C data generating portion where the LSZ data, the immediately preceding A data, the immediately preceding C data and the above-mentioned prediction conversion signal are received and C data is outputted.

Referring back to FIG. 13, an A register 108 receives an A data from the arithmetic calculator 107, the picture element processing clock signal and a renormalizing clock signal. In synchronization with the inputted picture processing clock signal, the A register receives the A data from the arithmetic calculator 7 and latches them. In synchronization with the inputted renormalizing clock signal, the A register shifts-up the latched data by one bit and latches them again, and outputs them as the A data. The A register 108 outputs a renormalize (normalization) signal for performing a normalization processing (extension of areas) and a last renormalizing signal indicating that normalization will be completed after one more normalization processing. A detailed configuration of the A register 108 is shown in FIG. 15.

Figure 15:
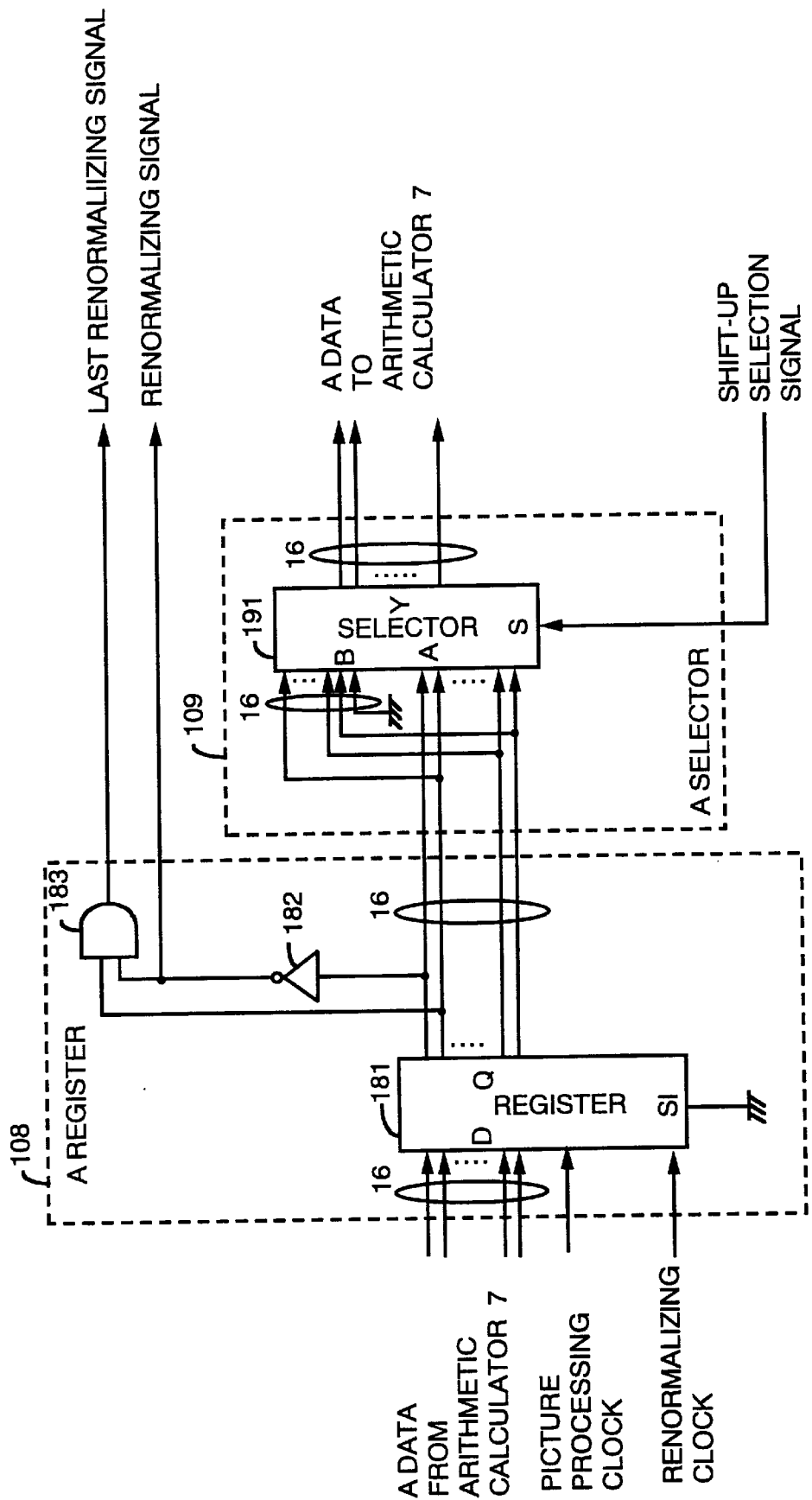
FIG. 15 is a block diagram showing an example of the A register 108 and the A selector 109 in the arithmetic calculator 107 according to the second embodiment of the present invention.

In FIG. 15, an A register portion 181 takes-in the A data from the arithmetic calculator 107 and latches it therein in synchronization with the inputted picture element processing clock signal. In synchronization with the inputted renormalizing clock signal, the register portion 181 shifts-up the data latched by one bit, and latches them again, and outputs them as the A data. If the A data comprises 16 bits, for example, the shift register can perform the data writing (data renewal) for every bit in synchronization with the picture element processing clock signal. The shift register performs data writing (data renewal), each in synchronization with the picture element processing clock signal. Then, the shift register shifts-up the contents by one bit in synchronization with a renormalizing clock signal. In other words, the least significant bit is connected to the earth electric potential node and stores "0", while the contents in the remaining bits are renewed to the latch contents of the immediately preceding stage. At initial state, the contents stored in the most significant latch portion is set to "1", while those in the remaining of 15 latch portions are set to "0".

A renormalization generator 182 in FIG. 15 receives a most significant bit signal (hereinafter, referred to as MSB signal) of the A data which is outputted from the register portion 181. Based on the received MSB signal, the renormalization generator 182 outputs a renormalizing signal, indicating "prosecuting a normalization processing", when the width A of the effective area becomes less than 50%, namely, the A data becomes less than 0.5 decimal number. The renormalization generator 182 comprises an invertor circuit which outputs "1", for example, indicating "prosecuting a normalization processing", if the MSB signal is "0". in FIG. 15

A last renormalization generator 183 in FIG. 15 receives a signal (hereinafter, referred to as the MSB-1 signal) which is placed one bit lower from the most significant bit of the A data outputted from the register portion 181 and a renormalizing signal from the renormalization generator 182. When the renormalizing signal from the renormalization generator 182 indicates "prosecuting a normalization processing", and the MSB-1 signal is "1", for example, the last renormalization ggenerator 183 outputs a last renormalizing signal. The last renormalization generator 183 comprises an AND circuit. When the MSB signal is "0" and the MSB-1 signal is "1", the AND circuit outputs "1" which indicates "the normalization processing will be completed by one more normalization processing".

Referring back to FIG. 13, an A selector 109 receives the A data from the A register 108 and a shift-up selection signal generated based on the last renormalizing signal. When the shift-up selection signal indicates "shift-up", the A selector 109 outputs a data which 108 to the arithmetic calculator 107 as an A data which shows the width A of the effective area of the picture elements immediately preceding the picture element to be decoded (an immediately preceding A data). Otherwise, the A selector 109 outputs the A data from the A register 108 as it is to the arithmetic calculator 107. The A selector 109, for example, as shown in FIG. 15, comprises a selector 191. The selector 191 has one input terminal A where the A data is received directly from the A register 108, and the other input terminal B where the A data from the A register 108 is received after the contents of the A data are shifted-up by one bit to the MSB side and its least significant bit is connected to an earth electric potential node. The selector 191 selects either one of the input terminal A and the input terminal B according to the shift-up selection signal, and outputs it to the output terminal Y.

A C register 110 in FIG. 13 receives a C data from the arithmetic calculator 107, the picture element processing clock signal and a renormalizing clock signal. In synchronization with the inputted picture processing clock signal, the C register 110 receives the C data from the arithmetic calculator 107 and latches them. In synchronization with the inputted renormalizing clock signal, the C register shifts-up the latched data by one bit and latches them again, and outputs them as the C data.

Figure 16:
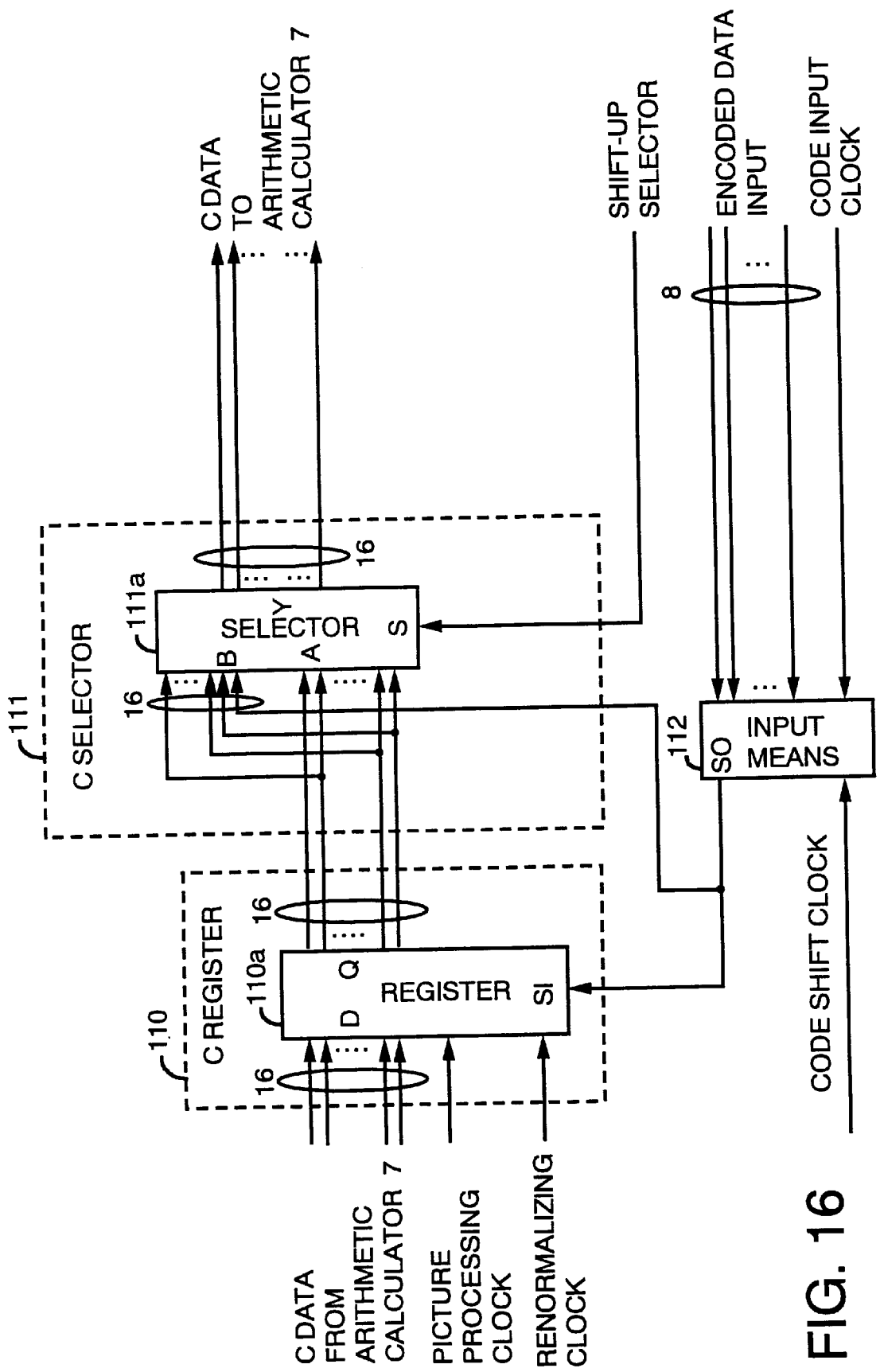
FIG. 16 is a block diagram showing an example of the C register 110 and the C selector 111 in the arithmetic calculator 107 according to the second embodiment of the present invention.

For example, as shown in FIG. 16, the C register takes-in the C data from the arithmetic calculator 107 and latches in synchronization with the inputted picture element processing clock signal, then shifts-up the latched data by one bit and latches it again in synchronization with the inputted renormalizing clock signal, and then outputs it as a C data. The C register 110 comprises a shift register 110a which comprises 16 latch portions, if the C data comprises 16 bits for example. The shift register 110a performs data writing (data renewal), each in synchronization with the picture element processing clock signal. The shift register 110a shifts-up the contents one bit in synchronization with a renormalizing clock signal. In other words, one bit of the decoded data is inputted to the least significant bit and stored therein, while in the remaining of the bits, the contents latched in each bit is shifted-up by one bit and written over therein. At initial state, the stored contents in the 16 latch portions are the inputted 16 bits decoded data.

A C selector 111 receives a C data from the C register 110 and the shift-up selection signal. The C selector 111 outputs a data which is shifted-up by one bit from the C data, when the shift-up selection signal indicates "shift-up", and outputs a data as it is when the shift-up selection signal does not indicate "shift-up", to the arithmetic calculator 107 as a C data showing a decode word for the picture element immediately preceding picture element to be decoded (an immediately preceding C data). Otherwise, the C data as transmitted from the C register 110 is given to the arithmetic calculator 107 as an immediately preceding C data mentioned in the above, and outputted to the arithmetic calculator 107 as an encoded data for transmitting a predetermined number of most significant bits. The C selector, as shown in FIG. 16, comprises a selector 111a, for example comprises a selector 111a. The selector 111a has one input terminal A where the C data is received directly from the C register 110, and the other input terminal B where the C data from the C register 110 is received after the contents of this C data are shifted-up by one bit to the MSB side and one bit of the data to be decoded is inputted to the least significant bit of this C data. The selector 111a selects either one of the input terminal A and the input terminal B according to the shift-up selection signal, and outputs it to the output terminal Y.

An input means 112 receives an encoded data as well as a code input clock signal, and code shift clock signal. In synchronization with the inputted code input clock signal, the input means 112 latches the encoded data therein. In synchronization with the inputted code shift clock signal, the input means 112 shifts-up the encoded data latched therein, and outputs the contents of the most significant bit of the latched encoded data to the C register 110 and the C selector 111. For example, as shown in FIG. 16, if the inputted encoded data comprises eight bits, the input means 112 has eight latch portions. The eight latch portions take-in an encoded data consisting eight bits in parallel in synchronization with the inputted code input clock signal. The input means 112, which comprises a shift register and so on, outputs in serial the encoded data which the input means takes-in parallel in synchronization with the code shift clock signal.

A control portion 113 in FIG. 13 receives a system clock signal, an identical context signal from the context comparator 106, a renormalizing signal and a last renormalizing signal from the A register 108. The control portion 113 then outputs a picture element processing clock signal to the context generating circuit 102, the context storage device 103, the A register 108 and the C register 110. The control portion 113 further outputs a renewal clock to the context table storage device 104 and a renormalizing clock signal to the A register 108 and the C register 110. The control portion 113 further outputs a shift-up selection signal to the A selector 109 and the C selector 111, and a code input lock signal and the code shift signal to the input means 112. A kernel portion comprises the arithmetic calculator 107, the A register 108, the A selector 109, the C register 110 and the C selector 111 and the control portion 113.

The picture element processing clock signal from the control portion 113 is a signal showing a timing for processing the data for the picture element to be encoded. The picture element processing clock signal is generated by the control portion 113 according to a system clock signal, a renormalizing signal, a last renormalizing signal and an identical context signal and synchronizes with a system clock signal. The picture element processing clock signal from the control portion 113 maintains either one of the levels, when the renormalizing signal indicates "prosecute a normalization processing", and the last renormalizing signal does not indicate "normalization will be completed by the last one processing". The picture element processing clock signal from the control portion 113 also maintains either one of the levels, when the renormalizing signal indicates "prosecute a normalization processing", the last renormalizing signal indicates "normalization will be completed by the last one processing", and the identical context signal indicates "identical context". Otherwise, the picture element processing clock signal from the control portion 113 becomes the same signal as the system clock signal.

Figure 17:
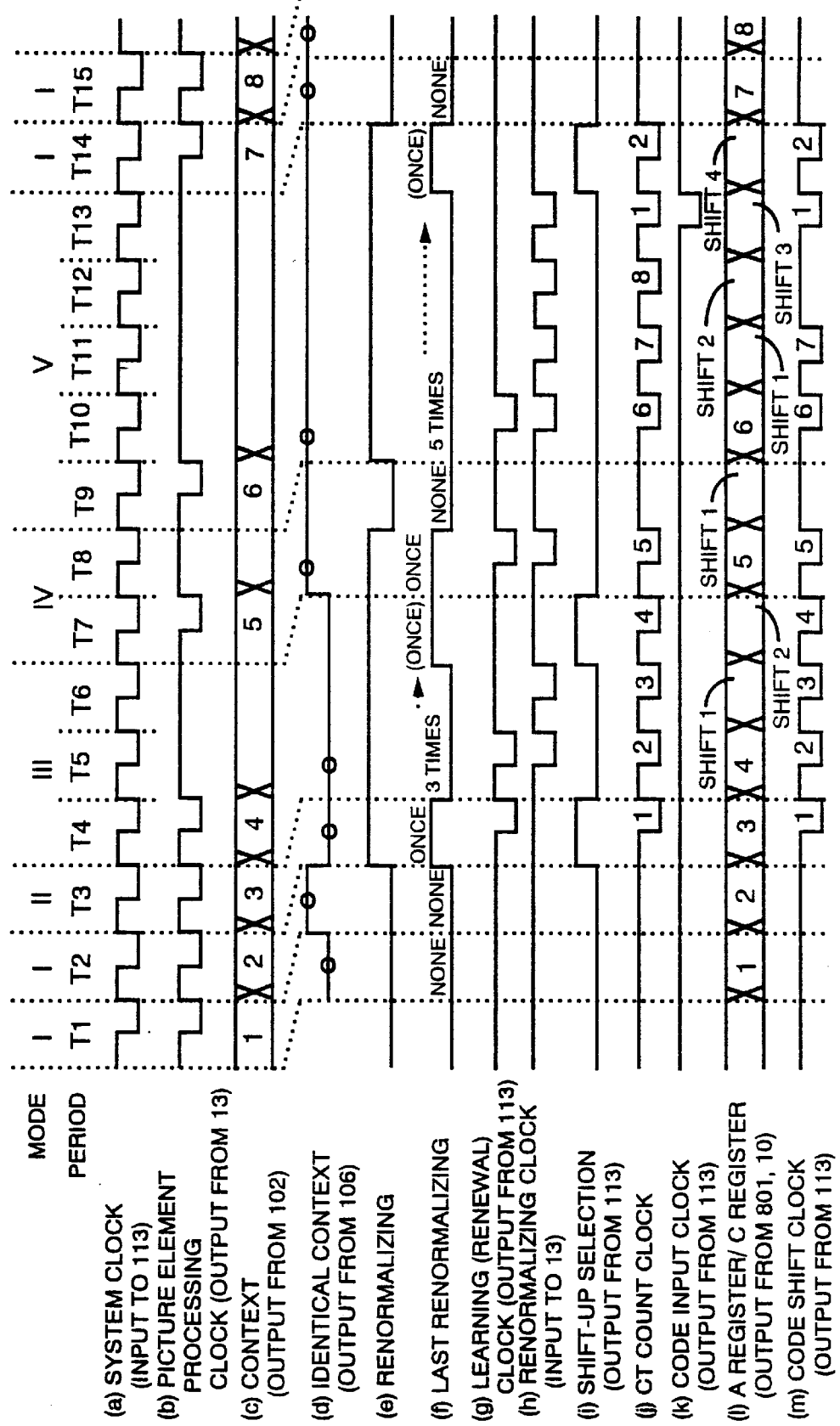
FIG. 17 is a waveform diagram showing signal waveforms in the main portions according to the second embodiment of the present invention.

For example, as shown in FIG. 17(*b*), when the renormalizing signal (FIG. 17(*e*)) is "1" indicating "prosecute a normalization processing", and the last renormalizing signal (FIG. 17(*f*)) is "0", not indicating "normalization will be completed by the last one processing", (where "1" indicates "H" level and "0" indicates "L" level in this second embodiment in the below, except some specific cases), the picture element processing clock signal from the control portion 113 becomes "H"level regardless of the system clock.

When the renormalizing signal is "1" indicating "prosecute a normalization processing", the last renormalizing signal is "1" indicating "normalization will be completed by the last one processing", and the identical context signal (FIG. 17(*d*)) is "1" indicating "identical context", the picture element processing clock signal from the control portion 113 becomes "H" level regardless of the system clock. Otherwise, the picture element processing clock signal from the control portion 113 becomes the same signal as the system clock signal.

The renormalizing signal shown in FIG. 17(*e*) is generated from the renormalizing signal from the A register 108 in synchronization with the system clock signal. It may be generated in the control portion 113.

For example, based on the renormalizing signal from the A register 108, the renormalizing signal of FIG. 17(*e*) is generated so that it synchronizes with the rising edge of the system clock. In other words, the renormalizing signal of FIG. 17(*e*) is generated in order to decide whether the picture element to be decoded is normalized or not at the subsequent timing of the system clock used when the context generator 102 takes-in a context for the picture element to be decoded.

Similarly, the last renormalizing signal shown in FIG. 17(*f*) is generated from the last renormalizing signal from the A register 108 in synchronization with the system clock signal. It may be generated in the control portion 113. For example, based on the last renormalizing signal from the A register 108, the last renormalizing signal of FIG. 17(*f*) is generated so that it synchronizes with the rising edge of the system clock. In other words, the last renormalizing signal of FIG. 17(*f*) is generated in order to specify the last normalizing signal at the subsequent timing of the system clock used when the context generator 102 takes-in a context for the picture element to be decoded.

The shift-up selection signal from the control portion 113 is generated in the control portion 113 according to the last renormalizing signal from the A register 108, the system clock signal and the identical context signal and synchronizes with the system clock signal. When the last renormalizing signal shown in FIG. 17(*f*) synchronized with the system clock signal indicates "normalization will be completed by the last one processing", and the identical context signal does not indicates "identical context", the shift-up selection signal indicates a "shift-up" state. Otherwise, the shift-up selection signal does not indicates the "shift-up" state.

For example, as shown in FIG. 17(*i*), when the last renormalizing signal shown in FIG. 17(*f*) is "1", indicating "normalization will be completed by the last one processing", and the identical context signal shown in FIG. 17(*d*) is "0" which does not indicates "identical context", the shift-up selection signal becomes "1" indicating a "shift-up" state. Otherwise, the shift-up selection signal becomes "0" which does not indicates the "shift-up" state.

The renewal clock signal from the control portion 113 is a signal showing a timing signal for renewing a prediction-index data stored in the context table storage device 104. The renewal clock signal from the control portion 113 is generated in the control portion 113 according to a system clock signal, a picture element processing clock signal and a renormalizing signal. The renewal clock signal synchronizes with a system clock signal, and becomes the system clock signal when the renormalizing signal indicates "prosecute a normalization processing" in the next cycle of the system clock signal after the appearance of the picture element processing clock signal. Otherwise, the renewal clock signal maintains either one of the levels.

For example, as shown in FIG. 17(*g*), when the rising of the picture element processing clock signal is detected and the renormalizing signal shown in FIG. 17(*e*) is "1" indicating "prosecute a normalization processing" at the rising of the system clock signal after the rising of the picture element processing clock signal is detected, the renewal clock signal becomes the same clock as that of the system clock. Otherwise, the renewal clock maintains "H" level, for example, regardless of the system clock.

The renormalizing clock signal, shown in FIG. 17(h), from the control portion 113 is a signal for shifting up the contents stored in the register portion 181 of the A register 108 and the C register 110. The renormalizing clock signal from the control portion 113 is generated in the control portion 113 according to a renormalizing signal and a last renormalizing signal from the A register 108, a system clock signal and an identical context signal and synchronizes with the system clock signal. When the renormalizing signal indicates "prosecute a normalization processing", and the last renormalizing signal does not indicate "normalization will be completed by the last one processing", the renormalizing clock signal becomes the same clock as the system clock signal ("set"). When the renormalizing signal indicates "prosecute a normalization processing", the last renormalizing signal indicates "normalization will be completed by the last one processing", and the identical context signal indicates "identical context", the renormalizing clock signal becomes the same clock as the system clock signal ("set"). Otherwise, the renormalizing clock signal becomes in a clock halt state (maintaining either one of the levels or "reset").

When the picture element processing clock signal outputs a clock synchronized with the system clock signal, the renormalizing clock signal maintains either one of the levels, and when the picture element processing clock signal maintains either one of the levels, the renormalizing clock signal outputs a clock synchronized with the system clock signal.

The code output clock signal from the control portion 113 shows a timing signal for taking-in the encoded data transmitted to the input means 112. The code output clock signal is generated in the control portion 113 according to a renormalizing signal from the A register 108 and a system clock signal. When the renormalizing signal indicates "prosecute a normalization processing", the code output clock signal becomes the same clock signal as the system clock signal. Otherwise, the code output clock signal becomes a pulse, when a predetermined number of clocks of the CT count clock signal is counted, according to a CT count clock signal maintaining either one of the levels (FIG. 17(j)). For example, as shown in FIG. 17(k), when the renormalizing signal is "1" indicating "prosecute a normalization processing", the code output clock signal firstly generates a count clock signal (for example, FIG. 17(j)) which becomes a system clock signal. When the number of the clocks of this count clock signal reaches eight, the code output clock signal becomes "L" level, for example, at the next cycle of the system clock signal.

The code shift clock signal from the control portion 113 shows a timing signal for shifting up the encoded data latched in the input means 112 by one bit. The control portion 113 generates a code shift clock signal from a renormalizing signal and a system clock signal from the A register 108. According to the CT count clock signal (FIG. 17(j)) and the code input clock signal (FIG. 17(k)), the code shift clock signal becomes the same clock signal as the CT count clock signal (for example, FIG. 17 (m)), when the code input clock signal does not output any clock, namely, at "H" level in this case.

An operation of a digital signal decoding apparatus having the above-mentioned configuration is explained below.

In the same manner as the digital signal encoding apparatus in the first embodiment, the operating mode of the digital signal decoding apparatus is also divided into 5 modes, I~V, as shown in FIG. 17 according to the transmitted encoded data. The operation in each mode is explained in the following using the waveforms shown in FIG. 17.

[Mode I]

FIG. 17 shows periods $T_1$ and $T_2$ of the system clock signal (a) which are examples of major signal waveforms in the mode I. In the period $T_1$, a context for the picture element to be decoded is not identical with the context for a picture element which is immediately subsequent to the picture element to be decoded. In the period $T_2$, a context for the picture element to be decoded is identical with the context for a picture element which is immediately subsequent to the picture element to be decoded.

First, it is assumed that a decoding processing has been done for the first picture element to be decoded during the period $T_1$ in the mode I. In the period $T_1$, a picture element processing clock signal is raised by the rise of the system clock. Receiving the rise of the picture element processing clock signal, the context generator 102 reads a context for the first picture element to be encoded from the storage device 101 and outputs the read context to the read address input nodes AR of the context storage device 104.

The code I in FIG. 17(c) indicates that a context has been generated by the context generator 102 for the first picture element to be decoded.

In the context storage device 104, an eight bit prediction-index data is read out according to the context inputted into the read address input nodes AR. A probability estimation index is outputted from the data output nodes DO to the address input nodes A of the probability estimating table storage device 5. A prediction symbol is outputted from the data output nodes DO to the arithmetic calculator 107.

Receiving the probability estimation index of the prediction-index data, the probability estimating table storage device 105 reads out a 31-bit probability estimating data as shown in a probability estimating table in FIG. 6, and then outputs it from the data output nodes DO to the arithmetic calculator 107, according to the probability estimation index inputted to the address input nodes A.

In the arithmetic calculator 107 (ref. FIG. 14), the calculator 173 generates a prediction conversion signal from the LSZ data from the probability estimating table storage device 105, the A data of the picture element to be decoded which precedes the first picture element to be decoded, and the C data of the picture element to be decoded which precedes the first picture element to be decoded, according to the above-mentioned equation (5). At initial state, the A data comprises "1" in its most significant bit and "0" in the remaining bits. The contents of the C data is the same as the transmitted encoded data which comprises 16 bits.

When the prediction conversion signal matches with the prediction symbol, the picture data generator 171 stores, for example, the picture data "1" in the storage device 101 as the picture data for the first picture element to be decoded, and when the prediction conversion signal does not match with the prediction symbol, the picture data generator 171 stores, for example, the picture data "0" in the storage device 101 as the picture data for the first picture element to be decoded.

On the other hand, when the prediction conversion signal shows that the equation (5) is satisfied, the calculator 173 calculates an A data from an LSZ data from the probability estimating table storage device 105 and the A data of the picture element to be decoded which precedes the first picture element to be decoded, according to the abovementioned equation (6). The calculated A data is outputted to the A register 108. The C data of the picture element to be decoded which precedes the first picture element to be decoded is outputted to the C register 110, according to the above-mentioned equation (7). When the prediction conversion signal shows that the equation (5) is not satisfied, the calculator 173 outputs the LSZ data from the probability estimating table storage device 105 to the A register 108 as an A data, according to the above-mentioned equation (8). The calculator 173 calculates a C data from the LSZ data from the probability estimating table storage device 105 and both A and C data of the picture element to be decoded which precedes the first picture element to be decoded, according to the above-mentioned equation (9). The calculated C data is outputted to the C register 110.

The A data and the C data calculated by the calculator 173 in this way are inputted to the register portion 181 of the A register 108 (ref. FIG. 15) and to the C register 110 (ref. FIG. 16) respectively, and stored therein (the stored contents in each register has been renewed) on the rise of a picture element processing clock signal from the control portion 113 (period $T_2$).

The A data which is stored in the register portion 181 of the A register 108 at this stage has a value larger than 0.5 in decimal number, since no renormalize processing is required in the mode I. Accordingly, the value of the most significant bit is "1", and a renormalizing signal "0" indicating "not prosecute a normalization processing" is outputted from renormalization generator 182 in the A register 108. The last renormalization generator 183 in the A register 108 then outputs a last renormalizing signal "0".

On the other hand, receiving a context of the second picture element from the context generator 102 and a context of the first picture element to be decoded from the context storage device 103, the context comparator 106 outputs an "L" level identical context signal indicating that "the contexts do not match with each other" in the period $T_2$ as shown in FIG. 17(d). Accordingly, during this period $T_2$, the mode is recognized. Here, it is recognized that no renormalization is performed, and the contexts do not match with each other and the mode I in the period $T_1$ has been completed for the period $T_1$.

Since recognizing the renormalization is not required in the mode I in the period $T_1$ during the period $T_2$, operations from a context generation to the arithmetic calculation are carried out during the mode I in the next period of $T_2$.

Accordingly, receiving a renormalizing signal from the renormalization generator 182 of the A register 108, the control portion 113 outputs the renewal clock signal and a renormalizing clock signal, both at "H" level, in the period $T_2$ as shown in FIG. 17(g) and (h) respectively, because the received renormalizing signal is at "L" level.

Receiving an "H" level renewal clock signal, the context table storage device 104 keeps its stored contents intact. Receiving an "H" level renormalizing clock signal, the register portion 181 of the A register 108 and the C register 110 does not shift-up the contents stored therein, and keep latching the received contents.

The code 1 in FIG. 17(l) indicates that the first picture elements to be decoded are latched to the A register 108 and the C register 110.

Since the control portion 113 maintains the renormalizing clock signal at "H" level, the CT count clock signal is maintained at "H" level too. The code input clock signal and the code shift clock from the control portion 113 therefore, remains "H" level. Accordingly, the input means 112 neither takes-in an encoded data nor shifts-up the encoded data latched therein by one bit.

Accordingly, in the mode I in this period $T_1$, it takes only one clock (a cycle) of the system clock to carry out the procedures from a context generation to the arithmetic calculation for the picture element to be decoded. The A data and the C data calculated by the arithmetic calculator 107 are stored in the A register 108 and the C register 110 respectively, and the prediction-index data in the context table storage device 104 are not renewed. As a result, substantial operating time in the period $T_1$ in the mode I takes no more than one system clock.

An operation in the mode I in the period $T_2$ is explained below. It is assumed that the decoding processing has been completed for the second picture element to be decoded in the operation in the mode I in the period $T_2$. The mode I in the period $T_2$ is different from the mode I in the period $T_1$ mentioned in the above only in that the context for the picture element to be decoded does not match or match with the context for the subsequent picture element to be decoded. The operation is the same as the mode I in the period $T_1$. It takes only one clock (a cycle) of the system clock to carry out the procedures from the context generation by the context generator 102 to the arithmetic calculation by the arithmetic calculator 107 for the second picture element to be decoded. The A data and the C data calculated by the arithmetic calculator 107 are stored in the A register 108 and the C register 110 respectively. The prediction-index data in the context table storage device 104 are not renewed. Accordingly, the input means 112 neither takes-in an encoded data nor shifts-up the encoded data latched therein by one bit. As a result, the substantial operation is carried out only within one system clock in the mode I in the period $T_2$.

According to the above equation (5), the picture data, the result calculated by the arithmetic calculator 107, indicates "1", for example, when the prediction symbol matches with the prediction conversion signal which is generated from the LSZ data according to the probability estimating table storage device 105, the A data of the picture element to be decoded which precedes the first picture element to be decoded, and the C data of the picture element to be decoded which precedes the first picture element to be decoded. When the prediction conversion signal does not match with the prediction symbol, the picture data indicates "0", for example. This picture data, the result calculated by the arithmetic calculator 107, is stored as a picture data for the second picture element to be decoded.

In the same manner as the recognition of the mode I in the period $T_1$, the mode I in the period $T_2$ is also recognized during the period $T_3$, namely, the next clock following the clock in which the context generation is performed. By recognizing that no renormalization is performed and the contexts match with each other, the operation is performed from the context generation to the arithmetic calculation in the next mode, namely, the mode II in the period $T_3$.

[mode II]

FIG. 17 shows an example of each major signal waveform in the mode II in the period $T_3$ of the system clock signal (a). First, it is assumed that an decoding processing has been done for the third picture element to be decoded in the mode II in the period $T_3$. In the period $T_3$, a picture element processing clock signal is raised by the rise of the system clock. Receiving the rise of the picture element processing clock signal, the context generator 2 reads a context for the third picture element to be decoded from the storage device 101 and outputs the read context to the read address input nodes AR of the context storage device 4. The code 3 in FIG. 17(c) indicates that a context has been generated by the context generator 102 for the third picture element to be decoded.

In the context storage device 4, an eight bits prediction-index data is read out according to the context inputted into the read address input nodes AR. A probability estimation index is outputted from the data output nodes DO to the address input nodes A of the probability estimating table storage device 105. A prediction symbol is outputted from the data output nodes DO to the arithmetic calculator 107.

Receiving the probability estimation index of the prediction-index data, the probability estimating table storage device 105 reads out a 31 bit probability estimating data as shown in probability estimating table in FIG. 6, and then outputs it from the data output nodes DO to the arithmetic calculator 107, according to the probability estimation index inputted into the address input nodes A.

In the arithmetic calculator 107 (ref. FIG. 14), a prediction conversion signal is generated by the calculator 173 from the LSZ data from the probability estimating table storage device 105, the A data of the second picture element to be decoded, and the C data of the second picture element to be decoded according to the above-mentioned equation (5).

When the prediction conversion signal matches with the prediction symbol, the picture data "1" for example from the picture data generator 171 is stored in the storage device 101 as the picture data for the third picture element to be decoded. When the prediction conversion signal does not match with the prediction symbol, the picture data "0", for example, from the picture data generator 171 is stored in the storage device 101 as the picture data for the third picture element to be decoded.

On the other hand, when the prediction conversion signal shows that the equation (5) is satisfied, the calculator 173 calculates an A data according to an LSZ data from the probability estimating table storage device 105 and the A data of the second picture element to be decoded, according to the equation (6). The calculated A data is then outputted to the A register 108. The C data of the second picture element to be decoded is outputted to the C register 110 according to the above-mentioned equation (7). When prediction conversion signal shows that the equation (5) is not satisfied, the calculator 173 outputs the LSZ data from the probability estimating table storage device 105 to the A register 108 as an A data, according to the above-mentioned equation (8). The calculator 173 calculates a C data from the LSZ data from the probability estimating table storage device 105 and both A and C data of the second picture element to be decoded, according to the above-mentioned equation (9). The calculated C data is outputted to the C register 110.

The A data and the C data calculated by the calculator 173 in this way are inputted to the register portion 181 of the A register 108 (ref. FIG. 15) and to the C register 110 (ref. FIG. 16) respectively, and stored therein (the stored contents in each register has been renewed) on the rise of a picture element processing clock signal from the control portion 113 (period $T_4$).

In the period $T_3$, since a renormalization processing is not required in the mode I in the period $T_2$, a renormalizing signal is at "L" level as shown in FIG. 17(e), and a renewal clock signal and a renormalizing clock signal outputted from the control portion 113 are at "H" level as shown in, FIG. 17(g) and (h) respectively.

Receiving an "H" level renewal clock signal, the context table storage device 104 keeps its stored contents without rewriting. Receiving an "H" level renormalizing clock signal, the register portion 181 of the A register 108 and the C register 110 shift up none of the contents stored therein, and keep them latched.

During the period T3, since the control portion 113 maintains the renormnalizing clock signal to "H" level, the CT count clock signal is maintained to "H" level too. The code input clock signal and the code shift clock signal from the control portion 113 therefore, remains "H" level. Accordingly, the input means 112 neither takes-in an encoded data nor shifts-up a data by one bit.

On the other hand, since one renormalization processing is required in the mode II, the A data calculated by the arithmetic calculator 107 and inputted in the register portion 181 of the A register 108 in the period $T_4$ has a value more than 0.25 and less than 0.5 in decimal number. Accordingly, the value of the most significant bit is "0", and the value which is one bit lower from the most significant bit is "1".

Accordingly, the renormalization generator 182 in the A register 108 outputs a renormalizing signal "1" indicating "prosecute a normalization processing", therefore, an "H" level renormalizing signal is obtained at the control portion 113 in the period $T_4$, as shown in FIG. 17(e).

The last renormalization generator 183 in the A register 108 outputs a last renormalizing signal "1" indicating "normalization will be completed by the last one processing". An "H" level last renormalizing signal is obtained at the control portion 113 in the period $T_4$, as shown in FIG. 17(f).

Receiving a context of the fourth picture element from the context generator 102 and a context of the third picture element to be decoded from the context storage device 103, the context comparator 106 outputs an "L" level identical context signal indicating that "the contexts do not match with each other" during the period $T_4$ as shown in FIG. 17(d).

Accordingly, the mode II is recognized in this period $T_4$ in which the contexts are not identical and one renormalization processing has to be performed.

By this recognition, a renormalization processing is performed in the period $T_4$ shown in FIG. 17. In other words, the prediction-index data in the context table storage device 104 is renewed, and the A data in the A register 108 and the C data in the C register 110 are respectively shifted-up by one bit.

In this second embodiment, the context table storage device 104 comprises a two port RAM, in which the stored contents can be read out and written over (renewed) within one clock of the system clock. Also in this second embodiment, when the A selector 109 and the C selector 111 receive the "H" level in the shift-up selection signal, the A selector 109 and the C selector 111 respectively selects and outputs the data obtained by shifting up the A data and the C data latched in the A register 108 and in the C register 110 by one bit, respectively.

Accordingly in the first embodiment, the renormalization processing can be carried out in the first clock of the system clock in which the decoding processing for the next picture element to be decoded is performed, in concretely, in the period $T_4$ in the mode III shown in FIG. 17. This renormalization processing will be explained more in detail in the next explanation on the operation of the mode III.

Accordingly, in this mode II, it takes only one clock (a cycle) of the system clock to carry out the procedures from a context generation to the arithmetic calculation for the picture element to be decoded. The A data and the C data calculated by the arithmetic calculator 107 are stored in the A register 108 and the C register 110 respectively. The renormalization processing is performed in the first clock of the system clock in which a decoding processing for the next picture element to be decoded is performed. As a result, substantial operation in the mode II is carried out only within one system clock.

[mode III]

FIG. 17 shows periods $T_4 \sim T_6$ of the system clock signal (a) which are examples of major signal waveforms in the mode III (it is assumed that the number of the renormalization processing is three).

First, it is assumed that a decoding processing has been done for the fourth picture element to be decoded during the period $T_4$ in the mode III. In the period $T_4$, a picture element processing clock signal is raised by the rise of the system clock. Receiving the rise of the picture element processing clock signal, the context generator 102 reads the contexts for the fourth picture element to be decoded from the storage device 101 and outputs the read context to the read address input nodes AR in the context storage device 104. The code 4 in FIG. 17(c) indicates that a context has been generated by the context generator 102 for the fourth picture element to be decoded.

In the context storage device 4, an eight bits prediction-index data is read out according to the context inputted into the read address input nodes AR. A probability estimation index is outputted from the data output nodes DO to the address input nodes A of the probability estimating table storage device 105. A prediction symbol is outputted from the data output nodes DO to the arithmetic calculator 107.

Receiving the probability estimation index of the prediction-index data, the probability estimating table storage device 105 reads out a 31 bit probability estimating data as shown in probability estimating table in FIG. 6, and then outputs it from the data output nodes DO to the arithmetic calculator 107, according to the probability estimation index inputted into the address input nodes A.

On the other hand, since one renormalization processing is performed in the above-mentioned mode II, when the control portion 13 has therefore, receives "1" indicating "prosecute a normalization processing" from the renormalize generator 82 in the A register 108 and "1" indicating "normalization will be completed by the last one processing" from the last renormalization generator 183 in the A register 108, in the period $T_4$ of the first clock of the system clock in the mode III, the control portion 13 obtains a renormalizing signal and a last renormalizing signal, both "H" level, in the period $T_4$, respectively, as shown in FIG. 17(e) and (f). Also the control portion 13 generates a shift-up selection signal which rises in response to the rise of the system clock as shown in FIG. 17(i).

When the shift-up selection signal rises, receiving a shift-up selection signal indicating "normalization will be completed by the last one normalization processing", the A selector 109 selects the data obtained by shifting up the A data from the A register 108 by one bit, and also outputs it to the arithmetic calculator 107. Similarly, receiving the shift-up selection signal, the C selector 111 selects the data obtained by shifting up the C data from the C register 110 by one bit, and outputs it to the arithmetic calculator 107. The least significant bit of this C data shifted-up by one bit will be the encoded data of the most significant bit which is outputted from the input means 112, and latched in the input means 112. In the following, the C data shifted-up by one bit means the data of this kind.

In other words, the A data and the C data latched in the A register 108 and the C register 110 respectively are shifted-up by one bit in the mode II in this period $T_4$. The A data latched in the A register 108 and the C data latched in the C register 110 in this period $T_4$ are the results calculated in the mode II (period $T_3$) by the arithmetic calculator 107. In other words, since the renormalizing signal and also the last renormalizing signal become "H" level in the period $T_4$, a renormalizing clock signal becomes "H" level. Therefore, the contents stored in the A register 108 and the C register 110 are not shifted-up and kept unchanged. This state is shown in FIG. 11(l). The code 3 in FIG. 17(l) indicates that the A register 108 and the C register 110 are latched for the third picture element to be decoded.

In the arithmetic calculator 107 (ref. FIG. 14), a prediction conversion signal is generated by the calculator 173 according to the LSZ data from the probability estimating table storage device 105, the A data of the third picture element to be decoded, namely, the A data shifted-up by one bit, and the C data of the third picture element to be decoded, namely, the C data which has been shifted-up by one bit, according to the above-mentioned equation (5).

When the prediction conversion signal matches with the prediction symbol, the picture data "1" for example from the picture data generator 171 is stored in the storage device 101 as the picture data for the fourth picture element to be decoded. When the prediction conversion signal does not match with the prediction symbol, the picture data "0" for example from the picture data generator 171 is stored in the storage device 101 as the picture data for the fourth picture element to be decoded.

On the other hand, when the prediction conversion signal shows that the equation (5) is satisfied, the calculator 173 calculates an A data according to an LSZ data from the probability estimating table storage device 105 and the A data of the third picture element to be decoded, namely, the A data shifted-up by one bit, according to the equation (6), and outputted the A data to the A register 108. The calculator 173 also calculates the C data of the third picture element to be decoded, namely, the C data shifted-up by one bit according to the above-mentioned equation (7) and outputs the C data to the C register 110. When prediction conversion signal shows that the equation (5) is not satisfied, the calculator 173 outputs the LSZ data from the probability estimating table storage device 105 to the A register 108 as an A data, according to the above-mentioned equation (8) and also calculates a C data from the LSZ data from the probability estimating table storage device 105 and both the A data and the C data of the third picture element to be decoded, namely, the A data and the C data shifted-up by one bit, according to the above-mentioned equation (9) and outputs the calculated C data to the C register 110.

The A data and the C data calculated by the calculator 173 in this way are inputted to the register portion 181 of the A register 108 (ref. FIG. 15) and to the C register 110 (ref. FIG. 16) respectively, and stored therein (the stored contents in each register has been renewed) on the rise of a picture element processing clock signal from the control portion 113 (period $T_5$).

In this period $T_4$, since the mode II requires one renormalization processing, receiving the rise of a picture element processing clock and "1" indicating "prosecute a normalization processing" from the renormalization generator 182 in the A register 108, the control portion 113 outputs a renewal clock signal in synchronization with the system clock as shown in FIG. 17(g).

Receiving the fall of the renewal clock signal, the context table storage device 104 writes and stores a renewal data from the arithmetic calculator 107 on the context table storing portion in the address based on the context from the context storage device 103, received in the write address input nodes AW, namely, the context of the third picture element to be decoded in the mode II.

A renewal data from the arithmetic calculator 107 is explained with regard to a prediction symbol and a probability estimation index (a status number) respectively, using FIG. 14. When a prediction conversion signal from the calculator 173 indicates that the equation (5) is satisfied, the prediction symbol generated by the prediction symbol/probability estimation index generator (renewal data generator) 172 has the same value as that of the prediction symbol of the prediction-index data for the third picture element to be decoded, regardless of the SWITCH data of the probability estimating data for the third picture element to be decoded. When the prediction conversion signal indicates that the equation (5) is not satisfied, and the SWITCH data of the probability estimating data for the third picture element to be decoded is "1", the prediction symbol has a value obtained by inverting the value of the prediction symbol of the prediction-index data for the third picture element to be decoded. When the prediction conversion signal indicates that the equation (5) is not satisfied and the SWITCH data is "0", this prediction symbol has the same value as that of the prediction symbol of the prediction-index data for the third picture element to be decoded.

A probability estimation index (a status number) generated by the prediction symbol/probability estimation index generator 172 becomes an NMPS data of the probability estimating data for the third picture element to be decoded, when a prediction conversion signal from the calculator 173 indicates that the equation (5) is satisfied. The probability estimation index becomes an NLPS data of the probability estimating data for the third picture element to be decoded, when a prediction conversion signal indicates that the equation (5) is not satisfied.

A renewal data consisting a prediction symbol and a probability estimation index generated in this manner by the arithmetic calculator 7 is written on the context table storing portion of the context table storage device 104 in the address based on the context of the third picture element to be decoded.

The control portion 113 obtains a CT count clock signal which will be a clock as shown in FIG. 17(j), and generates a code shift clock signal in synchronization with the system clock signal in the period $T_4$ as shown in FIG. 17(m). Receiving the fall of this code shift clock signal, the input means 112 shifts-up the stored contents latched therein by one bit, and stores it again. Since the code input clock signal remains "H" level as shown in FIG. 17(k), the input means 112 however, does not newly takes-in an encoded data again.

Accordingly, in the period $T_4$ in this mode III, the procedures from a context generation to the arithmetic calculation for the fourth picture element to be decoded, and a renormalization processing for the third picture element to be decoded are carried out within one system clock (a cycle). That is, the prediction-index data in the context table storage device 104 is renewed and the A data latched in the A register 108 and the C data latched in the C register 110 are respectively shifted-up by one bit.

Since this mode III shows an example in which three renormalization processing are required, the A data which is the resultant calculated by the arithmetic calculator 107 taken into the register portion 181 of the A register 108 in the period $T_5$ becomes a value more than 0.0625 and less than 0.125 in decimal number. Accordingly, the value of most the significant bit becomes "0", and the next bit of the most the significant bit becomes "0". Accordingly, a renormalizing signal "1" indicating "prosecute a normalization processing" is outputted from the renormalization generator 182 in the A register 108. As shown in FIG. 17(e), the control portion 113 therefore obtains an "H" level renormalizing signal in the period $T_5$.

The last renormalization generator 183 in the A register 108 outputs a last renormalizing signal "0" indicating "normalization will not be completed by the last one processing". An "L" level last renormalizing signal is obtained at the control portion 113 in the period $T_5$, as shown in FIG. 17(f).

Receiving a context of the fifth picture element from the context generator 102 and a context of the fourth picture element to be decoded from the context storage device 103, the context comparator 106 outputs an "L" level identical context signal indicating that "the contexts do not match with each other" during the period $T_5$ as shown in FIG. 17(d).

Accordingly, the mode III is recognized in this period $T_5$ in which the contexts are not identical and at least one renormalization processing has to be performed.

By this recognition, a renormalization processing is performed in the period $T_5$ shown in FIG. 17. In other words, the prediction-index data in the context table storage device 104 is renewed, and the A data in the A register 108 and the C data in the C register 110 are respectively shifted-up by one bit.

As mentioned above, in this period $T_5$, on the rise of a picture element clock signal triggered by the rise of a system clock, the A data and the C data calculated for the fourth picture element to be decoded are inputted to the A register 108 and to the C register 110 respectively and latched therein. Receiving the rise of the picture element processing clock signal, the context generator 102 reads the context for the fifth picture element to be decoded from the storage device 101 and outputs the read context to the read address input nodes AR in the context storage device 104 and to the context storage device 103.

The picture element processing clock signal however, maintains "H" level in this period $T_5$, since the renormalization generator 182 of the A register 108 outputs "1" indicating "prosecute a normalization processing" and the last renormalization generator 183 of the A register 108 outputs "0" indicating "normalization processing will not be completed by the last one processing". As a result, the A register 108 and the C register 110 shift up none of the contents stored therein. The A data and the C data calculated for the fourth picture element to be decoded remains to be latched in the A register 108 and the C register 110, respectively.

On the other hand, when the control portion 113 receives "1" indicating "prosecute a normalization processing" from the renormalization generator 182 of the A register 108, the renormalizing clock signal generator is set, and the control portion 113 therefore, outputs a renormalizing clock signal as well as a code shift clock signal in synchronization with the system clock signal.

Receiving the fall of this code shift clock signal, the input means 112 shifts-up the encoded data latched therein by one bit and latches the data again. Receiving the fall of this renormalizing clock signal, the A register 108 and the C register 110 shift up the A data and the C data by one bit, which are calculated by the arithmetic calculator 107 in the period $T_4$ for the fourth picture element to be decoded, respectively, and latch themselves again.

Since the control portion 113 receives "1" indicating "prosecute a normalization processing" from the renormalization generator 182 in the A register 108, the control portion 113 outputs a renewal clock signal in synchronization with the system clock as shown in FIG. 17(g).

Receiving the fall of the renewal clock signal, the context table storage device 104 writes and stores a renewal data from the arithmetic calculator 107 on the context table storing portion in the address based on the context from the context storage device 103, received in the write address input nodes AW, namely, the context of the fourth picture element to be decoded.

A renewal data from the arithmetic calculator 107 is explained with regard to a prediction symbol and a probability estimation index respectively, using FIG. 14.

The prediction symbol generated by the prediction symbol/probability estimation index generator 172 has the same value as that of the prediction symbol of the prediction-index data for the fourth picture element to be decoded, regardless of the SWITCH data of the probability estimating data for the fourth picture element to be decoded, when a prediction conversion signal from the calculator 173 indicates that the equation (5) is satisfied. When the prediction conversion signal indicates that the equation (5) is not satisfied and the SWITCH data of the probability estimating data for the fourth picture element to be decoded is "1", the prediction symbol has a value obtained by inverting the value of the prediction symbol of the prediction-index data for the fourth picture element to be decoded. When the prediction conversion signal indicates that the equation (5) is not satisfied and when the SWITCH data is "0", this prediction symbol has the same value as that of the prediction symbol of the prediction-index data for the fourth picture element to be decoded.

A probability estimation index (a status number) generated by the prediction symbol/probability estimation index generator 172 becomes an NMPS data of the probability estimating data for the fourth picture element to be decoded, when a prediction conversion signal from the calculator 173 indicates that the equation (5) is satisfied. It becomes an NLPS data of the probability estimating data for the fourth picture element to be decoded, when a prediction conversion signal from the calculator 173 indicates that the equation (5) is not satisfied.

A renewal data consisting a prediction symbol and a probability estimation index (a status number) generated in this manner by the arithmetic calculator 107 is written on the context table storing portion of the context table storage device 104 in the address based on the context of the third picture element to be decoded.

In this period $T_5$, the A data stored in the register portion 181 of the A register 108 has a value more than 0.125 and less than 0.25 in decimal number because it has been shifted-up by one bit. The value of the most significant bit is, however "0", and also that of the next bit is "0".

Accordingly, the renormalization generator 182 in the A register 108 outputs a renormalizing signal "1" indicating "prosecute a normalization processing", therefore, an "H" level renormalizing signal is obtained at the control portion 113 in the period $T_6$, as shown in FIG. 17(e).

The last renormalization generator 183 in the A register 108 outputs a last renormalizing signal "0" indicating "normalization will not be completed by the last one processing". An "L" level last renormalizing signal is obtained at the control portion 113 in the period $T_6$, as shown in FIG. 17(f).

This means that in the next period $T_6$, the A data and the C data latched in the A register 108 and the C register 110 respectively are shifted-up by one bit in a renormalization processing.

Accordingly in the period $T_6$, the renormalizing clock signal generator in the control portion 113 is not reset because the control portion 113 has received "0" indicating "normalization processing will not be completed by the last one processing" from the last one renormalization generator 183 of the A register 108. The control portion 113 therefore, outputs a renormalizing clock signal in synchronization with the system clock signal as well as a code shift clock signal in synchronization with the system clock signal.

Receiving the fall of this code shift clock signal, the input means 112 shifts-up the encoded data latched therein by one bit and latches the data again.

Receiving the fall of this renormalizing clock signal, the A register 108 and the C register 110 shift up the A data and the C data by one bit, which are shifted-up by one bit in the period $T_5$, respectively, and latch themselves again.

Since the last one renormalization generator 183 outputs "0" indicating "normalization processing will not be completed by the last one processing", the picture element processing clock signal maintains "H" level even in this period $T_6$. Accordingly, the control portion 113 maintains the renewal clock signal at "H" level as shown in FIG. 17(g). As a result, the contents stored in the context table storage device 104 is not renewed.

In this period $T_6$, the A data stored in the register portion 181 of the A register 108 has a value more than 0.25 and less than 0.5 in decimal number, because it has been shifted-up by one bit. The value of the most significant bit is, however "0", and the value which is one bit lower from the most significant bit is "1".

Accordingly, the renormalization generator 182 in the A register 108 outputs a renormalizing signal "1" indicating "prosecute a normalization processing", therefore, an "H" level renormalizing signal is obtained at the control portion 113 in the period $T_7$, as shown in FIG. 17(e).

The last renormalization generator 183 in the A register 108 outputs a last renormalizing signal "1" indicating "normalization will be completed by the last one processing". An "H" level last renormalizing signal is obtained at the control portion 113 in the period $T_7$, as shown in FIG. 17(f).

This means that in the next period $T_7$, the A data and the C data latched in the A register 108 and the C register 110 respectively, are shifted-up by renormalization processing. This also means that the mode I one normalizing processing.

In other words, the last renormalization generator 183 in the A register 108 outputs "1" indicating "normalization will be completed by the last one processing". In the same manner as the operation in the mode II, the renormalization processing can be performed, at the first clock of the system clock in which a decoding processing for the next picture element to be decoded is performed, namely, the period $T_7$ in the mode IV shown in FIG. 17.

This renormalization processing will be explained more precisely in the following explanation on the operation in the mode IV.

Accordingly, in the mode III, for the renormalization processings which are required for three times, the procedures from a context generation to the arithmetic calculation for the picture element to be decoded, take only one clock time (one cycle) of the system clock to carry out. The A data and the C data calculated by the arithmetic calculator 107, are stored in the A register 108 and the C register 110, respectively. The two renormalization processings need two clocks of the system clock to carry out. The last one renormalization processing is performed in the first clock of the system clock in which a decoding processing for the next picture element to be decoded is performed. As a result, substantial operating time in the mode III needs only three clocks of the system clock.

In the period $T_4 \sim T_6$, since the control portion 113 maintains the renormalizing clock signal at "H" level, the CT count clock signal is maintained to the same clock signal as the system clock shown in FIG. 17(j). Since the CT count clock signal lasts, however, during three clocks, the code output clock signal from the control portion 113 remains "H" level. Accordingly, the input means 112 does not takes-in an encoded data.

[mode IV]

FIG. 17 shows an example of each major signal waveform in the mode IV in the period of $T_7 \sim T_8$ of the system clock signal (a). It is assumed that a decoding processing has been done for the fifth picture element to be decoded in the mode IV. In the period $T_7$, the context generator 102 has already (in period $T_5$) read the context for the fifth picture element to be decoded from the storage device 101 and has outputted the read context to the read address input nodes AR of the context storage device 104.

The code 5 in FIG. 17(c) shows that a context has been generated by the context generator 102 for the fifth picture element to be decoded.

In the context storage device 104, an eight bits prediction-index data is read out according to the context inputted into the read address input nodes AR. A probability estimation index is outputted from the data output nodes DO to the address input nodes A of the probability estimating table storage device 105. A prediction symbol is outputted from the data output nodes DO to the arithmetic calculator 107.

Receiving the probability estimation index of the prediction-index data, the probability estimating table storage device 105 reads out a 31-bit probability estimating data as shown in probability estimating table in FIG. 6 and then outputs it from the data output nodes DO to the arithmetic calculator 107, according to the probability estimation index inputted into the address input nodes A.

On the other hand, since the last renormalization processing is performed in the above-mentioned mode III in the period $T_6$, when the control portion 113 has therefore, receives "1" indicating "prosecute a normalization processing" from the renormalize generator 82 in the A register 108 and "1" indicating "normalization will be completed by the last one processing" from the last renormalization generator 183 in the A register 108, in the period $T_7$ of the first clock of the system clock in the mode IV, the control portion 113 obtains a renormalizing signal and a last renormalizing signal, both "H" level, in the period $T_7$, respectively, as shown in FIG. 17(e) and (f). Also the control portion 113 generates a shift-up selection signal which rises in response to the rise of the system clock as shown in FIG. 17(i).

When the shift-up selection signal rises, receiving a shift-up selection signal indicating "normalization will be completed by the last one normalization processing", the A selector 109 selects the data obtained by shifting up the A data from the A register 108 by one bit, and also outputs it to the arithmetic calculator 107.

Similarly, receiving the shift-up selection signal, the C selector 111 selects the data obtained by shifting up the C data from the C register 110 by one bit, and outputs it to the arithmetic calculator 107.

In other words, the processing performed in this period $T_7$ is the same as the "shift-up" processing in the mode III in which the A data and the C data latched in the A register 108 and in the C register 110 respectively are shifted-up by one bit. As a result, three renormalization processings are performed in the mode III during the period $T_5 \sim T_7$. The A data and the C data therefore outputted from the A selector 109 and from the C selector 111 respectively are, shifts-up the A data and the C data calculated for the fourth picture element to be encoded in the period $T_4$ in the mode III by three bits. In other words, both the A data and the C data outputted from respective selectors become eight times as large as the A data and the C data calculated for the fourth picture element to be decoded.

In the arithmetic calculator 107 (ref. FIG. 14), a prediction conversion signal is generated by the calculator 173 from the LSZ data from the probability estimating table storage device 105, the A data of the fourth picture element to be decoded, namely, the A data shifted-up by three bits, and the C data of the fourth picture element to be decoded, namely, the C data shifted-up by three bits, according to the above-mentioned equation (5).

When the prediction conversion signal matches with the prediction symbol, the picture data "1" for example from the picture data generator 171 is stored in the storage device 101 as the picture data for the fifth picture element to be decoded. When the prediction conversion signal does not match with the prediction symbol, the picture data "0" for example from the picture data generator 171 is stored in the storage device 101 as the picture data for the fifth picture element to be decoded.

On the other hand, when the prediction conversion signal shows that the equation (5) is satisfied, the calculator 173 calculates an A data according to an LSZ data from the probability estimating table storage device 105 and the A data of the fourth picture element to be decoded, namely, the calculated A data of the fourth picture element to be decoded which is shifted-up by three bits, according to the equation (6). The calculated A data is then outputted to the A register 108. The C data of the fourth picture element to be decoded, namely, the calculated C data of the fourth picture element to be decoded which is shifted-up by three bits, is also outputted to the C register 110 according to the above-mentioned equation (7).

When the prediction conversion signal shows that the equation (5) is not satisfied, the calculator 173 outputs the LSZ data from the probability estimating table storage device 105 to the A register 108 as an A data according to the above-mentioned equation (8). The calculator 173 calculates a C data according to the LSZ data from the probability estimating table storage device 105 and both the A data and the C data of the fourth picture element to be decoded, namely, the A data and the calculated C data which is shifted-up by three bits, according to the above-mentioned equation (9). The calculated C data is outputted to the C register 110.

The A data and the C data calculated by thinputted to the registes way are inputted to the register portion 181 of the A register 108 (ref. FIG. 15) and to the C register 110 (ref. FIG. 16) respectively, and stored therein (the stored contents in each register has been renewed) on the rise of a picture element processing clock signal from the control portion 113 (period $T_8$).

Although the control portion 113 receives "1" indicating "prosecute a normalization processing" from the renormalization generator 182 of the A register 108, the contents stored in the context table storage device 104 is not renewed because the renewal clock signal maintains "H" level in the period $T_7$.

The control portion 113 obtains a CT count clock signal which will be a clock as shown in FIG. 17(j), and generates a code shift clock signal in synchronization with the system clock signal in the period $T_7$ as shown in FIG. 17(m). Receiving the fall of this code shift clock signal, the input means 112 shifts-up the stored contents latched therein one bit, and stores it again.

Accordingly, in the period $T_7$ in the mode IV, the procedures from a context generation to the arithmetic calculation for the fifth picture element to be decoded, and a last renormalization processing for the fourth picture element to be decoded are carried out within one system clock (a cycle).

That is, the processing which shifts-up the A data and the C data latched in the A register 108 and the C register 110, respectively, by one bit, are carried out within one system clock (one cycle).

Since this mode IV shows an example in which one renormalization processing is required, the A data stored in the register portion 181 of the A register 108, has a value more than 0.25 and less than 0.5 in decimal number. Accordingly, the value of its most significant bit becomes "0", and the next bit of the most the significant bit becomes "1".

Accordingly, a renormalizing signal "1" indicating "prosecute a normalization processing" is outputted from the renormalization generator 182. As shown in FIG. 17(*e*), the control portion 113 obtains an "H" level renormalizing signal in the period $T_8$.

The last renormalization generator 183 in the A register 108 outputs a last renormalizing signal "1" indicating "normalization will be completed by the last one processing". An "H" level last renormalizing signal is obtained at the control portion 113 in the period $T_8$, as shown in FIG. 17(*f*).

Receiving a context of the sixth picture element from the context generator 102 and a context of the fifth picture element to be decoded from the context storage device 103, the context comparator 106, in the period $T_8$, outputs an "H" level identical context signal indicating that "the contexts match with each other" as shown in FIG. 17(*d*).

Accordingly, the mode IV is recognized in this period $T_8$ in which the contexts are identical and one renormalization processing has to be performed. By this recognition, a renormalization processing is performed in the period $T_8$ shown in FIG. 17. In other words, the prediction-index data in the context table storage device 104 is renewed, and the A data in the A register 108 and the C data in the C register 110 are respectively shifted-up by one bit.

As mentioned above, in this period $T_8$, on the rise of a picture element clock signal triggered by the rise of a system clock, the A data and the C data calculated for the fifth picture element to be decoded are inputted to the A register 108 and to the C register 110 respectively and latched therein. Receiving the rise of the picture element processing clock signal, the context generator 102 reads the context for the sixth picture element to be decoded from the storage device 101 and outputs the read context to the read address input nodes AR in the context storage device 104 and to the context storage device 103.

The picture element processing clock signal however, maintains "H" level in this period $T_8$, since the renormalization generator 182 of the A register 108 outputs "1" indicating "prosecute a normalization processing", the last renormalization generator 183 of the A register 108 outputs "1" indicating "normalization processing will be completed by the last one processing", and the identical context signal from the context comparator 106 shows that contexts are identical. The picture element processing clock signal maintains the "H" level during the period $T_8$. As a result, the contents stored in the A register 108 and in the C register 110 are not renewed. The A data and the C data calculated for the fifth picture element to be decoded are latched in the A register 108 and in the C register 110.

On the other hand, when the control portion 113 receives "1" indicating "prosecute a normalization processing" from the renormalization generator 182 of the A register 108, the renormalizing clock signal generator is set, and the control portion 113 therefore, outputs a renormalizing clock signal as well as a code shift clock signal in synchronization with the system clock signal.

Receiving the fall of this code shift clock signal, the input means 112 shifts-up the encoded data latched therein by one bit and latches the data again.

Receiving the fall of this renormalizing clock signal, the A register 108 and the C register 110 shift up the A data and the C data by one bit, which are calculated by the arithmetic calculator 107 in the period $T_8$ for the fifth picture element to be decoded, respectively, and latch themselves again Since the control portion 113 receives "1" indicating "prosecute a normalization processing" from the renormalization generator 182 in the A register 108, the control portion 113 outputs a renewal clock signal in synchronization with the system clock as shown in FIG. 17(*g*).

Receiving the fall of the renewal clock signal, the context table storage device 104 writes and stores a renewal data from the arithmetic calculator 107 on the context table storing portion in the address based on the context from the context storage device 103, received in the write address input nodes AW, namely, the context of the fifth picture element to be decoded.

A renewal data from the arithmetic calculator 107 is explained with regard to a prediction symbol and a probability estimation index (a status number) respectively, using FIG. 14.

When a prediction conversion signal from the calculator 173 indicates that the equation (5) is satisfied, the prediction symbol generated by the prediction symbol/probability estimation index generator 172 has the same value as that of the prediction symbol of the prediction-index data for the fifth picture element to be decoded, regardless of the SWITCH data of the probability estimating data for the fifth picture element to be decoded.

When the prediction conversion signal indicates that the equation (5) is not satisfied and the SWITCH data of the probability estimating data for the fifth picture element to be decoded is "1", the prediction symbol has a value obtained by inverting the value of the prediction symbol of the prediction-index data for the fifth picture element to be decoded.

When the prediction conversion signal indicates that the equation (5) is not satisfied and when the SWITCH data is "0", this prediction symbol has the same value as that of the prediction symbol of the prediction-index data for the fifth picture element to be decoded.

A probability estimation index (a status number) generated by the prediction symbol/probability estimation index generator 172 becomes an NMPS data of the probability estimating data for the fifth picture element to be decoded, when a prediction conversion signal from the calculator 173 indicates that the equation (5) is satisfied. It becomes an NLPS data of the probability estimating data for the fifth picture element to be decoded, when a prediction conversion signal indicates that the equation (5) is not satisfied.

A renewal data consisting a prediction symbol and a probability estimation index generated in this manner by the arithmetic calculator 107 is written on the context table storing portion of the context table storage device 104 in the address based on the context of the fifth picture element to be decoded.

In this period $T_8$, the A data stored in the register portion 181 of the A register 108 has a value more than 0.5 in decimal number, since it has been shifted-up by one bit. Accordingly, the value of the most significant bit becomes "1". Accordingly, the renormalization generator 182 in the A register 108 outputs a renormalizing signal "0" indicating "not prosecute a normalization processing", therefore, an "L" level renormalizing signal is obtained at the control portion 113 in the period $T_9$, as shown in FIG. 17(*e*).

The last renormalization generator 183 in the A register 108 outputs a last renormalizing signal "0" indicating "normalization will not be completed by the last one processing". An "L" level last renormalizing signal is obtained at the control portion 113 in the period $T_9$, as shown in FIG. 17(f).

Accordingly, in the mode IV, it is meant that the renormalization processing has been already completed. For the renormalization processing which is required for once, the procedures from a context generation to the arithmetic calculation for the picture element to be encoded, take only one clock time (one cycle) of the system clock to carry out. The A data and the C data calculated by the arithmetic calculator 107, are stored in the A register 108 and the C register 110, respectively. One renormalization processing takes one clock of the system clock to carry out. As a result, substantial operating time in the mode IV need only two clocks of the system clock.

In the period $T_7 \sim T_8$, the renormalizing signal shown in FIG. 17(e) is "H" level. The control portion 113 therefore, makes the CT count clock signal the same clock signal as the system clock signal as shown in FIG. 17(j). However, since the CT count clock holds two clocks and the number of the clocks and the total number of the clock accumulated from the mode IV is 5, the code output clock signal from the control portion 113 remains "H" level. Accordingly, the input means 112 neither takes-in nor outputs the contents stored in the C register 11.

[mode V]

FIG. 17 shows an example of each major signal waveform in the mode V in the period of $T_9 \sim T_{13}$ of the system clock signal (a). It is assumed that a decoding processing has been done for the sixth picture element to be decoded in the mode V. In the period $T_9$, the context generator 102 has already read the context for the sixth picture element to be decoded from the storage device 101. The read context is outputted to the read address input nodes AR of the context storage device 4. The code 6 in FIG. 17(c) shows that a context has been generated by the context generator 102 for the sixth picture element to be decoded.

In the context storage device 4, an eight bit prediction-index data is read out according to the context inputted into the read address input nodes AR. A probability estimation index is outputted from the data output nodes DO to the address input nodes A of the probability estimating table storage device 105. A prediction symbol is outputted from the data output nodes DO to the arithmetic calculator 107.

Receiving the probability estimation index of the prediction-index data, the probability estimating table storage device 105 reads out a 31-bit probability estimating data as shown in probability estimating table in FIG. 6, and then outputs it from the data output nodes DO to the arithmetic calculator 107, according to the probability estimation index inputted into the address input nodes A.

On the other hand, since the processing has been already completed in the above-mentioned mode IV in the period $T_8$, the control portion 113 obtains a renormalizing signal of "L" level, and a last renormalizing signal, as shown in FIG. 17(e) and (f) respectively, and no renormalization processing is performed.

In the period $T_8$, since the picture element processing clock signal maintains "H" level, the picture element processing clock signal remains "H" level, even if the system clock rises in the period $T_9$. The A data and the C data latched in the register 8 and in the C register 110 are obtained from the A data and the C data calculated for the fifth picture element to be encoded by shifting up them one bit in the period $T_7$ which have been latched in the period $T_8$.

In the arithmetic calculator 107 (ref. FIG. 14), a prediction conversion signal is generated by the calculator 173 from the LSZ data from the probability estimating table storage device 105, the A data of the fifth picture element to be decoded and the C data of the fifth picture element to be decoded, according to the above-mentioned equation (5).

When the prediction conversion signal matches with the prediction symbol, the picture data "1" for example from the picture data generator 171 is stored in the storage device 101 as the picture data for the sixth picture element to be decoded. When the prediction conversion signal does not match with the prediction symbol, the picture data "0" for example from the picture data generator 171 is stored in the storage device 101 as the picture data for the sixth picture element to be decoded.

On the other hand, when the prediction conversion signal shows that the equation (5) is satisfied, the calculator 173 calculates an A data from the LSZ data from the probability estimating table storage device 105 and the A data of the fifth picture element to be decoded, namely, the A data shifted-up by one bit, according to the above-mentioned equation (6). The calculated A data is outputted to the A register 108. The C data of the fifth picture element to be decoded, namely, the C data shifted-up by one bit, is outputted to the C register 110, according to the above-mentioned equation (7).

When prediction conversion signal shows that the equation (5) is not satisfied, the calculator 173 outputs the LSZ data from the probability estimating table storage device 105 to the A register 108 as an A data, according to the above-mentioned equation (8).

The calculator 173 also calculates a C data from the LSZ data from the probability estimating table storage device 105 and both the A data and the C data of the fifth picture element to be decoded, namely, the A data and C data shifted-up by one bit respectively, according to the above-mentioned equation (9). The calculated C data is outputted to the C register 110.

The A data and the C data calculated by the calculator 173 in this way are inputted to the register portion 181 of the A register 108 (ref. FIG. 15 and to the C register 110 (ref. FIG. 16) respectively, and stored therein (the stored contents in each register has been renewed) on the rise of a picture element processing clock signal from the control portion 113 (period $T_{10}$).

On the other hand, since the renewal clock signal from the control portion 113 maintains "H" level as shown in FIG. 17(g), the contents stored in the context table storage device 104 is not renewed.

Since this mode V shows an example in which five renormalization processing are required, the A data stored in the register portion 181 of the A register 108, has a value more than 0.15625 and less than 0.03125 in decimal number. Accordingly, the value of its most significant bit becomes "0", and the next bit of the most the significant bit becomes "0".

Accordingly, a renormalizing signal "1" indicating "prosecute a normalization processing" is outputted from the renormalization generator 182 in the A register 108. As shown in FIG. 17(e), the control portion 113 obtains an "H" level renormalizing signal in the period $T_{10}$.

The last renormalization generator 183 in the A register 108 outputs a last renormalizing signal "indicating normalization will not be completed by the last one processing". An "L" level last renormalizing signal is obtained at the control portion 113 in the period $T_{10}$, as shown in FIG. 17(f).

Receiving a context of the seventh picture element from the context generator 102 and a context of the sixth picture element to be decoded from the context storage device 103, the context comparator 106 outputs an "H" level identical context signal indicating that "the contexts match with each other" during the period Tio as shown in FIG. 17(d).

Accordingly, the mode V is recognized in this period $T_{10}$ in which the contexts are not identical and at least one renormalization processing has to be performed.

By this recognition, a renormalization processing is performed in the period $T_{10}$ shown in FIG. 17. In other words, the prediction-index data in the context table storage device 104 is renewed, and the A data in the A register 108 and the C data in the C register 110 are respectively shifted-up one bit.

As mentioned above, in this period $T_{10}$, at the rise of a picture element clock signal triggered by the rise of a system clock, the A data and the C data calculated for the sixth picture element to be decoded are inputted to the A register 108 and to the C register 110 respectively and latched therein. Receiving the rise of the picture element processing clock signal, the context generator 102 reads the context for the seventh picture element to be decoded from the storage device 101 and outputs the read context to the read address input nodes AR in the context storage device 104 and to the context storage device 103.

The picture element processing clock signal however, maintains "H" level in this period $T_{10}$, since the renormalization generator 182 of the A register 108 outputs "1" indicating "prosecute a normalization processing", and the last one renormalization generator 183 of the A register 108 outputs "0" indicating "normalization processing will not be completed by the last one processing". As a result, the A register 108 and the C register 110 shift none of the contents stored therein. The A data and the C data calculated for the sixth picture element to be decoded remains to be latched in the A register 108 and the C register 110, respectively.

On the other hand, when the control portion 113 receives "1" indicating "prosecute a normalization processing" from the renormalization generator 182 of the A register 108, the renormalizing clock signal generator is set, and the control portion 113 therefore, outputs a renormalizing clock signal as well as a code shift clock signal in synchronization with the system clock signal.

Receiving the fall of this renormalizing clock signal, the A register 108 and the C register 110 shift up the A data and the C data by one bit, which are calculated by the arithmetic calculator 107 in the period $T_9$ for the sixth picture element to be decoded, respectively, and latch themselves again.

Since the control portion 113 receives "1" indicating "prosecute a normalization processing" from the renormalization generator 182 in the A register 108, the control portion 113 outputs a renewal clock signal in synchronization with the system clock as shown in FIG. 17(g).

Receiving the fall of the renewal clock signal, the context table storage device 104 writes and stores a renewal data from the arithmetic calculator 107 on the context table storing portion in the address based on the context from the context storage device 103, received in the write address input nodes AW, namely, the context of the picture element to be decoded for the sixth in this mode V.

A renewal data from the arithmetic calculator 107 is explained with regard to a prediction symbol and a probability estimation index (a status number) respectively, using FIG. 14.

The prediction symbol generated by the prediction symbol/probability estimation index generator 172 has the same value as that of the prediction symbol of the prediction-index data for the sixth picture element to be decoded, regardless of the SWITCH data of the probability estimating data for the sixth picture element to be decoded, when a prediction conversion signal from the calculator 173 indicates that the equation (5) is satisfied. When the prediction conversion signal indicates that the equation (5) is not satisfied and the SWITCH data of the probability estimating data for the sixth picture element to be decoded is "1", the prediction symbol has a value obtained by inverting the value of the prediction symbol of the prediction-index data for the sixth picture element to be decoded. When the prediction conversion signal indicates that the equation (5) is not satisfied and when the SWITCH data is "0", this prediction symbol has the same value as that of the prediction symbol of the prediction-index data for the sixth picture element to be decoded.

A probability estimation index (a status number) generated by the prediction symbol/probability estimation index generator 172 becomes an NMPS data of the probability estimating data for the sixth picture element to be decoded, when a prediction conversion signal from the calculator 173 indicates that the equation (5) is satisfied. It becomes an NLPS data of the probability estimating data for the sixth picture element to be decoded, when a prediction conversion signal indicates that the equation (5) is not satisfied.

A renewal data consisting a prediction symbol and a probability estimation index generated in this manner by the arithmetic calculator 107 is written on the context table storing portion of the context table storage device 104 in the address based on the context of the sixth picture element to be decoded.

In this period $T_{10}$, the A data stored in the register portion 181 of the A register 108 has a value more than 0.03125 and less than 0.0625 in decimal number because it has been shifted-up by one bit. The value of the most significant bit is however "0", and the value which is one bit lower from the most significant bit is "0".

Accordingly, the renormalization generator 182 in the A register 108 outputs a renormalizing signal "1" indicating "prosecute a normalization processing", therefore, an "H" level renormalizing signal is obtained at the control portion 113 in the period $T_{11}$, as shown in FIG. 17(e).

The last renormalization generator 183 in the A register 108 outputs a last renormalizing signal "0" indicating "normalization will not be completed by the last one processing". An "L" level last renormalizing signal is obtained at the control portion 113 in the period $T_{11}$, as shown in FIG. 17(f).

This means that in the period $T_{11}$, the A data and the C data latched in the A register 108 and the C register 110 respectively are shifted-up by one bit in a renormalization processing.

Accordingly in the period $T_{11}$, when the control portion 113 receives "0" indicating "normalization processing will not be completed by the last one processing" from the last renormalization generator 183 of the A register 108, the renormalizing clock signal generator in the control portion 113 is not reset, the control portion 113 therefore outputs a renormalizing clock signal in synchronization with the system clock signal.

Receiving the fall of this code shift clock signal, the input means 112 shifts-up the encoded data latched therein by one bit and latches the data again.

Receiving the fall of this renormalizing clock signal, the A register 108 and the C register 110 shift up the A data and the C data by one bit, which are shifted-up by one bit in the period $T_{10}$, respectively, and latch themselves again.

Since the control portion 113 maintains the renewal clock signal at "H" level in this period $T_{11}$, the contents stored in the context table storage device 104 is not renewed.

In this period $T_{11}$, the A data stored in the rrgister portion 181 of the A register 108 has a value more than 0.0625 and less than 0.125 in decimal number, because it has been shifted-up by one bit. The value of the most significant bit is however "0", and the value which is one bit lower from the most significant bit is also "0".

Accordingly, a renornalizing signal "1" indicating "prosecute a normalization processing" is outputted from the renormalization generator 182 in the A register 108. An "H" level renormalizing signal is obtained in the control portion 113 in the period $T_{12}$, as shown in FIG. 17(e).

A last renormalizing signal "0" indicating "normalization will not be completed by the last one processing" is outputted from the last one renormalization generator 183 in the A register 108. An "L" level last renormalizing signal is obtained in the control portion 113 in the period $T_{12}$, as shown in FIG. 17(f).

This means that in the next period $T_{12}$, the A data and the C data latched in the A register 108 and the C register 110 respectively, are shifted-up by one bit in a renormalization processing.

Accordingly in the period $T_{12}$, the renormalizing clock signal generator in the control portion 113 is not reset because the control portion 113 has received "0" indicating "normalization processing will not be completed by the last one processing" from the last one renormalization generator 183 in the A register 108. The control portion 113 therefore, outputs a renormalizing clock signal in synchronization with the system clock signal.

In this period $T_{12}$, the number of the counts of the CT count clock signal is 8 as shown in FIG. 17(j). In the second embodiment, the number of the bits of the encoded data for transmission is also 8. Accordingly, the control portion 113 maintains the code system clock signal at "H" level, instead of synchronizing it with the system clock signal, and synchronizes the code input clock signal with the system clock signal.

Receiving the fall of this code input clock signal, the input means 112 takes-in the transmitted eight bit encoded data, writes it over the old encoded data, and stores it therein. When the fall of this renormalizing clock signal is received by the A register 108 and the C register 110, the A data and C data latched therein, namely, the A data and C data already shifted-up by one bit in the period T $_1$, are again shifted-up by one bit, and latched again in the A register 8 and the C register 10 respectively.

Since the control portion 113 maintains the renewal clock signal at "H" level in this period $T_{12}$, as shown in FIG. 17(g), the contents stored in the context table storage device 104 is not renewed.

In this period $T_{12}$, the A data stored in the register portion 181 of the A register 108 has a value more than 0.125 and less than 0.25 in decimal number, because it has been shifted-up by one bit. The value of the most significant bit is however, "0", and the value which is one bit lower from the most significant bit is also "0".

Accordingly, a renormalizing signal "1" indicating "prosecute a normalization processing" is outputted from the renormalization generator 182 in the A register 108. is An "H" level renormalizing signal is obtained in the control portion 113 in the period $T_{13}$, as shown in FIG. 17(e).

A last renormalizing signal "0" indicating "normalization will not be completed by the last one processing" is outputted from the last renormalization generator 183 in the Aregister 108. An "L" level I last renormalizing signal is obtained in the control 20 portion 113 in the period $T_{13}$ as shown in FIG. 17(f).

This means that in the period $T_{13}$, the A data and the C data latched in the A register 108 and the C register 110 respectively, are shifted-up by one bit in a renormalization processing.

Accordingly in the period $T_{13}$, the renormalizing clock signal generator in the 25 control portion 113 is not reset because the control portion 113 has received "0" indicating "normalization processing will not be completed by the last one processing" from the last renormalization generator 183 of the A register 108. The control portion 113 therefore, outputs a renormalizing clock signal as well as a code shift clock signal in synchronization with the system clock signal.

Receiving the fall of this code shift clock signal, the input means 112 shifts-up the encoded data latched therein by one bit and latches the data again.

When the fall of this renormalizing clock signal is received by the A register 108 and the C register 110, the A data and C data latched therein, namely, the A data and C data already shifted-up by one bit in the period $T_{12}$, are again shifted-up by one bit, and latched again in the A register 8 and the C register 10 respectively.

Since the control portion 113 maintains the renewal clock signal at "H" level in this period $T_{13}$ as shown in FIG. 17(g), the contents stored in the context table storage device 104 is not renewed.

In this period $T_{13}$, the A data stored in the register portion 181 of the A register 108 has a value more than 0.25 and less than 0.5 in decimal number, because it has been shifted-up by one bit. Accordingly, the value of the most significant bit is "0", and the value which is one bit lower from the most significant bit is "1".

Accordingly, a renormalizing signal "1" indicating "prosecute a normalization processing" is outputted from the renormalization generator 182 in the A register 108. An "H" level renormalizing signal is obtained in the control portion 113 in the period $T_{14}$, as shown in FIG. 17(e).

The last renormalization generator 183 in the A register 108 outputs a last renormalizing signal "1" indicating "normalization will be completed by the last one processing". An "H" level last renormalizing signal is obtained at the control portion 113 in the period $T_{14}$, as shown in FIG. 17(f).

This means that in the period $T_{14}$, the A data and the C data latched in the A register 108 and the C register 110 respectively are shifted-up by one bit in a renormalization processing. This also means that the mode V is completed by the last one normalizing processing.

In other words, since the last one renormalization generator 183 has outputted "1" indicating "normalization will be completed by the last one processing", the renormalization processing is completed in the first clock of the system clock in which an encoding processing for the next picture element to be decoded is performed, namely, the period $T_{14}$ shown in FIG. 17.

In other words, receiving the rise of the system clock in the period $T_{14}$, the control portion 113 obtains a renormalizing signal and a last renormalizing signal, both "H" level, as shown in FIG. 17(e) and (f), respectively, and generates a shift-up selection signal, which rises receiving the rise of the system clock as shown in FIG. 17(i).

When the shift-up selection signal rises, receiving a shift-up selection signal indicating "normalization will be completed by the last one normalization processing", the A selector 109 selects the data obtained by shifting up the A data from the A register 108 by one bit, and also outputs it to the arithmetic calculator 107.

Similarly, receiving the shift-up selection signal, the C selector 111 selects the data obtained by shifting up the C data from the C register 110 by one bit, and outputs it to the arithmetic calculator 107.

In other words, the processing performed in this period $T_{14}$ is the same as the "shift-up" processing in the mode V in which the A data and the C data latched in the A register 108 and in the C register 110 respectively are shifted-up by one bit. As a result, five renormalization processing are performed in the mode V during the periods $T_{10}$~$T_{14}$. The A data and the C data which are outputted from the A selector 109 and from the C selector 111 are the same as those obtained from the A data and the C data, respectively, calculated for the sixth picture element to be decoded in the period T9 in the mode V by shifting up them five bits.

Accordingly, in the mode V, for the renormalization processings which are required for five times, the procedures from a context generation to the arithmetic calculation for the picture element to be decoded, take only one clock time (one cycle) of the system clock to carry out. The A data and the C data calculated by the arithmetic calculator 107, are stored in the A register 108 and the C register 110, respectively. The four renormalization processings need four clocks of the system clock to carry out. The last one renormalization processing is performed in the first clock of the system clock in which a decoding processing for the next picture element to be decoded is performed. As a result, substantial operating time in the mode V needs only five clocks of the system clock.

In the periods $T_{10}$~$T_{13}$, since the control portion 113 maintains the renormalizing clock signal to "H" level, the CT count clock signal is maintained to the same clock signal as the system clock shown in FIG. 17(j). The control portion 113 outputs the four CT count clock signals. Accordingly, since there are five total clocks until the mode V, when the control portion 113 counts the same number of the bits of the encoded data for transmission, namely, eight bits in this second embodiment, the control portion 113 outputs a code input clock signal, which becomes "L" level in synchronization with the next system clock as shown in FIG. 17(k).

In this second embodiment, receiving the falling code input clock signal to the "L" level from the control portion 113, the input means 112 takes-in the all transmitted eight bits encoded data in parallel, and latches them again.

In conclusion, with regard to the digital signal decoding apparatus having the above mentioned configuration, the number of the processing clocks of the system clock signal is as follows as shown in FIG. 10. In the mode I where there is no renormalization, that is, no normalization processing is required because the A data for a picture element to be decoded is equal or more than 0.5 in decimal number, the number of the processing clocks is one. In the mode II where a renormalization is performed, that is, a normalization processing is required because the A data for a picture element to be decoded is less than 0.5 in decimal number, the context for the picture element to be decoded does not match with the context for the picture element which is immediately subsequent to the picture element to be decoded, and renormalization occurs once, the number of the processing clocks is one. In the mode III where a renormalization is performed, the context for a picture element to be decoded does not match with the context for a picture element which is immediately subsequent to the picture element to be decoded, and renormalization occurs more than once, the number of the processing clocks is the same as that of the renormalization processing.

In the mode IV where a renormalization is performed, the context for a picture element to be decoded matches with the context for a picture element which is immediately subsequent to the picture element to be decoded, and renormalization occurs once, the number of the processing clocks is two. In the mode V where a renormalization is performed, the context for a picture element to be decoded matches with the context for a picture element which is immediately subsequent to the picture element to be decoded, and renormalization occurs more than once, the number of the processing clocks is th e sa me as that of the renormalnation processing.

In other words, in the mode II, III and V, the last renormalization processing is performed together with the processing for the next picture element to be decoded at the firs t clock of the system clock for processing the next picture element to be decoded. Therefore, it is possible to substantially reduce the processing time as much as one clock, and speed up the decoding processing.

With regard to the digital signal decoding apparatus formed in the above-me ntioned way, it is expected that the processing mode for the most of the picture element to be decoded will be mode II in case of the worst compression ratio for decoding (compression ratio is almost 1). Even in this case, the operation time takes substantially no more than one clock of the system clock to complete the processing for the most of the picture element to be decoded. Accordingly, this can speed up the decoding processing.

Furthermore, the encoded data encoded by the digital signal encoding apparatus explained in the first embodiment is decoded in real time. Accordingly, the capacity of a storage device for accumulating the transmitted encoded data, namely, the input means 112, is made smaller. As a result, a semiconductor integrated circuit apparatus comprising the digital signal decoding apparatus can be made small sized and manufactured in a low cost.

Embodiment 3

Figure 18A:
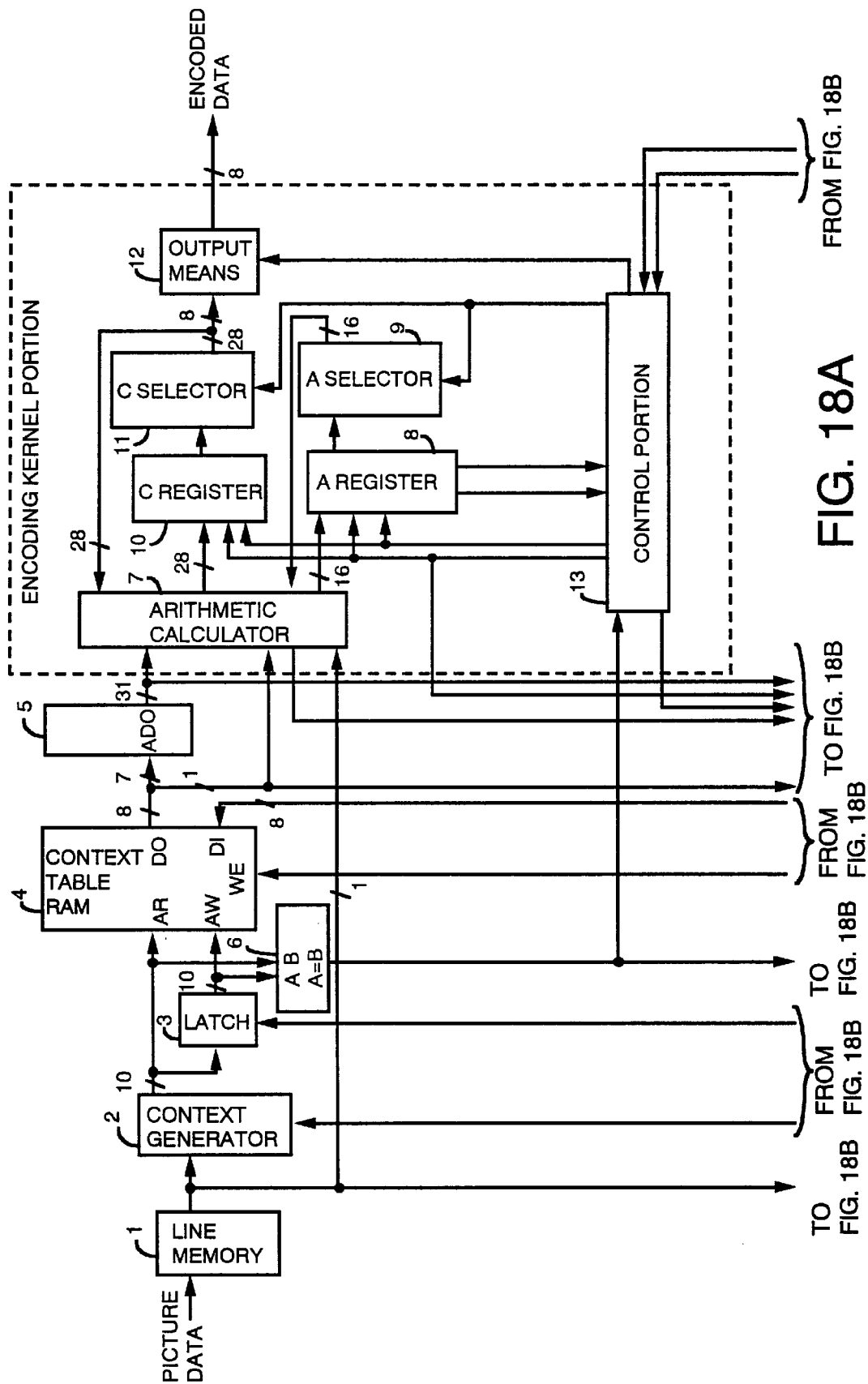
FIG. 18A, B are block diagrams showing a third embodiment of the present invention.
Figure 18B:
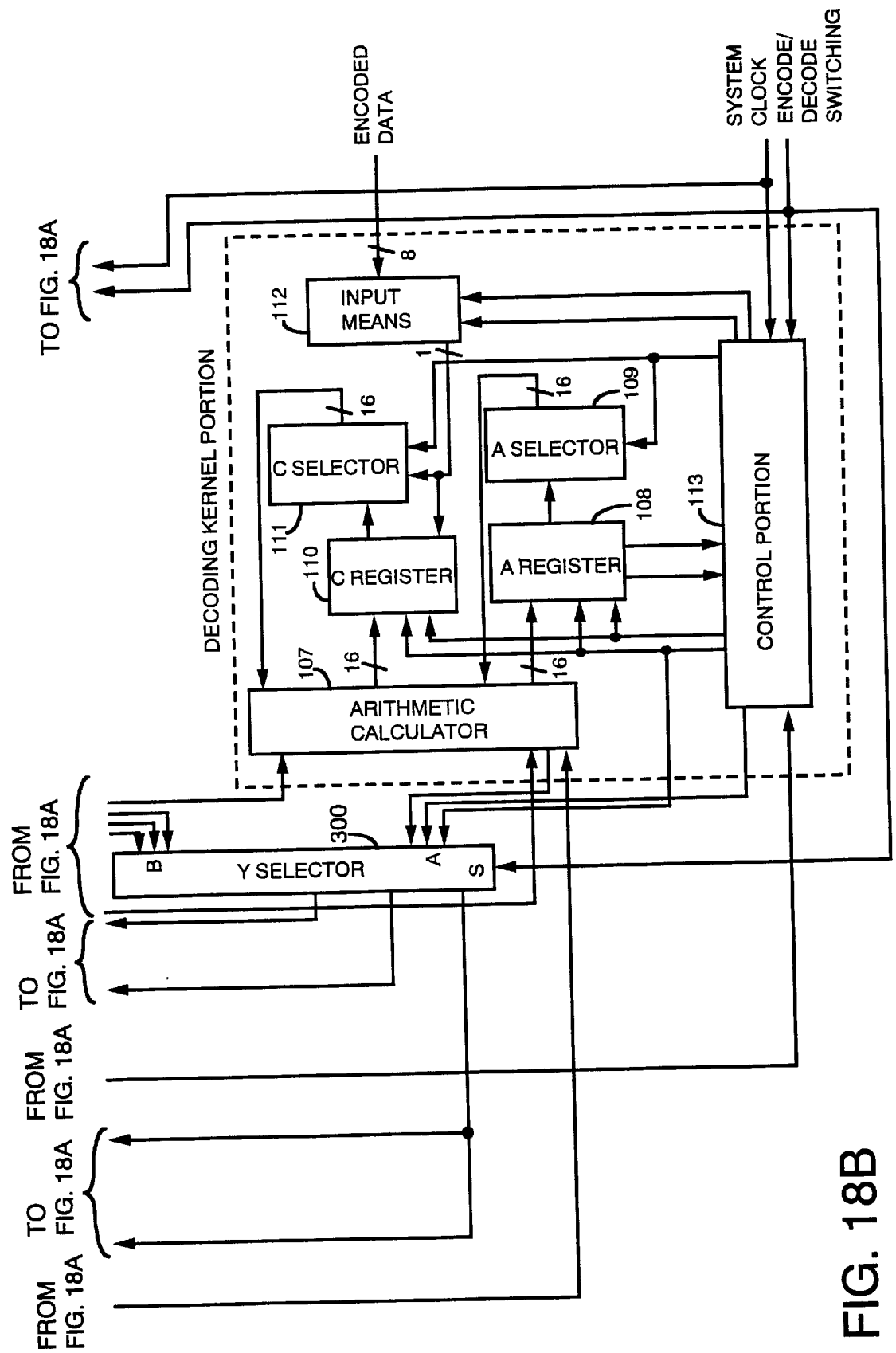

FIG. 18 shows a third embodiment of the present invention, in which a digital signal encoding/decoding apparatus is integrated into a semiconductor integrated circuit, which is, for example, applied to a facsimile apparatus.

This digital signal encoding/decoding apparatus fundamentally comprises the above-mentioned digital signal encoding apparatus of the first embodiment and the above-mentioned digital signal decoding apparatus of the second embodiment, both of which are integrated into one semiconductor integrated circuit apparatus. The digital signal encoding/decoding apparatus comprises a storage device 1, a context generator 2, a context storage device 3, a context table storage device 4, a probability estimating table storage device 5 and context comparator 6, all of which are the same as those in the first embodiment and used for both encoding and decoding. The digital signal encoding/decoding apparatus also comprises an arithmetic calculator 7, an A register 8, an A selector 9, a C register 10, a C selector 11, and an encoding kernel portion which comprises an output means 12 and a control portion 13, all of which are the same as those of the first embodiment. The active/inactive state of these elements 7~13 is controlled according to the encode/decode switching signal. When the control portion 13 is turned on an active state, these elements work the same as they did in the first embodiment. An arithmetic calculator 107, an A register 108, an A selector 109, a C register 110, a C selector 111 and a decoding kernel portion which comprises an input means 112 and a control portion 113 are the same as those of the second embodiment. The active/inactive state of these elements 107~113 is also controlled according to the encode/decode switching signal. When the control portion 13 is turned on an active state, these elements 107~113 work the same as they do in the second embodiment.

The encoding/decoding selector 300 is used for switching, the storage device 1, the context generator 2, the context storage device 3, the context table storage device 4, the probability estimating table storage device 5 and the context comparator 6 in order for either encoding or decoding purpose.

This encoding/decoding selector 300 receives a renewal data from the arithmetic calculator 107, a picture element processing clock signal and renewal clock signal from the control portion 113 at the input terminal A. The encoding/decoding selector 300 also receives a renewal data from the arithmetic calculator 7, a picture element processing clock signal and a renewal clock signal from the control portion 13 at the other input terminal B. According to the encode/decode switching signal, the encoding/decoding selector 300 selects either the signal inputted into the one input terminal A or the signal inputted into the other input terminal B.

When the inputted encode/decode switching signal indicates "encode", the encoding/decoding selector 300 selects the signal inputted into the other input terminal B. The encoding/decoding selector 300 respectively outputs the renewal data from the arithmetic calculator 7 to the data input nodes DI of the context table storage device 4, the picture element processing clock signal from the control portion 13 to the context generator 2 as well as to the context storage device 3, the renewal clock signal from the control portion 13 to the input node WE for the write enable signal of the context table storage device 4.

When the inputted encode/decode switching signal indicates "decode", the encoding/decoding selector 300 selects the signal inputted into the input terminal A. The encoding/decoding selector 300 respectively outputs the renewal data from the arithmetic calculator 107 to the data input nodes DI of the context table storage device 4, the picture element processing clock signal from the control portion 113 to the context generator 2 as well as to the context storage device 3, the renewal clock signal from the control portion 113 to the input node WE for the write enable signal of the context table storage device 4.

In brief, the digital signal encoding/decoding apparatus constructed in this way operates the same as the digital encoding apparatus of the first embodiment when the encode/decode switching signal indicates "encode", using the storage device 1, the context generator 2, the context storage device 3, the context table storage device 4, the probability estimating table storage device 5, the context comparator 6, the arithmetic calculator 7, the A register 8, the A selector 9, the C register 10, the C selector 11, the output means 12, the control portion 13 and the encoding/decoding selector 300. The digital signal encoding/decoding apparatus constructed in this way operates the same as the digital decoding apparatus of the second embodiment when the encode/decode switching signal indicates "decode", using the storage device 1, the context generator 2, the context storage device 3, the context table storage device 4, the probability estimating table storage device 5, the context comparator 6, the arithmetic calculator 107, the A register 108, the A selector 109, the C register 110, the C selector 111, the input means 112, the control portion 113 and the encoding /decoding selector 300.

An alternative configuration of the above-mentioned digital signal encoding /decoding apparatus can be possible to construct any one of the configuration by applying a constant voltage, for example, power supply voltage or earth voltage, instead of the encode/decode switching signal. The digital signal encoding/decoding apparatus constructed in this way operates as a digital signal encoding apparatus when the encoding kernel portion is always kept active, the decoding kernel portion is always kept inactive, and the signal inputted into the terminal B is always selected by the encoding/decoding selector 300. On the other hand, the digital signal encoding /decoding apparatus constructed in this way operates as a digital signal decoding apparatus when the encoding kernel portion is always kept inactive, the decoding kernel portion is always kept active, and the signal inputted into the terminal A is always selected by the encoding/decoding selector 300.

The digital signal encoding/decoding apparatus constructed in the above-mentioned way provides the same effect obtained in the first and second embodiments, respectively. Moreover, since the encoding apparatus as well as the decoding apparatus are integrated into one semiconductor integrated circuit apparatus, an encoding/decoding apparatus, an encoding apparatus, and a decoding apparatus are provided by one semiconductor integrated circuit apparatus, instead of manufacturing each apparatus separately.

What is claimed is:

1. A digital information encoding apparatus comprising:

a context generation means for extracting a reference picture element from an inputted picture data according to a template model to generate a context for a picture element to be encoded;

a context storage means for temporarily storing said context for said picture element to be encoded which is received from said context generation means;

a context table storage means comprising a read address input node for receiving said context from said context generation means, a read/write context table storing portion for storing a plurality of prediction-index data having a plurality of bits, a data output node which outputs said prediction-index data stored in said context table storing portion in an address based on said context received on said read address input node, a write address input node for receiving said context temporarily stored in said context storage means, and a data input node which receives a renewal data written in said context table storing portion in an address based on said context received on said write address input node;

a probability estimating table storage means comprising an address input node for receiving a probability estimation index in a probability estimating data from said context table storing portion, a probability estimating table storing portion for storing a plurality of probability estimating data having a plurality of bits, and a data output node which outputs a probability estimating data stored in said probability estimating table storing portion in an address based on said probability estimation index received on said address input node; and an arithmetic calculation means for receiving a picture data for said picture element to be encoded, a prediction symbol in a prediction-index data from said context table storage means, a probability estimating data from said probability estimating table storage means, an A data indicating a width A of effective area for a picture element which immediately precedes said picture element to be encoded, and a C data indicating a code word C for a picture element which is immediately preceding said picture element to be encoded, and conducting a predetermined arithmetic processing, for outputting the A data indicating a width A of effective area for said picture element to be encoded and a C data indicating a code word C for said picture element to be encoded, and for outputting a renewal data including both the prediction symbol and the probability estimation index to said context table storage means.

2. A digital information encoding apparatus comprising:

a context generation means for extracting a reference picture element from an inputted picture data according to a template model to generate a context for a picture element to be encoded;

a context table storage means wherein a plurality of prediction-index data having a plurality of bits are stored, one prediction-index data is outputted out of said stored plurality of prediction-index data according to a context for said picture element to be encoded from said context generation means, and stored contents based on a context for said picture element to be encoded are rewritten by a inputted renewal data when a renormalization processing is required for said picture element to be encoded;

a probability estimating table storage means wherein a plurality of probability estimating data having a plurality of bits are stored, and one probability estimating data is outputted from said stored plurality of probability estimating data according to a probability estimation index in said prediction-index data from said context table storage means;

an arithmetic calculation means for receiving a picture data for said picture element to be encoded, a prediction symbol in a prediction-index data from said context table storage means, a probability estimating data from said probability estimating table storage means, an A data indicating a width A of effective area for a picture element which immediately precedes said picture element to be encoded, and a C data indicating a code word C for a picture element which is immediately preceding said picture element to be encoded, and conducting a predetermined arithmetic processing, for outputting the A data indicating a width A of effective area for said picture element to be encoded and a C data indicating a code word C for said picture element to be encoded, and for outputting a renewal data including both the prediction symbol and the probability estimation index to said context table storage means;

an A register wherein said A data from said arithmetic calculation means is latched, contents of said latched A data is outputted as an A data, and a renormalizing signal for conducting a normalization processing, and a last renormalizing signal, which indicates that the normalization will be completed by the last one processing, are outputted;

an A selector wherein said A data form said A register and a shift-up selection signal based on said last renormalizing signal are received, and if said selection signal indicates "shift-up", said A data from said A register is shifted-up by one bit and outputted to said arithmetic calculation means as an A data for a picture element immediately preceding said picture element to be encoded, or otherwise, said A data from said A register is outputted to said arithmetic calculation means as an A data for a picture element immediately preceding said picture element to be encoded without shifting-up;

a C register wherein a C data from said arithmetic calculation means is latched, and contents of said latched C data is outputted as a C data; and a C selector wherein said C data from said C register and said shift-up selection signal are received, and if said selection signal indicates "shift-up", said C data from said C register is shifted-up by one bit and outputted to said arithmetic calculation means as a C data for a picture element immediately preceding said picture element to be encoded, or otherwise, said C data from said C register is outputted to said arithmetic calculation means as a C data for a picture element immediately preceding said picture element to be encoded as well as an encoded data for transmission without shifting-up.

3. A digital information encoding apparatus comprising:

a context generation means for extracting a reference picture element from an inputted picture data according to a template model to generate a context for a picture element to be encoded;

a context storage means for temporarily storing said context for said picture element to be encoded which is received from said context generation means;

a context table storage means wherein a plurality of prediction-index data having a plurality of bits are stored, one prediction-index data is outputted out of said stored plurality of prediction-index data according to a context for said picture element to be encoded from said context generation means, and one prediction-index data of said plurality of prediction-index data is rewritten by inputted renewal data according to a context for said picture element to be encoded which is temporarily stored in said context storage means;

a probability estimating table storage means wherein a plurality of probability estimating data is stored, said probability estimating data comprises an LSZ (a less probable symbol size on coding interval) data indicating a mismatch probability, an NLPS data serving as a probability estimation index of a renewal data if said prediction symbol in a prediction-index data for said picture element to be encoded from said context table storage means does not match with a picture data for said picture element to be encoded, an NMPS data serving as a probability estimation index of a renewal data if said prediction symbol in a prediction-index data for said picture element to be encoded from said context table storage means matches with a picture data for said picture element to be encoded, a SWITCH data for indicating to invert a prediction symbol in a prediction-index data stored in said context table storage means or not, and one probability estimating data is outputted from said stored plurality of probability estimating data according to the probability estimation index in said prediction-index data from said context table storage means;

an arithmetic calculation means where, if said picture data for said picture element to be encoded matches with said prediction symbol in said prediction-index data from said context table storage means, an arithmetic processing is performed according to the following equations (1) and (2) to output said A data and said C data for said picture element to be encoded, if said picture data for said picture element to be encoded does not match with said prediction symbol in said prediction-index data from said context table storage means, an arithmetic processing is performed according to the following equations (3) and (4) to output said A data and said C data for said picture element to be encoded, if said SWITCH data in said probability estimating data from said probability estimating table storage means indicates a prediction symbol should be inverted and said picture data for said picture element to be encoded does not match with said prediction symbol in said prediction-index data from said context table storage means, a value of said prediction symbol from said context table storage means is inverted, or otherwise, a value of said prediction symbol from said context table storage means is changed to a value of a prediction symbol of a renewal data, if said picture data for said picture element to be encoded matches with said prediction symbol in said prediction-index data from said context table storage means, said NMPS data in said probability estimating data from said probability estimating table storage means is outputted to said context table storage means as a probability estimation index of a renewal data, and if said picture data for said picture element to be encoded does not match with said prediction symbol in said prediction-index data from said context table storage means, said NLPS data in said probability estimating data from said probability estimating table storage means is outputted to said context table storage means as a probability estimation index of a renewal data;

an A register wherein said A data from said arithmetic calculation means is latched, contents of said latched A data is outputted as an A data, and a renormalizing signal for conducting a normalization processing, and a last renormalizing signal, which indicates that the normalization will be completed by the last one processing, are outputted;

an A selector wherein said A data form said A register and a shift-up selection signal based on said last renormalizing signal are received, and if said selection signal indicates "shift-up", said A data from said A register is shifted-up by one bit and outputted to said arithmetic calculation means as an A data for a picture element immediately preceding said picture element to be encoded, or otherwise, said A data from said A register is outputted to said arithmetic calculation means as an A data for a picture element immediately preceding said picture element to be encoded without shifting-up;

a C register wherein a C data from said arithmetic calculation means is latched, and contents of said latched C data is outputted as a C data; and a C selector wherein said C data from said C register and said shift-up selection signal are received, and if said selection signal indicates "shift-up", said C data from said C register is shifted-up by one bit and outputted to said arithmetic calculation means as a C data for a picture element immediately preceding said picture element to be encoded, or otherwise, said C data from said C register is outputted to said arithmetic calculation means as a C data for a picture element immediately preceding said picture element to be encoded as well as an encoded data for transmission without shifting-up:

$$A(k)=A(k-1)-LSZ(k) \quad (1)$$

$$C(k)=C(k-1) \quad (2)$$

$$A(k)=LSZ(k) \quad (3)$$

$$C(k)=C(k-1)+\{A(k-1)-LSZ(k)\} \quad (4)$$

where, A (k) is an A data of said picture element to be encoded (a k-th picture element to be encoded), A(k−1) is an A data of a picture element to be encoded immediately preceding said picture element to be encoded {a (k−1)-th picture element to be encoded}, C (k) is a C data of said picture element to be encoded (a k-th picture element to be encoded), C (k−1) is a C data of a picture element to be encoded immediately preceding said picture element to be encoded {a (k−1)-th picture element to be encoded}, LSZ (k) is an LSZ data indicating a mismatching probability of a probability estimating data for said picture element to be encoded (a k-th picture element to be encoded) from said probability estimating table storage means, and k=1, 2, 3, . . .

4. The digital information encoding apparatus of claim 2, wherein, said A register shifts-up a data latched therein by one bit and latch said data therein again in synchronization with a renormalizing clock signal inputted therein; and said C register shifts-up a data latched therein by one bit and latch said data therein again in synchronization with a renormalizing clock signal inputted therein.

5. A digital information encoding apparatus comprising:

a context generation means for extracting a reference picture element from an inputted picture data according to a template model to generate a context for a picture element to be encoded;

a context storage means for temporarily storing said context for said picture element to be encoded which is received from said context generation means;

a context table storage means wherein a plurality of prediction-index data having a plurality of bits are stored, one prediction-index data is outputted out of said stored plurality of prediction-index data according to a context for said picture element to be encoded from said context generation means, and one prediction-index data of said plurality of prediction-index data is rewritten by inputted renewal data according to a context for said picture element to be encoded which is temporarily stored in said context storage means;

a probability estimating table storage means wherein a plurality of probability estimating data is stored, said probability estimating data comprises an LSZ (a less probable symbol size on coding interval) data indicating a mismatch probability, an NLPS data serving as a probability estimation index of a renewal data if said prediction symbol in a prediction-index data for said picture element to be encoded from said context table storage means does not match with a picture data for said picture element to be encoded, an NMPS data serving as a probability estimation index of a renewal data if said prediction symbol in a prediction-index data for said picture element to be encoded from said context table storage means matches with a picture data for said picture element to be encoded, a SWITCH data for indicating to invert a prediction symbol in a prediction-index data stored in said context table storage means or not, and one probability estimating data is outputted from said stored plurality of probability estimating data according to the probability estimation index in said prediction-index data from said context table storage means;

an arithmetic calculation means where, if said picture data for said picture element to be encoded matches with said prediction symbol in said prediction-index data from said context table storage means, an arithmetic processing is performed according to the following equations (1) and (2) to output said A data and said C data for said picture element to be encoded, if said picture data for said picture element to be encoded does not match with said prediction symbol in said prediction-index data from said context table storage means, an arithmetic processing is performed according to the following equations (3) and (4) to output said A data and said C data for said picture element to be encoded, if said SWITCH data in said probability estimating data from said probability estimating table storage means indicates a prediction symbol should be inverted and said picture data for said picture element to be encoded does not match with said prediction symbol in said prediction-index data from said context table storage means, a value of said prediction symbol from said context table storage means is inverted, or otherwise, a value of said prediction symbol from said context table storage means is changed to a value of a prediction symbol of a renewal data, if said picture data for said picture element to be encoded matches with said prediction symbol in said prediction-index data from said context table storage means, said NMPS data in said probability estimating data from said probability estimating table storage means is outputted to said context table storage means as a probability estimation index of a renewal data, and if said picture data for said picture element to be encoded does not match with said prediction symbol in said prediction-index data from said context table storage means, said NLPS data in said probability estimating data from said probability estimating table storage means is outputted to said context table storage means as a probability estimation index of a renewal data;

an A data output means wherein said A data from said arithmetic calculation means is received, if no renormalization processing for said picture element to be encoded is required, said A data received from said arithmetic calculation means is given as a picture element to be encoded immediately preceding said picture element to be encoded, if one renormalization processing for said picture element to be encoded is required, said A data received from said arithmetic calculation means is shifted-up by one bit and given as a picture element to be encoded immediately preceding said picture element to be encoded; and a C data output means wherein said C data from said arithmetic calculation means is received, if no renormalization processing for said picture element to be encoded is required, said C data received from said arithmetic calculation means is given as a picture element to be encoded immediately preceding said picture element to be encoded, if one renormalization processing for said picture element to be encoded is required, said C data received from said arithmetic calculation means is shifted-up by one bit and given as a picture element to be encoded immediately preceding said picture element to be encoded as well as an encoded data for transmission:

$$A(k)=A(k-1)-LSZ(k) \tag{1}$$

$$C(k)=C(k-1) \tag{2}$$

$$A(k)=LSZ(k) \tag{3}$$

$$C(k)=C(k-1)+\{A(k-1)-LSZ(k)\} \tag{4}$$

where, A (k) is an A data of said picture element to be encoded (a k-th picture element to be encoded), A(k−1) is an A data of a picture element to be encoded immediately preceding said picture element to be encoded {a (k−1)-th picture element to be encoded}, C (k) is a C data of said picture element to be encoded (a k-th picture element to be encoded), C (k−1) is a C data of a picture element to be encoded immediately preceding said picture element to be encoded {a (k−1)-th picture element to be encoded}, LSZ (k) is an LSZ data indicating a mismatching probability of a probability estimating data for said picture element to be encoded (a k-th picture element to be encoded) from said probability estimating table storage means, and k=1, 2, 3, . . .

6. A digital information decoding apparatus comprising:

a context generation means receiving a decoded picture data, extracting a reference picture element from said received picture data according to a template model to generate a context for a picture element to be decoded;

a context storage means for temporarily storing said context for said picture element to be decoded from said context generation means;

a context table storage means comprising a read address input node for receiving said context from said context generation means, a read/write context table storing portion for storing a plurality of prediction-index data having a plurality of bits, a data output node which outputs said prediction-index data stored in said context table storing portion in an address based on said context received on said read address input node, a write address input node for receiving said context temporarily stored in said context storage means, and a data input node which receives a renewal data written in said context table storing portion in an address based on said context received on said write address input node;

a probability estimating table storage means comprising an address input node for receiving a probability estimation index in a probability estimating data from said context table storing portion, a probability estimating table storing portion for storing a plurality of probability estimating data having a plurality of bits, and a data output node which outputs a probability estimating data stored in said probability estimating table storing portion in an address based on said probability estimation index received on said address input node;

an arithmetic calculation means for receiving, a prediction symbol in a prediction-index data from said context table storage means, a probability estimating data from said probability estimating table storage means, an A data indicating a width A of effective area for a picture element which immediately preceding said picture element to be decoded, and a C data indicating a code word C for a picture element which is immediately precedes said picture element to be decoded, and conducting a predetermined arithmetic processing, for outputting the A data indicating a width A of effective area for said picture element to be decoded and a C data indicating a code word C for said picture element to be decoded, and for outputting a renewal data including both the prediction symbol and the probability estimation index to be decoded to said context table storage means, and for outputting a decoded picture data for said picture element to be decoded.

7. A digital information decoding apparatus comprising:

a context generation means receiving a decoded picture data, extracting a reference picture element from said received picture data according to a template model to generate a context for a picture element to be decoded;

a context table storage means wherein a plurality of prediction-index data having a plurality of bits are stored, one prediction-index data is outputted out of said stored plurality of prediction-index data according to a context for said picture element to be decoded from said context generation means, and stored contents based on a context for said picture element to be decoded are rewritten by a inputted renewal data when a renormalization processing is required for said picture element to be decoded;

a probability estimating table storage means wherein a plurality of probability estimating data having a plurality of bits are stored, and one probability estimating data is outputted from said stored plurality of probability estimating data according to a probability estimation index in said prediction-index data from said context table storage means;

an arithmetic calculation means for receiving, a prediction symbol in a prediction-index data from said context table storage means, a probability estimating data from said probability estimating table storage means, an A data indicating a width A of effective area for a picture element which immediately preceding said picture element to be decoded, and a C data indicating a code word C for a picture element which is immediately precedes said picture element to be decoded, and conducting a predetermined arithmetic processing, for outputting the A data indicating a width A of effective area for said picture element to be decoded and a C data indicating a code word C for said picture element to be decoded, and for outputting a renewal data including both the prediction symbol and the probability estimation index to be decoded to said context table storage means, and for outputting a decoded picture data for said picture element to be decoded;

an A register wherein said A data from said arithmetic calculation means is latched, contents of said latched A data is outputted as an A data, and a renormalizing signal for conducting a normalization processing, and a last renormalizing signal, which indicates that the normalization will be completed by the last one processing, are outputted;

an A selector wherein said A data form said A register and a shift-up selection signal based on said last renormalizing signal are received, and if said selection signal indicates "shift-up", said A data from said A register is shifted-up by one bit and outputted to said arithmetic calculation means as an A data for a picture element immediately preceding said picture element to be decoded, or otherwise, said A data from said A register is outputted to said arithmetic calculation means as an A data for a picture element immediately preceding said picture element to be decoded without shifting-up;

a C register wherein a C data from said arithmetic calculation means is received, an encoded data received therein is inputted via an input means, and contents latched therein is outputted as a C data according to said C data and said encoded data received therein; and a C selector wherein said C data from said C register and said shift-up selection signal are received, and if said selection signal indicates "shift-up", said C data from said C register is shifted-up by one bit and outputted to said arithmetic calculation means as a C data for a picture element immediately preceding said picture element to be decoded, or otherwise, said C data from said C register is outputted to said arithmetic calculation means as a C data for a picture element immediately preceding said picture element to be decoded without shifting-up.

8. A digital information decoding apparatus comprising:

a context generation means receiving a decoded picture data, extracting a reference picture element from said received picture data according to a template model to generate a context for a picture element to be decoded;

a context storage means for temporarily storing said context for said picture element to be decoded from said context generation means;

a context table storage means wherein a plurality of prediction-index data having a plurality of bits are stored, one prediction-index data is outputted out of said stored plurality of prediction-index data according to a context for said picture element to be decoded from said context generation means, and one prediction-index data of said plurality of prediction-index data is rewritten by inputted renewal data according to a context for said picture element to be decoded which is temporarily stored in said context storage means;

a probability estimating table storage means wherein a plurality of probability estimating data is stored, said probability estimating data comprises an LSZ (a less probable symbol size on coding interval) data indicating a mismatch probability, an NLPS data serving as a probability estimation index of a renewal data if equation (5) in the following is not satisfied, an NMPS data serving as a probability estimation index of a renewal data if equation (5) in the following is satisfied, a SWITCH data for indicating to invert a prediction symbol in a prediction-index data stored in said context table storage means or not, and one probability estimating data is outputted from said stored plurality of probability estimating data according to the probability estimation index in said prediction-index data from said context table storage means;

an arithmetic calculation means in which an arithmetic processing according to the following equations (5) is performed, an arithmetic processing according to the following equations (6) and (7) is performed to output said A data and said C data for said picture element to be decoded if equation (5) in the following is satisfied, if equation (5) in the following is not satisfied, an arithmetic processing according to the following equations (8) and (9) is performed to output said A data and said C data for said picture element to be decoded, if said SWITCH data in said probability estimating data from said probability estimating table storage means indicates an inversion of a prediction symbol and the also equation (5) in the following is not satisfied, a value of said prediction symbol from said context table storage means is inverted, or otherwise, a value of said prediction symbol from said context table storage means is changed to a value of a prediction symbol of a renewal data, if the equation (5) in the following is satisfied, said NMPS data in said probability estimating data from said probability estimating table storage means is outputted to said context table storage means as a probability estimation index of a renewal data, if equation (5) in the following is not satisfied, said NLPS data in said probability estimating data from said probability estimating table storage means is outputted to said context table storage means as a probability estimation index of a renewal data, if equation (5) in the following is satisfied, said prediction symbol in said prediction-index data from said context table storage means is inverted and outputted as a decoded picture data for said picture element to be decoded, and if equation (5) in the following is not satisfied, said prediction symbol in said prediction-index data from said context table storage means is outputted as a decoded picture data for said picture element to be decoded without being inverted;

an A register wherein said A data from said arithmetic calculation means is latched, contents of said latched A data is outputted as an A data, and a renormalizing signal for conducting a normalization processing, and a last renormalizing signal, which indicates that the normalization will be completed by the last one processing, are outputted;

an A selector wherein said A data form said A register and a shift-up selection signal based on said last renormalizing signal are received, and if said selection signal indicates "shift-up", said A data from said A register is shifted-up by one bit and outputted to said arithmetic calculation means as an A data for a picture element immediately preceding said picture element to be decoded, or otherwise, said A data from said A register is outputted to said arithmetic calculation means as an A data for a picture element immediately precedes said picture element to be decoded;

a C register wherein a C data from said arithmetic calculation means is received, an encoded data received therein is inputted via an input means, and contents latched therein is outputted as a C data according to said C data and said encoded data received therein; and a C selector wherein said C data from said C register and said shift-up selection signal are received, and if said selection signal indicates "shift-up", said C data from said C register is shifted-up by one bit and outputted to said arithmetic calculation means as a C data for a picture element immediately preceding said picture element to be decoded, or otherwise, said C data from said C register is outputted to said arithmetic calculation means as a C data for a picture element immediately preceding said picture element to be decoded without shifting-up:

$$A(k)=A(k-1)-LSZ(k) \quad (1)$$

$$C(k)=C(k-1) \quad (2)$$

$$A(k)=LSZ(k) \quad (3)$$

$$C(k)=C(k-1)+\{A(k-1)-LSZ(k)\} \quad (4)$$

where, A (k) is an A data of said picture element to be decoded (a k-th picture element to be decoded), A(k−1) is an A data of a picture element to be decoded immediately precedes said picture element to be decoded {a (k−1)-th picture element to be decoded}, C (k) is a C data of said picture element to be decoded (a k-th picture element to be decoded), C (k−1) is a C data of a picture element to be decoded immediately preceding said picture element to be decoded {a (k−1)-th picture element to be decoded}, LSZ (k) is an LSZ data indicating a mismatching probability of a probability estimating data for said picture element to be decoded (a k-th picture element to be decoded) from said probability estimating table storage means, and k=1, 2, 3, . . .

9. A digital information decoding apparatus of claim 7, wherein, said A register shifts-up a data latched therein by one bit and latches said data therein again in synchronization with a renormalizing clock signal inputted therein; and said C register shifts-up a data latched therein by one bit and latch said data therein again in synchronization with a renormalizing clock signal inputted therein.

10. A digital information decoding apparatus comprising:

a context generation means receiving a decoded picture data, extracting a reference picture element from said received picture data according to a template model to generate a context for a picture element to be decoded;

a context storage means for temporarily storing said context for said picture element to be decoded from said context generation means;

a context table storage means wherein a plurality of prediction-index data having a plurality of bits are stored, one prediction-index data is outputted out of said stored plurality of prediction-index data according to a context for said picture element to be decoded from said context generation means, and one prediction-index data of said plurality of prediction-index data is rewritten by inputted renewal data according to a context for said picture element to be decoded which is temporarily stored in said context storage means;

a probability estimating table storage means wherein a plurality of probability estimating data is stored, said probability estimating data comprises an LSZ (a less probable symbol size on coding interval) data indicating a mismatch probability, an NLPS data serving as a probability estimation index of a renewal data if equation (5) in the following is not satisfied, an NMPS data serving as a probability estimation index of a renewal data if equation (5) in the following is satisfied, a SWITCH data for indicating to invert a prediction symbol in a prediction-index data stored in said context table storage means or not, and one probability estimating data is outputted from said stored plurality of probability estimating data according to the probability estimation index in said prediction-index data from said context table storage means;

an arithmetic calculation means in which an arithmetic processing according to the following equations (5) is performed, an arithmetic processing according to the following equations (6) and (7) is performed to output said A data and said C data for said picture element to be decoded if equation (5) in the following is satisfied, if equation (5) in the following is not satisfied, an arithmetic processing according to the following equations (8) and (9) is performed to output said A data and said C data for said picture element to be decoded, if said SWITCH data in said probability estimating data from said probability estimating table storage means indicates an inversion of a prediction symbol and the also equation (5) in the following is not satisfied, a value of said prediction symbol from said context table storage means is inverted, or otherwise, a value of said prediction symbol from said context table storage means is changed to a value of a prediction symbol of a renewal data, if the equation (5) in the following is satisfied, said NMPS data in said probability estimating data from said probability estimating table storage means is outputted to said context table storage means as a probability estimation index of a renewal data, if equation (5) in the following is not satisfied, said NLPS data in said probability estimating data from said probability estimating table storage means is outputted to said contex probability estimation index of a renewal data, if equation (5) in the following is satisfied, said prediction symbol in said prediction-index data from said context table storage means is inverted and outputted as a decoded picture data for said picture element to be decoded, and if equation (5) in the following is not satisfied, said prediction symbol in said prediction-index data from said context table storage means is outputted as a decoded picture data for said picture element to be decoded without being inverted;

an A data output means wherein said A data from said arithmetic calculation means is received, if no renormalization processing for said picture element to be decoded is required, said A data received from said arithmetic calculation means is given as a picture element to be decoded immediately preceding said picture element to be decoded, if one renormalization processing for said picture element to be decoded is required, said A data received from said arithmetic calculation means is shifted-up by one bit and given as a picture element to be decoded immediately preceding said picture element to be decoded; and a C data output means wherein said C data from said arithmetic calculation means is received, an encoded data received therein is inputted via an input means, if no renormalization processing for said picture element to be decoded is required, contents latched therein according to said C data and said encoded data received therein is given as a C data and as a picture element to be decoded immediately preceding said picture element to be decoded, and if one renormalization processing for said picture element to be decoded is required, contents latched therein are shifting-up by one bit according to said C data and said encoded data received therein and given as a picture element to be decoded immediately preceding said picture element to be decoded:

$$C(k-1) < A(k-1) - LSZ(k) \quad (5)$$

$$A(k) = A(k-1) - LSZ(k) \quad (6)$$

$$C(k) = C(k-1) \quad (7)$$

$$A(k) = LSZ(k) \quad (8)$$

$$C(k) = C(k-1) + \{A(k-1) - LSZ(k)\} \quad (9)$$

where, A (k) is an A data of said picture element to be decoded (a k-th picture element to be decoded), A(k−1) is an A data of a picture element to be decoded immediately preceding said picture element to be decoded {a (k−1)-th picture element to be decoded}, C (k) is a C data of said picture element to be decoded (a k-th picture element to be decoded), C (k−1) is a C data of a picture element to be decoded immediately preceding said picture element to be decoded {a (k−1)-th picture element to be decoded}, LSZ (k) is an LSZ data indicating a mismatching probability of a probability estimating data for said picture element to be decoded (a k-th picture element to be decoded) from said probability estimating table storage means, and k=1, 2, 3, . . . .

11. A digital information encoding/decoding apparatus comprising:

a context generation means for receiving a picture data selected from either an inputted picture data or a decoded picture data, for extracting a reference picture element from said received picture data according to a template model, for generating a context for a picture element to be encoded if said selected picture data is said inputted picture data, and for generating a context for a picture element to be decoded if said selected picture data is said decoded picture data;

a context storage means for temporarily storing said context for said picture element to be encoded or said context for said picture element to be decoded from said context generation means;

a context table storage means comprising a read address input node for receiving said context from said context generation means, a read/write context table storing portion for storing a plurality of prediction-index data having a plurality of bits, a data output node which outputs said prediction-index data stored in said context table storing portion in an address based on said context received on said read address input node, a write address input node for receiving said context temporarily stored in said context storage means, and a data input node which receives a renewal data written in said context table storing portion in an address based on said context received on said write address input node;

a probability estimating table storage means comprising an address input node for receiving a probability estimation index in a probability estimating data from said context table storing portion, a probability estimating table storing portion for storing a plurality of probability estimating data having a plurality of bits, and a data output node which outputs a probability estimating data stored in said probability estimating table storing portion in an address based on said probability estimation index received on said address input node;

an encoding arithmetic calculation means for receiving a picture data for said picture element to be encoded, a prediction symbol in a prediction-index data from said context table storage means, a probability estimating data from said probability estimating table storage means, an A data indicating a width A of effective area for a picture element which immediately precedes said picture element to be encoded, and a C data indicating a code word C for a picture element which is immediately preceding said picture element to be encoded, and conducting a predetermined arithmetic processing, for outputting the A data indicating a width A of effective area for said picture element to be encoded and a C data indicating a code word C for said picture element to be encoded, and for outputting a renewal data including both the prediction symbol and the probability estimation index to said context table storage mean; and a decoding arithmetic calculation means for receiving, a prediction symbol in a prediction-index data from said context table storage means, a probability estimating data from said probability estimating table storage means, an A data indicating a width A of effective area for a picture element which immediately preceding said picture element to be decoded, and a C data indicating a code word C for a picture element which is immediately preceding said picture element to be decoded, and conducting a predetermined arithmetic processing, for outputting the A data indicating a width A of effective area for said picture element to be decoded and a C data indicating a code word C for said picture element to be decoded, and for outputting a renewal data including both the prediction symbol and the probability estimation index to be decoded to said context table storage means, and for outputting a decoded picture data for said picture element to be decoded.

12. A digital information encoding/decoding apparatus comprising:

a context generation means receiving a picture data selected from either an inputted picture data or a decoded picture data, extracting a reference picture element from said received picture data according to a template model, generating a context for a picture element to be encoded if said selected picture data is said inputted picture data, generating a context for a picture element to be decoded if said selected picture data is said decoded picture data;

a context table storage means wherein a plurality of prediction-index data having a plurality of bits are stored, a context from said context generation means is received, in case of encoding processing, the stored contents based on a context for said picture element to be encoded are rewritten by a inputted renewal data when a renormalization processing is required for said picture element to be encoded, in case of decoding processing, the stored contents based on a context for said picture element to be decoded are rewritten by a inputted renewal data when a renormalization processing is required for said picture element to be decoded;

a probability estimating table storage means wherein a plurality of probability estimating data having a plurality of bits are stored, and one probability estimating data is outputted from said stored plurality of probability estimating data according to a probability estimation index in said prediction-index data from said context table storage means;

an encoding arithmetic calculation means for receiving a picture data for said picture element to be encoded, a prediction symbol in a prediction-index data from said context table storage means, a probability estimating data from said probability estimating table storage means, an A data indicating a width A of effective area for a picture element which immediately precedes said picture element to be encoded, and a C data indicating a code word C for a picture element which is immediately preceding said picture element to be encoded, and conducting a predetermined arithmetic processing, for outputting the A data indicating a width A of effective area for said picture element to be encoded and a C data indicating a code word C for said picture element to be encoded, and for outputting a renewal data including both the prediction symbol and the probability estimation index to said context table storage means;

an encoding A register wherein said A data from said encoding arithmetic calculation means is latched, contents of said latched A data is outputted as an A data, and a renormalizing signal for conducting a normalization processing, and a last renormalizing signal, which indicates that the normalization will be completed by the last one processing, are outputted;

an encoding A selector wherein said A data form said encoding A register and a shift-up selection signal based on said last renormalizing signal are received, and if said selection signal indicates "shift-up", said encoding A data from said encoding A register is shifted-up by one bit and outputted to said encoding arithmetic calculation means as an A data for a picture element immediately preceding said picture element to be encoded, or otherwise, said A data from said encoding A register is outputted to said encoding arithmetic calculation means as an A data for a picture element immediately preceding said picture element to be encoded without shifting-up;

a encoding C register wherein a C data from said encoding arithmetic calculation means is latched, and contents of said latched C data is outputted as a C data;

an encoding C selector wherein said C data from said encoding C register and said shift-up selection signal are received, and if said selection signal indicates "shift-up", said C data from said encoding C register is shifted-up by one bit and outputted to said encoding arithmetic calculation means as a C data for a picture element immediately preceding said picture element to be encoded, or otherwise, said C data from said encoding C register is outputted to said encoding arithmetic calculation means as a C data for a picture element immediately preceding said picture element to be encoded as well as an encoded data for transmission without shifting-up;

a decoding arithmetic calculation means for receiving, a prediction symbol in a prediction-index data from said context table storage means, a probability estimating data from said probability estimating table storage means, an A data indicating a width A of effective area for a picture element which immediately preceding said picture element to be decoded, and a C data indicating a code word C for a picture element which is immediately preceding said picture element to be decoded, and conducting a predetermined arithmetic processing, for outputting the A data indicating a width A of effective area for said picture element to be decoded and a C data indicating a code word C for said picture element to be decoded, and for outputting a renewal data including both the prediction symbol and the probability estimation index to be decoded to said context table storage means, and for outputting a decoded picture data for said picture element to be decoded;

a decoding A register wherein said A data from said decoding arithmetic calculation means is latched, contents of said latched A data is outputted as an A data, and a renormalizing signal for conducting a normalization processing, and a last renormalizing signal, which indicates that the normalization will be completed by the last one processing, are outputted;

a decoding A selector wherein said A data form said decoding A register and a shift-up selection signal based on said last renormalizing signal are received, and if said selection signal indicates "shift-up", said A data from said decoding A register is shifted-up by one bit and outputted to said decoding arithmetic calculation means as an A data for a picture element immediately preceding said picture element to be decoded, or otherwise, said A data from said decoding A register is outputted to said decoding arithmetic calculation means as an A data for a picture element immediately preceding said picture element to be decoded without shifting-up;

a decoding C register wherein a C data from said decoding arithmetic calculation means is received, an encoded data received therein is inputted via an input means, and contents latched therein is outputted as a C data according to said C data and said encoded data received therein; and a decoding C selector wherein said C data from said decoding C register and said shift-up selection signal are received, and if said selection signal indicates "shift-up", said C data from said decoding C register is shifted-up by one bit and outputted to said decoding arithmetic calculation means as a C data for a picture element immediately preceding said picture element to be decoded, or otherwise, said C data from said decoding C register is outputted to said decoding arithmetic calculation means as a C data for a picture element immediately preceding said picture element to be decoded as well as a decoded data for transmission without shifting-up.

13. A digital information encoding/decoding apparatus comprising:

a context generation means for receiving a picture data selected from either an inputted picture data or a decoded picture data, for extracting a reference picture element from said received picture data according to a template model, for generating a context for a picture element to be encoded if said selected picture data is said inputted picture data, and for generating a context for a picture element to be decoded if said selected picture data is said decoded picture data;

a context storage means temporarily storing said context for said picture element to be encoded from said context generation means or said context for said picture element to be decoded from said context generation means;

a context table storage means wherein a plurality of prediction-index data having a plurality of bits are stored, a context from said context generation means is received, in case of encoding process, one prediction-index data is outputted out of said stored plurality of prediction-index data according to a context for said received picture element to be encoded, and one prediction-index data of said plurality of prediction-index data is rewritten by inputted renewal data according to a context for said picture element to be encoded which is temporarily stored in said context storage means, and in case of decoding process, one prediction-index data is outputted out of said stored plurality of prediction-index data according to a context for said received picture element to be decoded, and one prediction-index data of said plurality of prediction-index data is rewritten by inputted renewal data according to a context for said picture element to be decoded which is temporarily stored in said context storage means;

a probability estimating table storage means in which a plurality of probability estimating data is stored, said probability estimating data comprises an LSZ (a less probable symbol size on coding interval) data indicating a mismatching probability, an NLPS data serving as a probability estimation index of a renewal data, an NMPS data serving as a probability estimation index of a renewal data, a SWITCH data for indicating to invert a prediction symbol in a prediction-index data stored in said context table storage means or not, and one probability estimating data is outputted from said stored plurality of probability estimating data according to the probability estimation index in said prediction-index data from said context table storage means;

an encoding arithmetic calculation means where, if said picture data for said picture element to be encoded matches with said prediction symbol in said prediction-index data from said context table storage means, an arithmetic processing is performed according to the following equations (1) and (2) to output said A data and said C data for said picture element to be encoded, if said picture data for said picture element to be encoded does not match with said prediction symbol in said prediction-index data from said context table storage means, an arithmetic processing is performed according to the following equations (3) and (4) to output said A data and said C data for said picture element to be encoded, if said SWITCH data in said probability estimating data from said probability estimating table storage means indicates a prediction symbol should be inverted and said picture data for said picture element to be encoded does not match with said prediction symbol in said prediction-index data from said context table storage means, a value of said prediction symbol from said context table storage means is inverted, or otherwise, a value of said prediction symbol from said context table storage means is changed to a value of a prediction symbol of a renewal data, if said picture data for said picture element to be encoded matches with said prediction symbol in said prediction-index data from said context table storage means, said NMPS data in said probability estimating data from said probability estimating table storage means is outputted to said context table storage means as a probability estimation index of a renewal data, and if said picture data for said picture element to be encoded does not match with said prediction symbol in said prediction-index data from said context table storage means, said NLPS data in said probability estimating data from said probability estimating table storage means is outputted to said context table storage means as a probability estimation index of a renewal data;

an encoding A register wherein said A data from said encoding arithmetic calculation means is latched, contents of said latched A data is outputted as an A data, and a renormalizing signal for conducting a normalization processing, and a last renormalizing signal, which indicates that the normalization will be completed by the last one processing, are outputted;

an encoding A selector wherein said A data form said encoding A register and a shift-up selection signal based on said last renormalizing signal are received, and if said selection signal indicates "shift-up", said encoding A data from said encoding A register is shifted-up by one bit and outputted to said encoding arithmetic calculation means as an A data for a picture element immediately preceding said picture element to be encoded, or otherwise, said A data from said encoding A register is outputted to said encoding arithmetic calculation means as an A data for a picture element immediately preceding said picture element to be encoded without shifting-up;

a encoding C register wherein a C data from said encoding arithmetic calculation means is latched, and contents of said latched C data is outputted as a C data;

an encoding C selector wherein said C data from said encoding C register and said shift-up selection signal are received, and if said selection signal indicates "shift-up", said C data from said encoding C register is shifted-up by one bit and outputted to said encoding arithmetic calculation means as a C data for a picture element immediately preceding said picture element to be encoded, or otherwise, said C data from said encoding C register is outputted to said encoding arithmetic calculation means as a C data for a picture element immediately preceding said picture element to be encoded as well as an encoded data for transmission without shifting-up;

a decoding arithmetic calculation means in which an arithmetic processing according to the following equations (5) is performed, an arithmetic processing according to the following equations (6) and (7) is performed to output said A data and said C data for said picture element to be decoded if equation (5) in the following is satisfied, if equation (5) in the following is not satisfied, an arithmetic processing according to the following equations (8) and (9) is performed to output said A data and said C data for said picture element to be decoded, if said SWITCH data in said probability estimating data from said probability estimating table storage means indicates an inversion of a prediction symbol and the also equation (5) in the following is not satisfied, a value of said prediction symbol from said context table storage means is inverted, or otherwise, a value of said prediction symbol from said context table storage means is changed to a value of a prediction symbol of a renewal data, if the equation (5) in the following is satisfied, said NMPS data in said probability estimating data from said probability estimating table storage means is outputted to said context table storage means as a probability estimation index of a renewal data, if equation (5) in the following is not satisfied, said NLPS data in said probability estimating data from said probability estimating table storage means is outputted to said context table storage means as a probability estimation index of a renewal data, if equation (5) in the following is satisfied, said prediction symbol in said prediction-index data from said context table storage means is inverted and outputted as a decoded picture data for said picture element to be decoded, and if equation (5) in the following is not satisfied, said prediction symbol in said prediction-index data from said context table storage means is outputted as a decoded picture data for said picture element to be decoded without being inverted;

a decoding A register wherein said A data from said decoding arithmetic calculation means is latched, contents of said latched A data is outputted as an A data, and a renormnalizing signal for conducting a normalization processing, and a last renormalizing signal, which indicates that the normalization will be completed by the last one processing, are outputted;

a decoding A selector wherein said A data form said decoding A register and a shift-up selection signal based on said last renormalizing signal are received, and if said selection signal indicates "shift-up", said decoding A data from said decoding A register is shifted-up by one bit and outputted to said decoding arithmetic calculation means as an A data for a picture element immediately preceding said picture element to be encoded, or otherwise, said A data from said decoding A register is outputted to said decoding arithmetic calculation means as an A data for a picture element immediately preceding said picture element to be encoded without shifting-up;

a decoding C register wherein a C data from said decoding arithmetic calculation means is received, an encoded data received therein is inputted via an input means, and contents latched therein is outputted as a C data according to said C data and said encoded data received therein; and a decoding C selector wherein said C data from said decoding C register and shift-up selection signal are received, and if said selection signal indicates "shift-up", said C data from said decoding C register is shifted-up by one bit and outputted to said decoding arithmetic calculation means as a C data for a picture element immediately preceding said picture element to be decoded, or otherwise, said C data from said decoding C register is outputted to said decoding arithmetic calculation means as a C data for a picture element immediately preceding said picture element to be decoded without shifting-up:

$$A(k)=A(k-1)-LSZ(k) \quad (1)$$

$$C(k)=C(k-1) \quad (2)$$

$$A(k)=LSZ(k) \quad (3)$$

$$C(k)=C(k-1)+\{A(k-1)-LSZ(k)\} \quad (4)$$

$$C(k-1)<A(k-1)-LSZ(k) \quad (5)$$

$$A(k)=A(k-1)-LSZ(k) \quad (6)$$

$$C(k)=C(k-1) \quad (7)$$

$$A(k)=LSZ(k) \quad (8)$$

$$C(k)=C(k-1)+\{A(k-1)-LSZ(k)\} \quad (9)$$

where, A (k) is an A data of said picture element to be encoded or a picture element to be decoded (a k-th picture element to be encoded or a picture element to be decoded), A (k−1) is an A data of a picture element to be encoded or a picture element to be decoded immediately preceding said picture element to be encoded or a picture element to be decoded {a (k−1)-th picture element to be encoded or a picture element to be decoded}, C (k) is a C data of said picture element to be encoded or a picture element to be decoded (a k-th picture element to be encoded or a picture element to be decoded), C (k−1) is a C data of a picture element to be encoded or a picture element to be decoded immediately preceding said picture element to be encoded or a picture element to be decoded {a (k−1)-th picture element to be encoded or a picture element to be decoded}, LSZ (k) is an LSZ data indicating a mismatching probability of a probability estimating data for said picture element to be encoded or a picture element to be decoded (a k-th picture element to be encoded or a picture element to be decoded) from said probability estimating table storage means, and k=1, 2, 3, . . . .

14. A digital information encoding/decoding apparatus of claim 12, wherein, said encoding A register shifts-up a data latched therein by one bit and latches said data therein again in synchronization with a renormalizing clock signal inputted therein;

said encoding C register shifts-up a data latched therein by one bit and latch said data therein again in synchronization with a renormalizing clock signal inputted therein;

said decoding A register shifts-up a data latched therein by one bit and latch said data therein again in synchronization with a renormalizing clock signal inputted therein; and said decoding C register shifts-up a data latched therein by one bit and latch said data therein again in synchronization with a renormnalizing clock signal inputted therein.

15. A digital information encoding/decoding apparatus comprising:

a context generation means for receiving a picture data selected from either an inputted picture data or a decoded picture data, for extracting a reference picture element from said received picture data according to a template model, for generating a context for a picture element to be encoded if said selected picture data is said inputted picture data, and for generating a context for a picture element to be decoded if said selected picture data is said decoded picture data;

a context storage means temporarily storing said context for said picture element to be encoded from said context generation means or said context for said picture element to be decoded from said context generation means;

a context table storage means wherein a plurality of prediction-index data having a plurality of bits are stored, a context from said context generation means is received, in case of encoding process, one prediction-index data is outputted out of said stored plurality of prediction-index data according to a context for said received picture element to be encoded, and one prediction-index data of said plurality of prediction-index data is rewritten by inputted renewal data according to a context for said picture element to be encoded which is temporarily stored in said context storage means, and in case of decoding process, one prediction-index data is outputted out of said stored plurality of prediction-index data according to a context for said received picture element to be decoded, and one prediction-index data of said plurality of prediction-index data is rewritten by inputted renewal data according to a context for said picture element to be decoded which is temporarily stored in said context storage means;

a probability estimating table storage means in which a plurality of probability estimating data is stored, said probability estimating data comprises an LSZ (a less probable symbol size on coding interval) data indicating a mismatching probability, an NLPS data serving as a probability estimation index of a renewal data, an NMPS data serving as a probability estimation index of a renewal data, a SWITCH data for indicating to invert a prediction symbol in a prediction-index data stored in said context table storage means or not, and one probability estimating data is outputted from said stored plurality of probability estimating data according to the probability estimation index in said prediction-index data from said context table storage means;

an encoding arithmetic calculation means where, if said picture data for said picture element to be encoded matches with said prediction symbol in said prediction-index data from said context table storage means, an arithmetic processing is performed according to the following equations (1) and (2) to output said A data and said C data for said picture element to be encoded, if said picture data for said picture element to be encoded does not match with said prediction symbol in said prediction-index data from said context table storage means, an arithmetic processing is performed according to the following equations (3) and (4) to output said A data and said C data for said picture element to be encoded, if said SWITCH data in said probability estimating data from said probability estimating table storage means indicates a prediction symbol should be inverted and said picture data for said picture element to be encoded does not match with said prediction symbol in said prediction-index data from said context table storage means, a value of said prediction symbol from said context table storage means is inverted, or otherwise, a value of said prediction symbol from said context table storage means is changed to a value of a prediction symbol of a renewal data, if said picture data for said picture element to be encoded matches with said prediction symbol in said prediction-index data from said context table storage means, said NMPS data in said probability estimating data from said probability estimating table storage means is outputted to said context table storage means as a probability estimation index of a renewal data, and if said picture data for said picture element to be encoded does not match with said prediction symbol in said prediction-index data from said context table storage means, said NLPS data in said probability estimating data from said probability estimating table storage means is outputted to said context table storage means as a probability estimation index of a renewal data;

an encoding A data output means wherein said A data from said encoding arithmetic calculation means is received, if no renormalization processing for said picture element to be encoded is required, said A data received from said encoding arithmetic calculation means is given as a picture element to be encoded immediately preceding said picture element to be encoded, if one renormalization processing for said picture element to be encoded is required, said A data received from said encoding arithmetic calculation means is shifted-up by one bit and given as a picture element to be encoded immediately preceding said picture element to be encoded;

an encoding C data output means wherein said C data from said encoding arithmetic calculation means is received, if no renormalization processing for said picture element to be encoded is required, said C data received from said encoding arithmetic calculation means is given as a picture element to be encoded immediately preceding said picture element to be encoded, if one renormalization processing for said picture element to be encoded is required, said C data received from said encoding arithmetic calculation means is shifted-up by one bit and given as a picture element to be encoded immediately preceding said picture element to be encoded as well as an encoded data for transmission;

a decoding arithmetic calculation means in which an arithmetic processing according to the following equations (5) is performed, an arithmetic processing according to the following equations (6) and (7) is performed to output said A data and said C data for said picture element to be decoded if equation (5) in the following is satisfied, if equation (5) in the following is not satisfied, an arithmetic processing according to the following equations (8) and (9) is performed to output said A data and said C data for said picture element to be decoded, if said SWITCH data in said probability estimating data from said probability estimating table storage means indicates an inversion of a prediction symbol and the also equation (5) in the following is not satisfied, a value of said prediction symbol from said context table storage means is inverted, or otherwise, a value of said prediction symbol from said context table storage means is changed to a value of a prediction symbol of a renewal data, if the equation (5) in the following is satisfied, said NMPS data in said probability estimating data from said probability estimating table storage means is outputted to said context table storage means as a probability estimation index of a renewal data, if equation (5) in the following is not satisfied, said NLPS data in said probability estimating data from said probability estimating table storage means is outputted to said context table storage means as a probability estimation index of a renewal data, if equation (5) in the following is satisfied, said prediction symbol in said prediction-index data from said context table storage means is inverted and outputted as a decoded picture data for said picture element to be decoded, and if equation (5) in the following is not satisfied, said prediction symbol in said prediction-index data from said context table storage means is outputted as a decoded picture data for said picture element to be decoded without being inverted;

a decoding A data output means wherein said A data from said decoding arithmetic calculation means is received, if no renormalization processing for said picture element to be decoded is required, said A data received from said decoding arithmetic calculation means is given as a picture element to be decoded immediately preceding said picture element to be decoded, if one renormalization processing for said picture element to be decoded is required, said A data received from said decoding arithmetic calculation means is shifted-up by one bit and given as a picture element to be decoded immediately preceding said picture element to be decoded; and a decoding C data output means wherein said C data and encoded data from said decoding arithmetic calculation means is received, if no renormalization processing for said picture element to be decoded is required, said C data received from said decoding arithmetic calculation means is given as a picture element to be decoded immediately preceding said picture element to be decoded, if one renormalization processing for said picture element to be decoded is required, said C data received from said decoding arithmetic calculation means is shifted-up by one bit and given as a picture element to be decoded immediately preceding said picture element to be decoded as well as an encoded data for transmission:

$$A(k)=A(k-1)-LSZ(k) \quad (1)$$

$$C(k)=C(k-1) \quad (2)$$

$$A(k)=LSZ(k) \quad (3)$$

$$C(k)=C(k-1)+\{A(k-1)-LSZ(k)\} \quad (4)$$

$$C(k-1)<A(k-1)-LSZ(k) \quad (5)$$

$$A(k)=A(k-1)-LSZ(k) \quad (6)$$

$$C(k)=C(k-1) \quad (7)$$

$$A(k)=LSZ(k) \quad (8)$$

$$C(k)=C(k-1)+\{A(k-1)-LSZ(k)\} \quad (9)$$

where, A (k) is an A data of said picture element to be encoded or a picture element to be decoded (a k-th picture element to be encoded or a picture element to be decoded), A (k−1) is an A data of a picture element to be encoded or a picture element to be decoded immediately preceding said picture element to be encoded or a picture element to be decoded {a (k−1)-th picture element to be encoded or a picture element to be decoded}, C (k) is a C data of said picture element to be encoded or a picture element to be decoded (a k-th picture element to be encoded or a picture element to be decoded), C (k−1) is a C data of a picture element to be encoded or a picture element to be decoded immediately preceding said picture element to be encoded or a picture element to be decoded {a (k−1)-th picture element to be encoded or a picture element to be decoded}, LSZ (k) is an LSZ data indicating a mismatching probability of a probability estimating data for said picture element to be encoded or a picture element to be decoded (a k-th picture element to be encoded or a picture element to be decoded) from said probability estimating table storage means, and k=1, 2, 3, . . . .

16. A digital information encoding method comprising steps of:

during one clock of a system clock signal when encoding processing for a picture element to be encoded requires one renormalization:

generating a context for said picture element to be encoded, reading out a prediction-index data based on said generated context, reading out a probability estimating data according to a probability estimation index in said read-out prediction-index data, obtaining an A data indicating a width A of an effective area for said picture element to be encoded and a C data indicating a code word C for said picture element to be encoded, according to a picture data for said picture element to be encoded, a prediction symbol in said read-out prediction-index data, said read-out probability estimating data, an A data indicating a width A of an effective area for a picture element which immediately precedes said picture element to be encoded and a C data indicating a code word C for a picture element which immediately preceding said picture element to be encoded, and also obtaining a renewal data having a prediction symbol and a probability estimation index; and during subsequent one clock of a system clock signal:

rewriting a prediction-index data based on said context for said picture element to be encoded by said renewal data, generating a context for a subsequent picture element to be encoded of the picture element to be encoded, reading out a prediction-index data based on said generated context, reading out a probability estimating data according to a probability estimation index in said read-out prediction-index data, and obtaining an A data indicating a width A of an effective area for a subsequent picture element to be encoded of said picture element to be encoded and a C data indicating a code word C for a subsequent picture element to be encoded of said picture element to be encoded, according to a picture data for a subsequent picture element to be encoded of said picture element to be encoded, a prediction symbol in said read-out prediction-index data, said read-out probability estimating data, an A data indicating a width A of an effective area for a subsequent picture element to be encoded of said picture element to be encoded and a C data indicating a code word C for a subsequent picture element to be encoded of said picture element to be encoded.

17. A digital information encoding method comprising steps of:

during one clock of a system clock signal when encoding processing for a picture element to be encoded requires one renormalization:

generating a contest for said picture element to be encoded
reading out a prediction-index data based on said generated context;
reading out a probability estimating data, said probability estimating data comprising an LSZ (a less probable symbol size on coding interval) data indicating a mismatching probability, an NLPS data serving as a probability estimation index of a renewal data if said prediction symbol in a prediction-index data for said picture element to be encoded does not match with a picture data for said picture element to be encoded, an NMPS data serving as a probability estimation index of a renewal data if said prediction symbol in a prediction-index data for said picture element to be encoded matches with a picture data for said picture element to be encoded, a SWITCH data for indicating to invert a prediction symbol in said prediction-index data or not, according to a probability estimation index in said read-out prediction-index data;
obtaining an A data and a C data for said picture element to be encoded according to the following equations (1) and (2) if said picture data for said picture element to be encoded matches with said prediction symbol in said prediction-index data, obtaining an A data and a C data for said picture element to be encoded according to the following equations (3) and (4) if said picture data for said picture element to be encoded does not match with said prediction symbol in said prediction-index data, inverting a value of a prediction symbol for said picture element to be encoded if said SWITCH data in said probability estimating data indicates that a prediction symbol should be inverted and said picture data for said picture element to be encoded does not match with said prediction symbol in said prediction-index data, otherwise, obtaining the value of a prediction symbol for said picture element to be encoded as a prediction symbol of a renewal data, obtaining an NMPS data in said probability estimating data as a probability estimation index of a renewal data if said picture data for said picture element to be encoded matches with said prediction symbol in said prediction-index data, obtaining an NLPS data in said probability estimating data as a probability estimation index of a renewal data if said picture data for said picture element to be encoded does not match with said prediction symbol in said prediction-index data; and during subsequent one clock of a system clock signal:
rewriting a prediction-index data based on said context for said picture element to be encoded by said renewal data, generating a context for a subsequent picture element to be encoded of the picture element to be encoded, reading out a prediction-index data based on said generated context;
reading out a probability estimating data according to a probability estimation index in said reading prediction-index data, said probability estimating data comprising an LSZ data, an NLPS data, an NMPS data and a SWITCH data; and
obtaining an A data and a C data for a subsequent picture element to be encoded of said picture element to be encoded according to the following equations (1) and (2) if said picture data for a subsequent picture element to be encoded of said picture element to be encoded matches with said prediction symbol in said prediction-index data, obtaining an A data and a C data for a subsequent picture element to be encoded of said picture element to be encoded according to the following equations (3) and (4) if said picture data for a subsequent picture element to be encoded of said picture element to be encoded does not match with said prediction symbol in said prediction-index data:

$$A(k)=A(k-1)-LSZ(k) \qquad (1)$$

$$C(k)=C(k-1) \qquad (2)$$

$$A(k)=LSZ(k) \qquad (3)$$

$$C(k)=C(k-1)+\{A(k-1)-LSZ(k)\} \qquad (4)$$

where, A (k) is an A data of said picture element to be encoded (a k-th picture element to be encoded), A(k−1) is an A data of a picture element to be encoded immediately preceding said picture element to be encoded {a (k−1)-th picture element to be encoded}, C (k) is a C data of said picture element to be encoded (a k-th picture element to be encoded), C (k−1) is a C data of a picture element to be encoded immediately preceding said picture element to be encoded {a (k−1)-th picture element to be encoded}, LSZ (k) is an LSZ data indicating a mismatching probability of a probability estimating data for said picture element to be encoded (a k-th picture element to be encoded) from said probability estimating table storage means, and k=1, 2, 3, . . . .

18. A digital information decoding method comprising steps of:
during one clock of a system clock signal when decoding processing for a picture element to be decoded requires one renormalization:
generating a context for said picture element to be decoded, reading out a prediction-index data based on said generated context, reading out a probability estimating data according to a probability estimation index in said read-out prediction-index data, obtaining an A data indicating a width A of an effective area for said picture element to be decoded and a C data indicating a code word C for said picture element to be decoded, according to a prediction symbol in said read-out prediction-index data, said read-out probability estimating data, an A data indicating a width A of an effective area for a picture element which immediately precedes said picture element to be decoded and a C data indicating a code word C for a picture element which immediately preceding said picture element to be decoded, and also obtaining a renewal data having a prediction symbol and a probability estimation index, and obtaining a picture data for said picture element to be decoded; and
during subsequent one clock of a system clock signal:
rewriting a prediction-index data based on said context for said picture element to be decoded by said renewal data, generating a context for a subsequent picture element to be decoded of the picture element to be decoded, reading out a prediction-index data based on said generated context, reading out a probability estimating data according to a probability estimation index in said read-out prediction-index data, and obtaining an A data indicating a width A of an effective area for a subsequent picture element to be decoded of said picture element to be decoded and a C data indicating a code word C for a subsequent picture element to be decoded of said picture element to be decoded, according to a prediction symbol in said read-out prediction-index data, said read-out probability estimating data, an A data indicating a width A of an effective area for a subsequent picture element to be decoded of said picture element to be decoded and a C data indicating a code word C for a subsequent picture element to be decoded of said picture element to be decoded.

19. A digital information decoding method comprising steps of:

during one clock of a system clock signal when decoding processing for a picture element to be decoded requires one renormalization:

generating a contest for said picture element to be decoded;

reading out a prediction-index data based on said generated context;

reading out a probability estimating data according to a probability estimation index in said reading prediction-index data, said probability estimating data comprises an LSZ (a less probable symbol size on coding interval) data indicating a mismatching probability, an NLPS data serving as a probability estimation index of a renewal data, an NMPS data serving as a probability estimation index of a renewal data, a SWITCH data for indicating to invert a prediction symbol in a prediction-index data or not;

obtaining an A data and a C data for said picture element to be decoded according to the following equations (6) and (7) if equation (5) in the following is satisfied, obtaining an A data and a C data for said picture element to be decoded according to the following equations (8) and (9) if equation (5) in the following is not satisfied, inverting a value of said prediction symbol for said picture element to be decoded if said SWITCH data in said probability estimating data indicates an inversion of a prediction symbol and equation (5) in the following is not satisfied, otherwise, obtaining the same value of said prediction symbol for said picture element to be decoded as a prediction symbol of a renewal data, obtaining an NMPS data in said probability estimating data as a probability estimation index of a renewal data if equation (5) in the following is satisfied, obtaining an NLPS data in said probability estimating data as a probability estimation index of a renewal data if equation (5) in the following is not satisfied, inverting said prediction symbol in said prediction-index data and obtaining said inverted prediction symbol as a decoded picture data for said picture element to be decoded if equation (5) in the following is satisfied, and obtaining said prediction symbol in said prediction-index data as a decoded picture data for said picture element to be decoded without inverting if equation (5) in the following is not satisfied;

during subsequent one clock of a system clock signal;

rewriting a prediction-index data based on said context for said picture element to be decoded by said renewal data;

generating a context for a subsequent picture element to be decoded of the picture element to be decoded;

reading out a prediction-index data based on said generated context;

reading out a probability estimating data according to a probability estimation index in said reading prediction-index data, said probability estimating data comprising an LSZ data, an NLPS data, an NMPS data and a SWITCH data; and obtaining an A data and a C data for a subsequent picture element to be encoded of said picture element to be encoded according to the following equations (6) and (7) if equation (5) in the following is satisfied, obtaining an A data and a C data for a subsequent picture element to be encoded of said picture element to be encoded according to the following equations (8) and (9) if equation (5) in the following is not satisfied:

$$C(k-1) < A(k-1) - LSZ(k) \tag{5}$$

$$A(k) = A(k-1) - LSZ(k) \tag{6}$$

$$C(k) = C(k-1) \tag{7}$$

$$A(k) = LSZ(k) \tag{8}$$

$$C(k) = C(k-1) + \{A(k-1) - LSZ(k)\} \tag{9}$$

where, A (k) is an A data of said picture element to be decoded (a k-th picture element to be decoded), A(k−1) is an A data of a picture element to be decoded immediately preceding said picture element to be decoded {a (k−1)-th picture element to be decoded}, C (k) is a C data of said picture element to be decoded (a k-th picture element to be decoded), C (k−1) is a C data of a picture element to be decoded immediately preceding said picture element to be decoded {a (k−1)-th picture element to be decoded}, LSZ (k) is an LSZ data indicating a mismatching probability of a probability estimating data for said picture element to be decoded (a k-th picture element to be decoded) from said probability estimating table storage means, and k=1, 2, 3, . . . .

* * * * *